United States Patent
Koppolu et al.

(10) Patent No.: US 7,114,128 B2
(45) Date of Patent: *Sep. 26, 2006

(54) OBJECT-ORIENTED FRAMEWORK FOR HYPERLINK NAVIGATION

(75) Inventors: Srinivasa R. Koppolu, Redmond, WA (US); Victor Stone, Mercer Island, WA (US); Benjamin W. Slivka, Clyde Hill, WA (US); David S. Ebbo, Redmond, WA (US); Satoshi Nakajima, Redmond, WA (US); Clarence Glasse, Redmond, WA (US); Richard J. Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 735 days.

This patent is subject to a terminal disclaimer.

(21) Appl. No.: 10/011,150

(22) Filed: Dec. 5, 2001

(65) Prior Publication Data

US 2002/0103824 A1    Aug. 1, 2002

Related U.S. Application Data

(62) Division of application No. 08/761,709, filed on Dec. 6, 1996, now Pat. No. 6,460,058.

(51) Int. Cl.
   *G06F 3/00*  (2006.01)
(52) U.S. Cl. .................. 715/781; 715/804; 715/760; 715/810; 715/840
(58) Field of Classification Search ........... 715/760, 715/779, 781, 790–791, 794, 796–797, 803, 715/804, 806–807, 810, 835, 840, 501.1, 715/513
See application file for complete search history.

(56) References Cited

U.S. PATENT DOCUMENTS

| 4,514,800 A | 4/1985 | Gruner et al. |
| 4,674,040 A | 6/1987 | Barker et al. |
| 4,739,477 A | 4/1988 | Barker et al. |
| 4,783,648 A * | 11/1988 | Homma et al. ............. 715/794 |

(Continued)

FOREIGN PATENT DOCUMENTS

JP    3191429    8/1991

OTHER PUBLICATIONS

*Naming and Binding: Monikers*, Kraig Brockschmidt, *Inside OLE*, Second Ed., Microsoft Press, Chap. 9, pp. 431-490, 1995.

(Continued)

*Primary Examiner*—Sy D. Luu
(74) *Attorney, Agent, or Firm*—Klarquist Sparkman, LLP

(57) ABSTRACT

An object-oriented framework comprises system services, objects, and integration interfaces which unify retrieval and browsing of data among multiple different application programs, document formats, and local and remote data storage sites. The framework provides a hyperlink object which encapsulates general hyperlink navigation functions. The hyperlink object has a moniker which references a hyperlink's target, and a location string which designates a location in the target. The hyperlink object uses the moniker to retrieve the target as an object in the framework, and causes the object to display a view of the target at the location. The framework also provides a browse context object which maintains a navigation stack of navigated hyperlink targets, and allows passing of window and navigation tool bar position information to a frame in which the target is displayed to effect the appearance of window reuse when navigating between frames. The framework also includes a cache and table of running objects to speed return navigation to recently navigated targets.

13 Claims, 13 Drawing Sheets

U.S. PATENT DOCUMENTS

| | | | |
|---|---|---|---|
| 4,815,029 A | 3/1989 | Barker et al. | |
| 4,933,880 A | 6/1990 | Borgendale et al. | |
| 4,962,475 A | 10/1990 | Hernandez et al. | |
| 4,975,690 A * | 12/1990 | Torres | 715/856 |
| 5,072,412 A | 12/1991 | Henderson, Jr. et al. | |
| 5,187,786 A | 2/1993 | Densmore et al. | |
| 5,191,645 A | 3/1993 | Carlucci et al. | |
| 5,204,947 A | 4/1993 | Bernstein et al. | |
| 5,206,951 A | 4/1993 | Khoyi et al. | |
| 5,237,680 A | 8/1993 | Adams et al. | |
| 5,249,275 A | 9/1993 | Srivastava | |
| 5,274,803 A | 12/1993 | Dubin et al. | |
| 5,297,249 A | 3/1994 | Bernstein et al. | |
| 5,297,283 A | 3/1994 | Kelly, Jr. et al. | |
| 5,313,646 A | 5/1994 | Hendricks et al. | |
| 5,333,317 A | 7/1994 | Dann | |
| 5,339,423 A | 8/1994 | Beitel et al. | |
| 5,339,424 A | 8/1994 | Fushimi | |
| 5,341,478 A | 8/1994 | Travis, Jr. et al. | |
| 5,369,766 A | 11/1994 | Nakano et al. | |
| 5,369,778 A | 11/1994 | San Soucie et al. | |
| 5,377,323 A | 12/1994 | Vasudevan | |
| 5,381,547 A | 1/1995 | Flug et al. | |
| 5,408,665 A | 4/1995 | Fitzgerald | |
| 5,410,688 A | 4/1995 | Williams et al. | |
| 5,434,975 A | 7/1995 | Allen | |
| 5,440,744 A | 8/1995 | Jacobson et al. | |
| 5,446,842 A | 8/1995 | Schaeffer et al. | |
| 5,459,865 A | 10/1995 | Heninger et al. | |
| 5,463,726 A * | 10/1995 | Price | 715/797 |
| 5,481,722 A | 1/1996 | Skinner | |
| 5,504,898 A | 4/1996 | Klein | |
| 5,517,655 A | 5/1996 | Collins et al. | |
| 5,535,389 A | 7/1996 | Elder et al. | |
| 5,542,070 A | 7/1996 | LeBlanc et al. | |
| 5,550,976 A | 8/1996 | Henderson et al. | |
| 5,551,035 A | 8/1996 | Arnold et al. | |
| 5,572,643 A | 11/1996 | Judson | |
| 5,577,252 A | 11/1996 | Nelson et al. | |
| 5,581,686 A * | 12/1996 | Koppolu et al. | 715/784 |
| 5,581,760 A | 12/1996 | Atkinson et al. | |
| 5,608,720 A | 3/1997 | Biegal et al. | |
| 5,634,121 A | 5/1997 | Tracz et al. | |
| 5,640,544 A | 6/1997 | Onodera et al. | |
| 5,659,729 A | 8/1997 | Nielsen | |
| 5,664,178 A | 9/1997 | Sinofsky | |
| 5,682,536 A | 10/1997 | Atkinson et al. | |
| 5,689,703 A | 11/1997 | Atkinson et al. | |
| 5,706,501 A | 1/1998 | Horikiri et al. | |
| 5,720,016 A * | 2/1998 | Egashira | 358/1.18 |
| 5,734,380 A * | 3/1998 | Adams et al. | 715/804 |
| 5,740,439 A | 4/1998 | Atkinson et al. | |
| 5,745,683 A | 4/1998 | Lee et al. | |
| 5,758,184 A | 5/1998 | Lukovsky et al. | |
| 5,758,358 A | 5/1998 | Ebbo | |
| 5,761,683 A | 6/1998 | Logan et al. | |
| 5,764,984 A | 6/1998 | Loucks | |
| 5,778,372 A | 7/1998 | Cordell et al. | |
| 5,784,555 A | 7/1998 | Stone | |
| 5,796,403 A * | 8/1998 | Adams et al. | 715/803 |
| 5,802,304 A | 9/1998 | Stone | |
| 5,815,830 A | 9/1998 | Anthony | |
| 5,825,359 A * | 10/1998 | Derby et al. | 715/807 |
| 5,838,906 A * | 11/1998 | Doyle et al. | 709/202 |
| 5,842,018 A | 11/1998 | Atkinson et al. | |
| 5,854,630 A | 12/1998 | Nielsen | |
| 5,963,964 A | 10/1999 | Nielsen | |
| 5,987,480 A | 11/1999 | Donohue et al. | |
| 6,016,520 A | 1/2000 | Facq et al. | |
| 6,026,379 A | 2/2000 | Haller et al. | |
| 6,026,416 A | 2/2000 | Kanerva et al. | |
| 6,031,989 A * | 2/2000 | Cordell | 717/109 |
| 6,044,205 A | 3/2000 | Reed et al. | |
| 6,072,870 A | 6/2000 | Nguyen et al. | |
| 6,078,326 A | 6/2000 | Kilmer et al. | |
| 6,098,081 A | 8/2000 | Heidorn et al. | |
| 6,108,637 A | 8/2000 | Blumenau | |
| 6,163,772 A | 12/2000 | Kramer et al. | |
| 6,253,027 B1 | 6/2001 | Weber et al. | |
| 6,710,789 B1 * | 3/2004 | Sekiguchi et al. | 715/781 |
| 6,806,892 B1 * | 10/2004 | Plow et al. | 715/781 |

OTHER PUBLICATIONS

*The Visual Programmer Puts ActiveX Document Objects Through Their Paces*, Joshua Trupin, *Systems Journal*, Jun. 1996.
*Getting Results with Microsoft Office for Windows 95*, pp. 109-112, Microsoft Corporation, 1996.
Peterson, Baird, "Unix Variants", *Unix Review*, 10(4):29-31, Apr. 1992.
Pike, Rob et al., "UNIX—The Legend Evolves," *Plan 9 from Bell Labs, Proceedings of the Summer 1990 UKUUG Conference Jul. 9-13, 1990*, Royal Lancaster Hotel, London, UK, ISBN: 0 9513181 7 9.
Pike, Rob et al., "The Use of Name Spaces in Plan 9", Operating Systems Review, 27(2):72-76, Apr. 1993, ISSN: 0163-5980.
NeXTSTEP General reference, vol. 1, NeXTSTEP Publications, Addison Wesley Publishing Co., 1992, pp. 1-3 to 1-37, 2-5 to 2-16, 2-390 to 2-419, 2-503 to 2-507, 2-895 to 2-896, 2-986 to 2-987, 2-1045 to 2-1046.
Clapp, Doug, "The NeXT Application Kit, Part I: Non-Responsive Classes," *The NeXT Bible*, Brady Books, N.Y., 1990, pp. 275-280.
Zdonik, Stanley B., "Object Management System Concepts," Association for Computing Machinery. ACM # ACM 0-89791-1407/84/006/0013, 1984.
Zdonik, Stanley Benjamin, Jr., "Object Management System Concepts: Supporting Integrated Office Workstation Applications," Doctoral Thesis, *Massachusetts Institute of Technology*, 1983.
Wolfgang, Herzner et al., "CDAM-Compound Document Access and Management. An Object-Oriented Approach." Multimedia Systems, Interaction and Applications, *Eurographics Workshop*, Apr. 1991, Stockholm, Sweden, pp. 17-36.
Kobayashi, Masaaki et al., "An Update on BTRON-specification OS Development," *IEEE Proceedings of the 8th Tron Project Symposium*, Cat. Nr. 91THO412-7, Nov. 1991, Tokyo, Japan, pp. 132-140.
IBM, "Creating In-Line Objects Within an Integrated Editing Environment," *IBM Technical Disclosure Bulletin*, 27(5):2962, Oct. 1984.
DiLascia, Paul et al., "Sweeper," Microsoft Interactive Developer, vol. 1, No. 1, Spring 1996, pp. 16-52.
Staneck, W.R., Purcell, L. et al., "Electronic Publishing Unleashed", Chapter 22, pp. 510-642, 1995.
Frank M. Carrano, Data Abstraction and Problem Solving with C++, Addison-Wesley Publishing Company, pp. 14-16, 1995.
Mark R. Brown, Using Netscape 2, pp. 162, 163, 148-156, 718-719.
Elinor Mills, Navigator "cookies" files will monitor Web user activity, Feb. 26, 1996.
Al Berg, Cookies nibble at your disk drive, Jul. 8, 1996.

* cited by examiner

OBJECT-ORIENTED FRAMEWORK FOR HYPERLINK NAVIGATION

RELATED APPLICATION DATA

This application is a Divisional of U.S. patent application Ser. No. 08/761,709 filed Dec. 6, 1996, which is now issued as U.S. Pat. No. 6,460,058.

FIELD OF THE INVENTION

This invention relates generally to systems and methods for browsing or navigating to and retrieving data on a computer, and more particularly relates to browsing data of different varieties and from different sources in a unified manner.

BACKGROUND AND SUMMARY OF THE INVENTION

Previous techniques and mechanisms for navigating to and retrieving data in a computer system have had significant drawbacks which pose obstacles to providing unified tools for browsing data seamlessly and transparently from all sources (including local storage, local networks, and remote networks).

An example of a previous system for navigating to and retrieving data is the user interface of the Microsoft Windows® 95 operating system. This interface displays "folder views" which show the contents (e.g., files and sub-directories) of file system directories (also referred to as "folders") on the computer's local storage (e.g., hard or floppy disk drive) or a connected local area network ("LAN"). The folder views show files in a folder using one of four display modes: large icon, small icon, list, and details. A user navigates to a document by opening successive folder views beginning with a "my computer" or "network neighborhood" folder view (which are a top or "root" folder in the file systems of the local storage and LAN, respectively), and then selecting a particular file represented in the folder view. In response, the operating system loads an application program associated with the file, and causes the application program to "open" the file. This results in the application program displaying the contents of the file in a window (i.e., rectangular display area on the computer monitor's screen).

These folder views provide a unified and consistent way of navigating to data stored as files in a computer's local storage or on a connected LAN. But, navigation using the folder views also is limited in many respects. The folder views do not permit equivalent navigation to data stored remotely, such as on the Internet or on-line services. The folder views also do not retain any navigation "state" information, which would allow retracing or returning to data which has been previously navigated. The only state remaining after navigation with a folder view is that the folder view in which a file is selected remains open as a separate window in the Windows® 95 user interface.

Another example of a previous navigation system is an Internet browser, such as the Netscape Navigator or the Microsoft® Internet Explorer. Internet browsers have generally supported navigation using hyperlinks between hypertext documents residing on the World-Wide Web. The Internet is a global network of cooperatively interconnected computer networks, consisting of millions of individual computers. A portion of the Internet referred to as the "World-Wide Web" consists of computers, also referred to as "sites," which make multi-media documents in hyper-text mark-up language (HTML) format generally available for downloading or retrieval by individuals having a computer with Internet access.

The HTML documents can contain "hyperlinks," which are references (e.g., in the form of a uniform resource locator or URL) to another HTML document on the World-Wide Web or to another part of the same document. Generally, the hyperlinks are displayed as underlined or otherwise highlighted text, or a graphic within the document which the user can activate by "clicking" using a mouse or other input device. When a hyperlink is activated, the Internet browser navigates to the document that the hyperlink references by retrieving and displaying the referenced document in place of a currently displayed document.

Internet browsers typically maintain navigation state information in the form of a navigation log or "history" of previously navigated documents. The Browser uses the history to provide "go back" and "go forward" controls with which the user can backtrack and retrace a path between previously navigated documents. Some browsers also provide a "favorites" or "bookmark" feature with which the user creates a list of user-selected HTML documents for future reference. The user can later return to the document by selecting it from the favorites list.

However, previous Internet browsers also have failed to provide unified browsing of different varieties of data from different sources. The typical previous Internet browser is an HTML document viewer application which can display an HTML document within an application window, and supports hyperlink navigation which replaces one HTML document with another in the same application window. (An application window is the display area under control of the application in a graphical user interface (GUI) of an operating system.) This typical browser cannot display other varieties of documents (e.g., a Microsoft® Word application document), and doesn't allow hyperlink navigation to such documents. In short, such typical browsers allow hyperlink navigation between only HTML documents and only within a single application window.

One browser, the Microsoft® Internet Explorer, version 2.0 (hereafter the IE 2.0 browser), supports hyperlink navigation to a non-HTML document in a separate application window. More specifically, if the destination document of a hyperlink is a non-HTML document, the IE 2.0 browser determines the application associated with the document (such as by looking up the document's file name extension in the Windows® operating system registry) and causes that application to be launched with the document opened in a separate application window (e.g., through a shell execute command of the Windows® operating system). For example, if the user activates a hyperlink to a Microsoft® Word document at a URL on the Internet, the IE 2.0 browser causes the Microsoft® Word application to be loaded (if the application is installed on that computer) and to open the document in its window.

However, the IE 2.0 browser still fails to provide unified navigation. When a hyperlink is navigated to a separate application window of a non-HTML document with the IE 2.0 browser, hyperlink navigation is effectively "dead-ended." To continue hyperlink navigation, the user must switch windows back to the IE 2.0 browser window. There also is no "go back" hyperlink control or command available to return from the non-HTML document in the separate application window back to the HTML document in the IE 2.0 browser window. Instead, the user must switch windows using operating system mechanisms, such as the "control+escape" or "control+tab" hot key combinations of the Microsoft Windows® operating system. Thus, hyperlink navigation in the IE 2.0 browser is still limited to a single application window since the separate application window of a non-HTML document cannot fully participate in hyperlink navigation.

Further, the hyperlink navigation of the IE 2.0 browser to a non-HTML document in a separate application window does not have the same effect as typical hyperlink navigation. In typical hyperlink navigation, navigating a hyperlink replaces the document which contains the hyperlink with another document that is the destination or target of the hyperlink. Conversely, when navigating to a non-HTML document, the IE 2.0 browser causes an application associated with the non-HTML document to be launched in a separate window. This separate application window can be nearly anywhere on the computer screen, and may be either windowed or full screen (typical application windows retain the size and position settings from when they were last open). Meanwhile, the HTML document that contains the hyperlink remains open in the IE 2.0 browser window. As a result, unless both the IE 2.0 browser window and the separate application window both happen to be full-sized, the document displayed in the separate application window does not replace the HTML document in the IE 2.0 browser window and may not overlap any part of the IE 2.0 browser window.

A unified browsing environment based on the hyperlink navigation browsing model is provided in the present invention by an object-oriented framework and system having objects, programming interfaces, object integration interfaces, and methods for supporting unified navigation among different varieties of documents, data, and application programs. The invention overcomes the limitation in previous Internet browsers of navigating within a single application window, and provides seamless navigation between multiple document types and applications.

According to one aspect of the invention, the object-oriented framework includes a hyperlink object which encapsulates information needed to navigate a hyperlink, and the action of navigating the hyperlink. In the illustrated embodiment of the invention, the hyperlink object is a system-defined object which supports an integration interface that allows other programs to use the hyperlink object for navigating the hyperlink. The hyperlink object contains a moniker to a target of the hyperlink, a character string designating a destination location within the target, a descriptive name for the hyperlink ("friendly name"), and other parameters.

According to another aspect of the invention, the object-oriented framework further includes a browse context object and integration interfaces for a hyperlink container object, a hyperlink target object and a hyperlink frame object. The browse context object maintains a history of navigated hyperlinks, and other context information for hyperlink navigation including window size and position. The integration interfaces of these objects allow multiple different applications to interact with the browse context so as to participate fully in hyperlink navigation. With the browse context and integration interfaces, the applications can provide "go back" and "go forward" controls which retrace prior hyperlink navigation activity between the applications. The applications also can use the browse context to position and size the destination application window of the hyperlink so as to create the appearance of replacing the originating application window of the hyperlink. The system thereby allows seamless hyperlink navigation between different document types and applications.

According to a further aspect of the invention, the system also includes a set of programming interfaces which allow applications to participate in unified browsing without implementing objects to support the integration interfaces.

Additional features and advantages of the invention will be made apparent from the following detailed description of an illustrated embodiment which proceeds with reference to the accompanying drawings.

DETAILED DESCRIPTION OF THE ILLUSTRATED EMBODIMENTS

Figure 1:
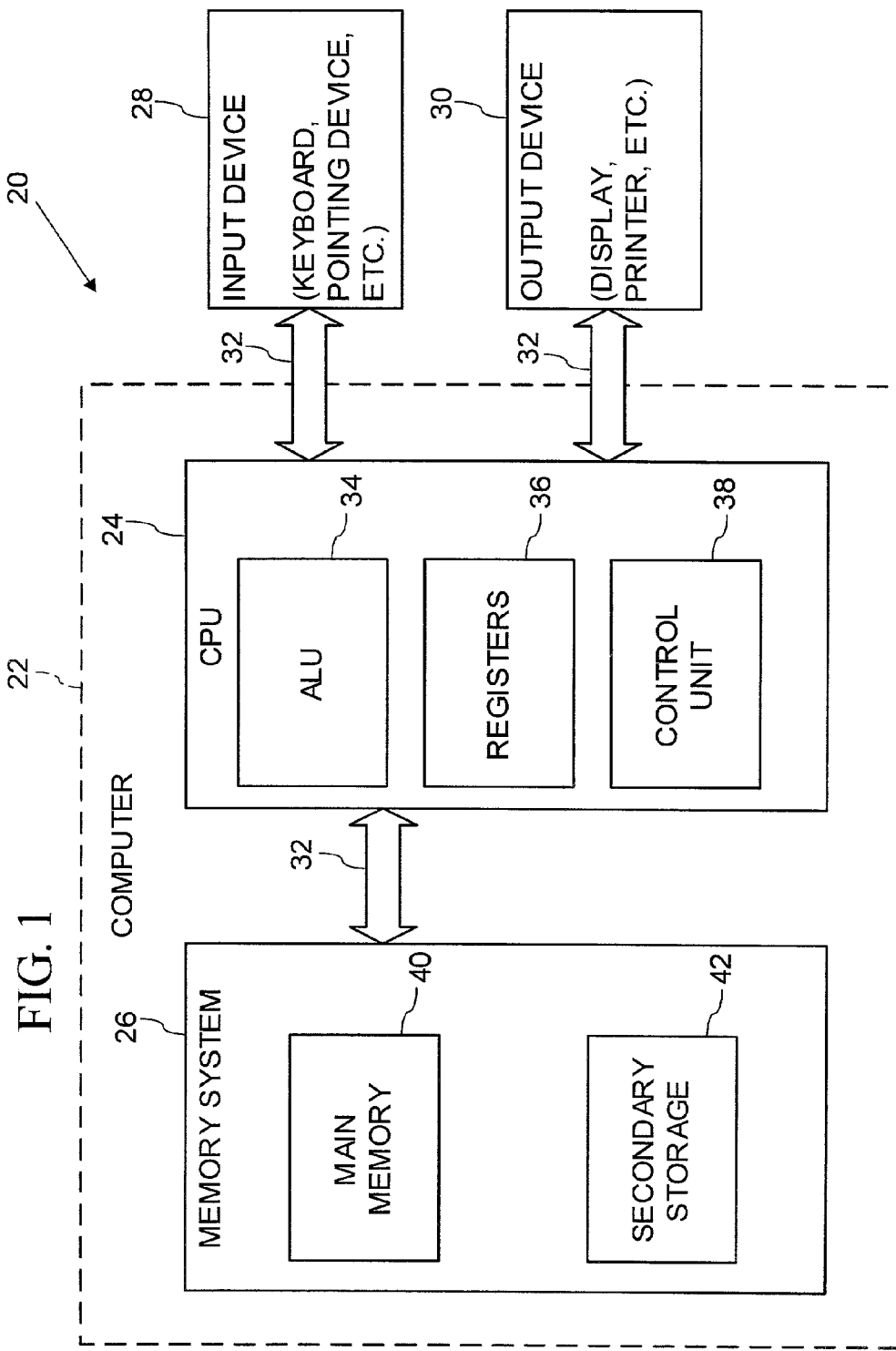
FIG. 1 is a block diagram of a computer system that may be used to implement a method and apparatus embodying the invention for unified browsing.

1. Browser Overview
2. Object Overview
3. Document Object and Server Overview
4. Moniker Overview
5. Asynchronous Monikers
   5.1 Asynchronous and Synchronous Binding Selection
   5.2 Asynchronous and Synchronous Storage
   5.3 Data-pull and Data-push models
   5.4 The IBinding Interface
      5.4.1 The IBinding:Abort Function
      5.4.2 The IBinding::Suspend Function
      5.4.3 The IBinding::Resume Function
      5.4.4 The IBinding::SetPriority Function
      5.4.5 The IBinding::GetPriority Function
   5.5 The IBindStatusCallback Interface
      5.5.1 The BINDVERB Enumeration
      5.5.2 The BINDINFOF Enumeration
      5.5.3 The BINDINFO Structure 5.5.4 The BSCO_OPTION Enumeration
5.5.5 The BINDF Enumeration
5.5.6 The BSCF Enumeration
5.5.7 The BINDSTATUS Enumeration
5.5.8 The IBindStatusCallback::Queryinterface Function
5.5.9 The IBindStatusCallback::GetBindInfo Function
5.5.10 The IBindStatusCallback::OnStartBinding Function
5.5.11 The IBindStatusCallback::GetPriority Function
5.5.12 The IBindStatusCallback::OnProgress Function
5.5.13 The IBindStatusCallback::OnDataAvailable Function
5.5.14 The IBindStatusCallback::OnObjectAvailable Function
5.5.15 The IBindStatusCallback::OnLowResource Function
5.5.16 The IBindStatusCallback::OnStopBinding Function
5.6 The IPersistMoniker Interface
　5.6.1 The IPersistMoniker::IsDirty Function
　5.6.2 The IPersistMoniker::Load Function
　5.6.3 The IPersistMoniker::Save Function
　5.6.4 The IPersistMoniker::SaveCompleted
　5.6.5 The IPersistMoniker::GetCurMoniker Function
5.7 API Functions for Asynchronous Monikers
　5.7.1 The CreateAsyncBindCtx API Function
　5.7.2 The RegisterBindStatusCallback API Function
　5.7.3 The RevokeBindStatusCallback API Function
　5.7.4 The IsAsyncMoniker API Function
6. URL Monikers
　6.1 Media-type Negotiation with the URL Moniker
　　6.1.1 The RegisterMediaTypes API Function
　　6.1.2 The CreateFormatEnumerator API Function
　　6.1.3 The RegisterFormatEnumerator API Function
　　6.1.4 The RevokeFormatEnumerator API Function
　　6.1.5 The CreateURLMoniker API Function
　6.2 URL Moniker Functions
　　6.2.1 The URL Moniker-IUnknown::Queryinterface Function
　　6.2.2 The URL Moniker-IPersist::GetClassID Function
　　6.2.3 The URL Moniker-IPersistStream::IsDirty Function
　　6.2.4 The URL Moniker-IPersistStream::Load Function
　　6.2.5 The URL Moniker-IPersistStream::Save Function
　　6.2.6 The URL Moniker-IPersistStream::GetSizeMax Function
　　6.2.7 The URL Moniker-IMoniker::BindToObject Function
　　6.2.8 The URL Moniker-IMoniker::BindToStorage Function
　　6.2.9 The URL Moniker-IMoniker::Reduce Function
　　6.2.10 The URL Moniker-IMoniker::ComposeWith Function
　　6.2.11 The URL Moniker-IMoniker::Enum Function
　　6.2.12 The URL Moniker-IMoniker::IsEqual Function
　　6.2.13 The URL Moniker-IMoniker::Hash Function
　　6.2.14 The URL Moniker-IMoniker::IsRunning Function
　　6.2.15 The URL Moniker-IMoniker::GetTimeOfLastChange Function
　　6.2.16 The URL Moniker-IMoniker::Inverse Function
　　6.2.17 The URL Moniker-IMoniker::CommonPrefixWith Function
　　6.2.18 The URL Moniker-IMoniker::RelativePathTo Function
　　6.2.19 The URL Moniker-IMoniker::GetDisplayName Function
　　6.2.20 The URL Moniker-IMoniker::ParseDisplayName Function
　　6.2.21 The URL Moniker-IMoniker::IsSystemMoniker Function
　6.3 Client Extension Services
　6.4 The IAuthenticate interface
　6.5 The IHttpNegotiate Interface
　　6.5.1 The IHttpNegotiate::BeginningTransaction Function
　　6.5.2 The IHttpNegotiate::OnHeadersAvailable Function
　　6.5.3 The IHttpNegotiate::OnError Function
7. Hyperlink Navigation Architecture
　7.1 Hyperlink Navigation Overview
　7.2 Hyperlink Navigation Architecture Overview
　　7.2.1 "Simple" Hyperlinking API Functions
　　7.2.2 Hyperlink Target
　　7.2.3 Hyperlink Object
　　7.2.4 Hyperlink Container and Hyperlink Sites
　　7.2.5 Hyperlink Frame
　　7.2.6 Hyperlink Browse Context
　7.3 Simple Hyperlinking Process
　7.4 Full Hyperlink Navigation Process
　7.5 Hyperlinking Interfaces
　7.6 Hyperlinking Architecture Data Structures
　　7.6.1 The HLNF Enumeration
　　7.6.2 The HLINKWHICHMK Enumeration
　　7.6.3 The HLINKGETREF Enumeration
　　7.6.4 The HLFNAMEF Enumeration
　　7.6.5 The HLINKMISC Enumeration
　　7.6.6 The HLITEM Structure
　　7.6.7 The HLBWIF Enumeration
　　7.6.8 The HLBWINFO Structure
　　7.6.9 The HLID Constants
　　7.6.10 The HLQF Enumeration
　　7.6.11 The CF_HYPERLINK Clipboard Format
　　7.6.12 The HLSR Enumeration
　7.7 Hyperlinking Architecture API Functions
　　7.7.1 The HlinkCreateBrowseContext API Function
　　7.7.2 The HlinkQueryCreateFromData API Function
　　7.7.3 The HlinkCreateFromData API Function
　　7.7.4 The HlinkCreateFromMoniker API Function
　　7.7.5 The HlinkCreateFromString API Function
　　7.7.6 The HlinkGetSpecialReference API Function
　　7.7.7 The HlinkSetSpecialReference API Function
　　7.7.8 The HlinkNavigateToStringReference API Function
　　7.7.9 The HlinkNavigate API Function
　　7.7.10 The HlinkOnNavigate API Function
　7.8 The IHlinkSite Interface
　　7.8.1 The IHlinkSite::GetMoniker Function
　　7.8.2 The IHlinkSite::Getinterface Function
　　7.8.3 The IHlinkSite::OnNavigationComplet Function
　7.9 The IHlink Interface
　　7.9.1 The IHlink::SetHlinkSite Function
　　7.9.2 The IHlink::GetHlinkSite Function
　　7.9.3 The IHlink::GetMonikerReference Function
　　7.9.4 The IHlink::GetStringReference Function
　　7.9.5 The IHlink::GetFriendlyName Function
　　7.9.6 The IHlink::SetFriendlyName Function
　　7.9.7 The IHlink::GetTargetFrameName Function
　　7.9.8 The IHlink::SetTargetFrameName Function
　　7.9.9 The IHlink::GetAdditionalParams Function
　　7.9.10 The IHlink::SetAdditionalParams Function
　　7.9.11 The IHlink::Navigate Function
　　7.9.12 The IHlink::GetMiscStatus Function 7.10 The IHlinkTarget Interface
   7.10.1 The IHlinkTarget::SetBrowseContext Function
   7.10.2 The IHlinkTarget::GetBrowseContext Function
   7.10.3 The HlinkTarget::Navigate Function
   7.10.4 The IHlinkTarget::GetMoniker Function
   7.10.5 The IHlinkTarget::GetFriendlyName Function 7.11 The IHlinkFrame Interface
   7.11.1 The IHlinkFrame::SetBrowseContext Function
   7.11.2 The IHlinkFrame::GetBrowseContext Function
   7.11.3 The IHlinkFrame::Navigate Function
   7.11.4 The IHlinkFrame::OnNavigate Function 7.12 The IHlinkBrowseContext Interface
   7.12.1 The IHlinkBrowseContext::Register Function
   7.12.2 The IHlinkBrowseContext::GetObject Function
   7.12.3 The IHlinkBrowseContext::Revoke Function
   7.12.4 The IHlinkBrowseContext::SetBrowse WindowInfo Function
   7.12.5 The IHlinkBrowseContext::GetBrowse WindowInfo Function
   7.12.6 The IHlinkBrowseContext::EnumNavig ation-Stack Function
   7.12.7 The IHlinkBrowseContext::QueryHlink Function
   7.12.8 The IHlinkBrowseContext::GetHlink Function
   7.12.10 The IHlinkBrowseContext::SetCurrent Hlink Function
   7.12.10 The IHlinkBrowseContext::OnNavigat eHlink Function
   7.12.11 The IHlinkBrowseContext::Clone Function 1. Computer Overview Referring to FIG. 1, an operating environment for an illustrated embodiment of the present invention is a computer system 20 with a computer 22 that comprises at least one high speed processing unit (CPU) 24, in conjunction with a memory system 26, an input device 28, and an output device 30. These elements are interconnected by at least one bus structure 32.

The illustrated CPU 24 is of familiar design and includes an ALU 34 for performing computations, a collection of registers 36 for temporary storage of data and instructions, and a control unit 38 for controlling operation of the system 20. The CPU 24 may be a processor having any of a variety of architectures including Alpha from Digital, MIPS from MIPS Technology, NEC, IDT, Siemens, and others, x86 from Intel and others, including Cyrix, AMD, and Nexgen, and the PowerPc from IBM and Motorola.

The memory system 26 generally includes high-speed main memory 40 in the form of a medium such as random access memory (RAM) and read only memory (ROM) semiconductor devices, and secondary storage 42 in the form of long term storage mediums such as floppy disks, hard disks, tape, CD-ROM, flash memory, etc. and other devices that store data using electrical, magnetic, optical or other recording media. The main memory 40 also can include video display memory for displaying images through a display device. Those skilled in the art will recognize that the memory 26 can comprise a variety of alternative components having a variety of storage capacities.

The input and output devices 28, 30 also are familiar. The input device 28 can comprise a keyboard, a mouse, a physical transducer (e.g., a microphone), etc. The output device 30 can comprise a display, a printer, a transducer (e.g., a speaker), etc. Some devices, such as a network interface or a modem, can be used as input and/or output devices.

As is familiar to those skilled in the art, the computer system 20 further includes an operating system and at least one application program. The operating system is the set of software which controls the computer system's operation and the allocation of resources. The application program is the set of software that performs a task desired by the user, using computer resources made available through the operating system. Both are resident in the illustrated memory system 26.

In accordance with the practices of persons skilled in the art of computer programming, the present invention is described below with reference to acts and symbolic representations of operations that are performed by computer system 20, unless indicated otherwise. Such acts and operations are sometimes referred to as being computer-executed. It will be appreciated that the acts and symbolically represented operations include the manipulation by the CPU 24 of electrical signals representing data bits which causes a resulting transformation or reduction of the electrical signal representation, and the maintenance of data bits at memory locations in memory system 26 to thereby reconfigure or otherwise alter the computer system's operation, as well as other processing of signals. The memory locations where data bits are maintained are physical locations that have particular electrical, magnetic, or optical properties corresponding to the data bits.

1. Browser Overview

Figure 2:
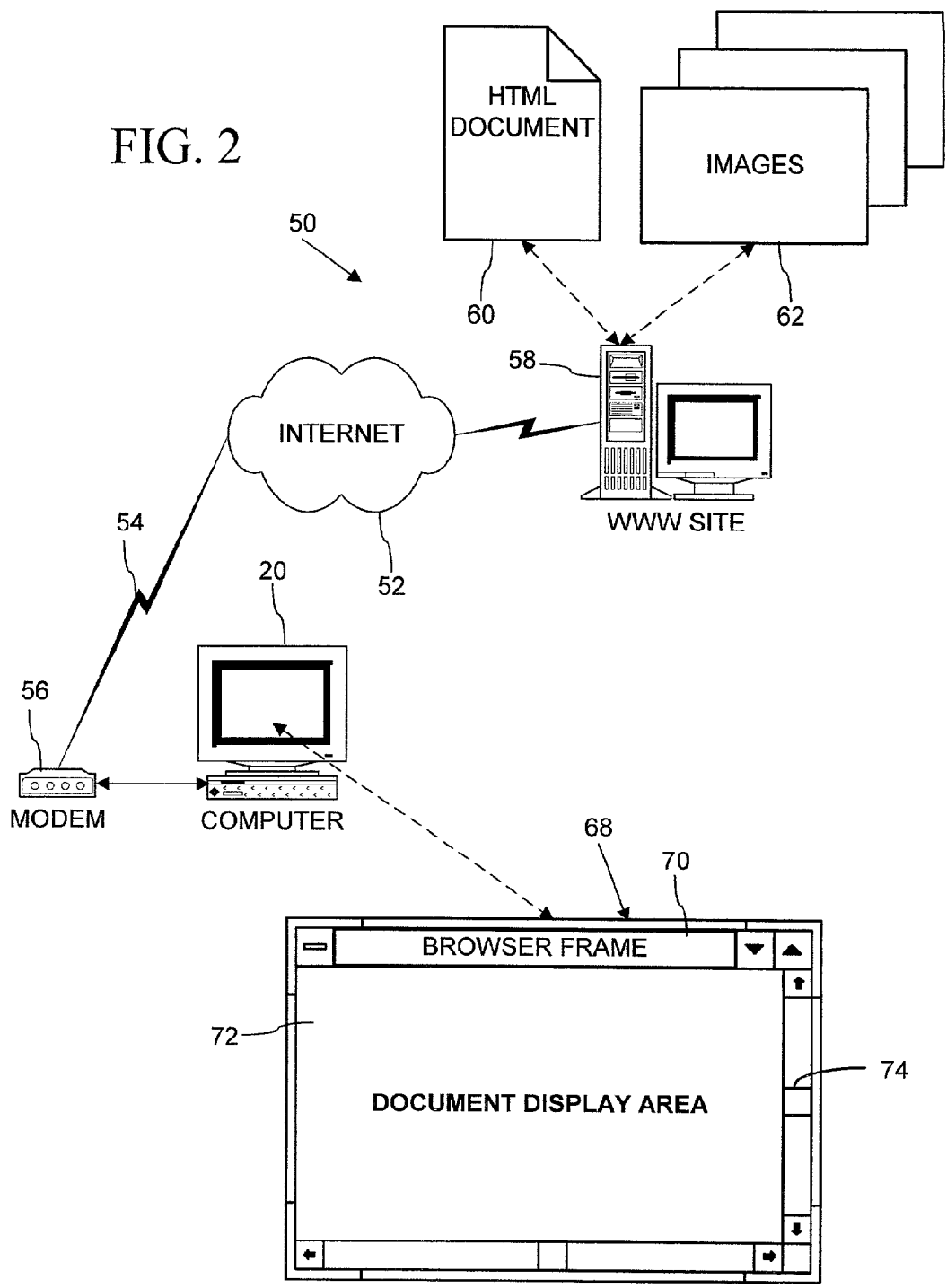
FIG. 2 is a diagram illustrating a browsing system including the computer of FIG. 1 for unified browsing according to an illustrated embodiment of the invention.

In a browsing environment 50 of an illustrated embodiment of the invention shown in FIG. 2, the computer 20 (also shown in FIG. 1) runs software, referred to herein as a "browser," for unified browsing of electronic documents and other data from local sources (e.g., the secondary storage 42 of FIG. 1) and from a remote computer network 52. The browser can be integrated with the operating system software, or can be a separate application software. The illustrated browser is implemented by the software as an OLE object (described below).

The illustrated remote computer network 52 is the Internet, which is described in the Background and Summary of the Invention above. In the illustrated browsing environment 50, the computer 20 connects to the computer network 52 over a telephone line 54 with a modem 56. Other physical connections to the computer network alternatively can be used, such as an ISDN, T1 or like high speed telephone line and modem, a television cable and modem, a satellite link, an optical fiber link, an Ethernet or other local area network technology wire and adapter card, radio or optical transmission devices, etc. The invention can alternatively be embodied in a browsing environment for other public or private computer networks, such as a computer network of a commercial on-line service or an internal corporate local area network (LAN), an intranet, or like computer network.

Documents for browsing with the illustrated browser can reside as files of a file system stored in the computer's secondary storage 42 (FIG. 1), or reside as resources at a remote computer 58 (also referred to as a "site") connected to the computer network 52, such as a world-wide web site on the Internet. The illustrated document 60 residing at the site 58 conforms with HTML standards, and may include extensions and enhancements of HTML standards. However, the illustrated browser also can browse documents having other data formats (e.g., Microsoft® Word documents, etc.) from the computer 20 or remote computer 58.

In conformance with HTML, the illustrated document 60 can incorporate other additional information content 62, such as images, audio, video, executable programs, etc. (hereafter simply "images" 62), which also reside at the remote computer 58. The document 60 and images 62 preferably are stored as files in a file system of the remote computer 58. The document 60 incorporates the images 62 using HTML tags that specify the location of files or other Internet resource containing the images on the Internet 52.

When used for browsing documents, the illustrated browser displays the document in a window 68 or rectangular area of the computer's display 30 allocated to the browser by the operating system. The illustrated window 68 comprises a frame 70, a document display area 72, and user interface controls 74. The browser provides the document display area 72 for displaying the document.

The browser and other client applications within the computer 20 preferably work with documents (which have data formats other than those native to the browser or client application) by encapsulating the document's data into an associated object, and integrating with the object using pre-defined interfaces as described more fully below. These document objects include the code to work with the document's data, including code to display the document data in the document display area 72. The browser thus operates as a host or container of document objects, by providing a window and frame which includes a document display area in which a hosted document object can display its document. Working with documents encapsulated as document objects allows full use of all the features described below.

Alternatively, the browser or other client application can work with a document by launching an application program associated with the document, and causing the associated application program to load the document and perform a specified operation on the document. In the Microsoft Windows® operating system, this is done by looking up the application program associated with the document's file name extension in the system registry, (e.g., ".doc" for Microsoft® Word documents, ".vsd" for Shapeware's VISIO drawings, etc.) and a text string command for directing the program to perform a desired operation. The application program associated with a document also may be identified in the Microsoft Windows® operating system by matching a bit pattern at specific offset into the file as also specified in the system registry. The browser or other client application patches the document's file name into the text string command, and invokes the operating system's shell execute service to execute the command. Shell execute is a well known Windows® operating system service which issues a text string as a command to the operating system's command interpreter (i.e., the "command.com" program in the Windows® operating system). The text string generally is in the form of an MS-DOS command, which specifies a path and file name of the associated application program's executable file, a flag for specifying the desired operation, and the document's path and file name. The command interpreter responds by parsing the text string, loading the application program specified in the text string, and passing the flag and the document's path and file name as command line arguments into the application program. The application program then "opens" (i.e., loads) the document and performs the operation specified by the flag.

Figure 12:
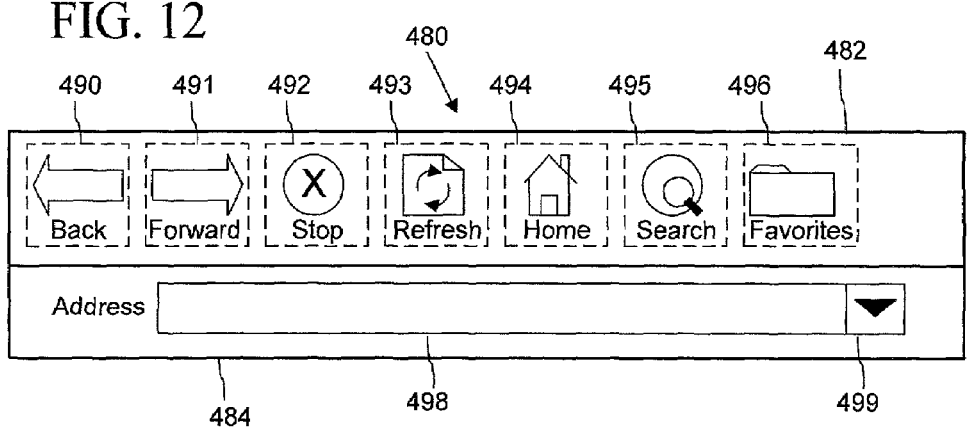
FIG. 12 is a view of a hyperlink navigation toolbar used in a browser frame of the browsing system of FIG. 2, and in hyperlink frames of the software component architecture of FIG. 9.

Referring to FIG. 12, the user interface controls of the illustrated browser include a hyperlink navigation toolbar 480 for use in controlling hyperlink navigation. The illustrated hyperlink navigation toolbar 480 includes a button bar 482 and an address entry bar 484. The user can navigate to a desired document or other application in the illustrated browser by clicking on a hyperlink contained in the document which is currently displayed within the browser frame, or by entering a name (e.g., a URL address or file system path name) for the document in the address entry bar. Other operations associated with hyperlink navigation are activated from the toolbar. A menu bar with drop down menus also can be included for activating other browser operations.

The button bar 482 has button controls 490–496 for activating various hyperlink navigation operations. The button control 490 is a "go back" button which operates to navigate to an immediately preceding document or application program in a sequentially ordered history (described more fully below) of previously navigated documents and applications. The button control 491 is a "go forward" button which causes navigation to a next document or application in the history. The button control 492 is a stop button which operates to halt retrieval of a document during hyperlink navigation. The button control 493 is a refresh button which causes the browser to redisplay the current document. The button control 494 is a home button which causes the browser to navigate to a user-defined default start document (which may, for example, be a home page on the Internet such as the Microsoft Network home page URL, at the "msn" dot "com" domaim). The button control 495 is a search button which operates to initiate a search using an Internet search engine on user input keywords. The button control 496 is a favorites button which accesses a favorites list feature of the browser, which is a user defined list of documents. The address entry bar 484 includes a text entry box 498 and a drop down list control 499. The user can enter a name of a document for the browser to retrieve in the text entry box 498. The drop down button 499 operates to display a list of most recently navigated documents from the history. The user can navigate to a document by selecting it from the drop down list.

In the illustrated browser, the hyperlink navigation toolbar 480 has a default position within the browser window 68 in a horizontal orientation under a title bar portion of the frame 70 (FIG. 2). However, the user can move the toolbar to other optional positions (e.g., in a vertical orientation at the right or left edge of the frame, in a horizontal orientation at a bottom edge of the frame, or in a moveable sub-window) by editing the toolbar's properties. In the illustrated embodiment, the user edits the properties by selecting a customize menu command. This opens a customize dialog box with user interface controls for setting the toolbar's properties.

2. Object Overview

Referring to FIG. 2, the illustrated embodiment of the invention utilizes objects which conform to the component object model (COM) of Microsoft Corporation's OLE. For a detailed discussion of OLE see *Inside OLE, Second Edition* by Kraig Brockschmidt, Microsoft Press, Redmond, Wash. 1995. A brief overview of objects in OLE and associated terminology is provided below before discussing the details of the illustrated embodiment.

An object is an instance of a programmer-defined type referred to as a class, which exhibits the characteristics of data encapsulation, polymorphism and inheritance. Data encapsulation refers to the combining of data (also referred to as properties of an object) with methods that operate on the data (also referred to as member functions of an object) into a unitary software component (i.e., the object), such that the object hides its internal composition, structure and operation and exposes its functionality to client programs that utilize the object only through one or more interfaces. An interface of the object is a group of semantically related member functions of the object. In other words, the client programs do not access the object's data directly, but must instead call functions on the object's interfaces to operate on the data.

Polymorphism refers to the ability to view (i.e., interact with) two similar objects through a common interface, thereby eliminating the need to differentiate between two objects. Inheritance refers to the derivation of different classes of objects from a base class, where the derived classes inherit the properties and characteristics of the base class (which for purposes of OLE are the interfaces of the base class).

OLE's COM specification defines binary standards for objects and their interfaces which facilitate the integration of software components. According to the COM specification, a typical object 80 is represented in the computer system 20 (FIG. 1) by an instance data structure 82, a virtual function table 84, and member functions 86–88. The instance data structure 82 contains a pointer 90 to the virtual function table 84 and data 92 (also referred to as data members, or properties of the object). A pointer is a data value that holds the address of an item in memory. The virtual function table 84 contains entries 96-98 for the member functions 86–88. Each of the entries 96-98 contains a reference to the code 86–88 that implements the corresponding member function.

The pointer 90, the virtual function table 84, and the member functions 86–88 implement an interface of the object 80. Client programs interact with the object 80 by obtaining a pointer (referred to as an interface pointer) to the pointer 90 of the virtual function table 84. OLE includes a type definition of an interface pointer which allows client programs to call member functions on the interface by name through the interface pointer and provides type checking on the function's arguments, as expressed in the following code (in the C++ programming language):

pInterface->MemberFunction( . . . )

Figure 3:
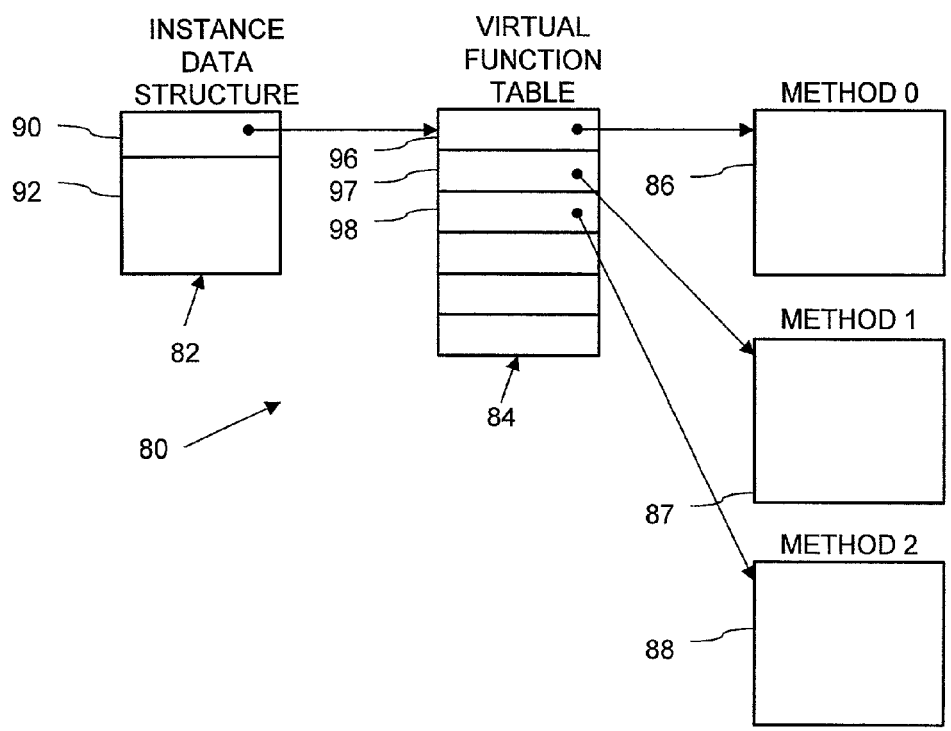
FIG. 3 is a block diagram of typical data structures for an object in the computer system of FIG. 1.

By convention, the interfaces of an object are illustrated graphically as a plug-in jack as shown for the document object in FIG. 3. Also, Interfaces conventionally are given names beginning with a capital "I." Objects can include multiple interfaces which are implemented with one or more virtual function tables. The member function of an interface is denoted as "IInterfaceName::FunctionName."

The object 80 conforming to the COM specification exhibits data encapsulation by exposing its interfaces (semantic groupings of its member functions) to client programs. The client programs interact with the object 80 by calling the member functions 86–88 on a particular interface of the object, but do not directly manipulate the object's data. The object 80 also exhibits polymorphism and inheritance in that the object 80 can provide interfaces in common with a base class and other similar objects, so that client programs can interact with each of the objects in the same manner by calling member functions of the interface that the objects have in common.

3. Document Object and Server Overview

Figure 5:
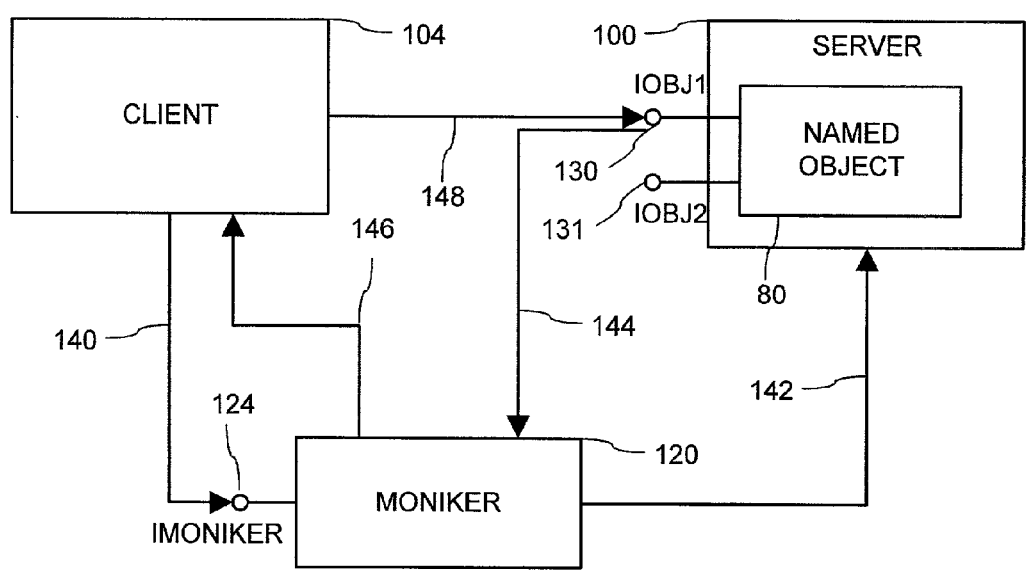
FIG. 5 is a process flow diagram of a binding process performed by the moniker of FIG. 4.

Referring now to FIG. 5, the virtual function table 84 and member functions 86–88 of the object 80 are provided by a server application program 100 which is stored in the computer system 20 (FIG. 1) as an executable program file (with a ".exe" file name extension) or as a dynamic link library file (with a ".dll" file name extension). Dynamic link library files are loaded, dynamically linked, and executed by the Windows® operating system in a same process with a client application program. Executable program files are loaded by the operating system as a separately executing process. In accordance with OLE, the server application 100 includes code for the virtual function table 84 (FIG. 3) and member functions 86–88 (FIG. 3) of the classes that it supports, and also includes a class factory that generates the instance data structure 82 (FIG. 3) for an object of the class.

A server application can be written by a programmer to support a particular class of object that contains any desired data. More specifically, a programmer can write server applications which provide objects that contain the data of a particular variety of computer document (e.g., document 60 of FIG. 2), such as a text document, spreadsheet, drawing, etc., or that contain data for part of a computer document, such as a range of spreadsheet cells, a paragraph of a text document, etc. These objects which contain document data are referred to herein as document objects. For example, software application programs such as Microsoft® Word can be written as a server application in which the application program's documents are represented as OLE objects. A server application also can be written for representing the HTML document 60 and images 62 (FIG. 2) as OLE objects. This allows other client programs 104 (such as the unified browsing software program illustrated in FIG. 2) and objects to interact with the document through interfaces of the document object.

The document objects in the illustrated embodiment of the invention conform to an extension of OLE objects known as DocObjects. DocObjects are used by the binder application program in the Microsoft® Office 95 product, and are described in more detail in a pending U.S. patent application (a copy of which is attached as Exhibit A hereto). DocObjects are document objects that generate a view of their documents that can be displayed stand-alone in a display area of a frame provided by a hosting frame object (e.g., the document display area 72 in the frame 70 provided by the browser of FIG. 2).

For the client program 104 to interact with the document object 80 provided by the server application 100, the server application must first create the object (i.e., instantiate an object of a class supported by the server application) and the client 104 must gain an interface pointer to the object 80. In OLE, the client program 104 realizes these events using services provided by OLE and a set of standard object interfaces defined by COM based on class and interface identifiers assigned to the object's class and interfaces. More specifically, the services are available to client programs as application programming interface (API) functions provided in the COM library, which is part of a component of the Windows® operating system in a file named "OLE32. DLL." In OLE, classes of objects are uniquely associated with class identifiers ("CLSIDs"). Class identifiers are 128-bit globally unique identifiers ("GUID") that the programmer creates with an OLE service named "CoCreateGUID" and assigns to the respective classes. The interfaces of an object are associated with interface identifiers ("IIDs").

In particular, the COM library provides an API function, "CoCreateInstance," that the client program 104 can call to request creation of an object to encapsulate a particular documents data using a CLSID associated with the data. The CoCreateInstance API function creates the object and returns a pointer of the requested interface to the client program.

Once the client program 104 has obtained a first interface pointer to the object 80, the client obtains pointers to other desired interfaces of the object using the interface identifier associated with the desired interface. COM defines several standard interfaces generally supported by OLE objects including the IUnknown interface. This interface includes a member function named "QueryInterface." The QueryInterface function can be called with an interface identifier as an argument, and returns a pointer to the interface associated with that interface identifier. By convention, the IUnknown interface's member functions are included as part of each interface on an object. Thus, any interface pointer that the client obtains to an interface of the object 80 can be used to call the QueryInterface function.

In a typical situation, however, the only information that the client program 104 has to reference a particular document is a textual name, such as a file name or an Internet URL. In the case of a file name, the COM library provides API functions (e.g., "GetClassFile," "ReadClassStg" and "ReadClassStm") for obtaining a CLSID associated with the file. These functions, however, are specific to document data that is stored as a file in a computer's local storage.

4. Moniker Overview

Figure 4:
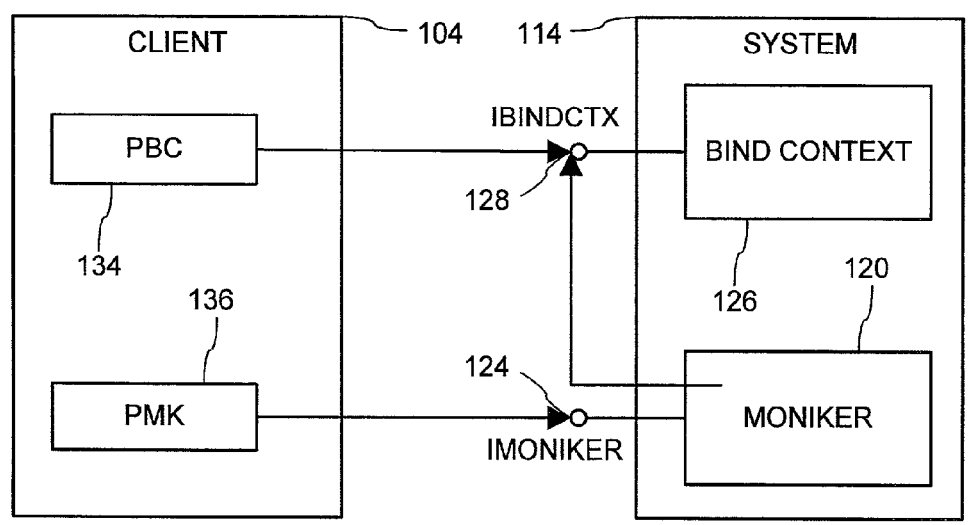
FIG. 4 is a block diagram of software components that support binding to a named object using a moniker.

With reference to FIGS. 4 and 5, the client program 104 also can gain access (i.e., a pointer to an interface) to the object 80 which encapsulates some desired data based on a name that references the object using a moniker 120. The moniker 120 generally is provided by the COM library of the operating system 114. Alternatively, the moniker may be provided by the server application associated with the object 80. The system 114 includes API functions which the client program 104 calls to have a moniker created for a given name. In OLE, there are four standard classes of monikers, i.e., file moniker, item moniker, pointer moniker, and anti-moniker, which are described more fully in the book, *Inside OLE, second edition*, supra. The API functions for creating a moniker of these standard moniker classes are summarized in the following table:

TABLE 1

OLE Moniker APIs.

| Function | Description |
| --- | --- |
| CreateFileMoniker(pszPath, ppmk) | Creates a file moniker, given any portion of a path name in pszFile. The portion can be as short as a drive letter or as long as a complete path. The file moniker converts pszPath to a standard UNC path. Anything the operating system understands as a path is suitable for a file moniker. |
| CreateItemMoniker(pszDelim, pszItem, ppmk) | Creates an item moniker for which pszItem identifies the item's name and pszDelim identifies a delimiter string (usually a single character such as !), which does not occur elsewhere in pszItem. This delimiter is used to prefix the item's display name, allowing it to be combined with other items in the same string and parsed out of that string again. |
| CreatePointerMoniker(pIUnknown, ppmk) | Creates a pointer moniker to encapsulate the pointer passed in pIUnknown. This makes any object look like a moniker. |
| CreateAntiMoniker(ppmk) | Creates an anti-moniker, which needs no extra information. |

For creating a moniker based on a user-provided name, the system 114 also provides an OLE API function called MkParseDisplayName, which has the following form:

HRESULT MkParseDisplayName(IBindCtx *pbc, LPCWSTR pszName, ULONG *pchEaten, IMoniker **ppmk)

The MkParseDisplayName API function parses a text string (the parameter "pszName") into a moniker. The text string can have one of two initial patterns: a uniform naming convention (UNC) path name (a conventional file system path name such as "c:\directory\file"), or the character "@" followed by a program identifier (ProgID) of a server application. In the case of a UNC path name, the API function creates a file moniker and calls the file moniker's "ParseDisplayName" function (described below) to parse the text string. In the case of a text string with the "@" character and ProgID, the API function creates an object based on a CLSID associated with the ProgID in the operating system's registry database and calls a "ParseDisplayName" member function on an "IParseDisplayName" interface of that object, which is defined as follows:

```
interface IParseDisplayName : IUnknown {
    HRESULT ParseDisplayName(IBindContext *pbc,
        LPOLESTR pszDisplayName, ULONG
        *pchEaten, IMoniker **ppmkOut);
};
```

By effectively plugging in a new name-to-moniker parser in this way, the MkParseDisplayName API can be extended to create new classes of monikers.

The moniker 120 exposes a set of member functions to the client 104 through an interface 124, designated IMoniker, which is defined as follows:

```
interface IMoniker : public IPersistStream {
public:
    HRESULT BindToObject(IBindCtx *pbc, IMoniker *pmkToLeft,
        REFIID riidResult, void *ppvResult);
    HRESULT BindToStorage(IBindCtx *pbc, IMoniker
        *pmkToLeft, REFIID riid, void **ppvObj);
    HRESULT Reduce(IBindCtx *pbc, DWORD
        dwReduceHowFar, IMoniker **ppmkToLeft, IMoniker
        **ppmkReduced);
    HRESULT ComposeWith(IMoniker *pmkRight, BOOL
        fOnlyIfNotGeneric, IMoniker **ppmkcomposite);
    HRESULT Enum(BOOL fForward, IEnumMoniker
        **ppenumMoniker);
    HRESULT IsEqual(IMoniker *pmkOtherMoniker);
    HRESULT Hash(DWORD *pdwHash);
    HRESULT IsRunning(IBindCtx *pbc, IMoniker *pmkToLeft,
        IMoniker *pmkNewlyRunning);
    HRESULT GetTimeOfLastChange(IBindCtx *pbc, IMoniker
        *pmkToLeft, FILETIME *pFileTime);
    HRESULT Inverse(IMoniker **pmk);
    HRESULT CommonPrefixWith(IMoniker *pmkOther, IMoniker
        **ppmkPrefix);
    HRESULT RelativePathTo(IMoniker *pmkOther, IMoniker
        **ppmkRelPath);
    HRESULT GetDisplayName(IBindCtx *pbc, IMoniker
        *pmkToLeft, LPOLESTR *ppszDisplayName);
    HRESULT ParseDisplayName(IBindCtx *pbc, IMoniker
        *pmkToLeft, LPOLESTR *pszDisplayName, ULONG
        *pchEaten, IMoniker **ppmkOut);
    HRESULT IsSystemMoniker(DWORD *pdwMksys);
};
```

As indicated in the above interface definition, the IMoniker interface is derived from the IPersistStream interface, which is a well known OLE interface for objects that can read and write their state persistently as a data stream or file in the computer's secondary storage 42 (FIG. 1). This means that the moniker 120 also includes member functions to support the IPersistStream interface, which allows the client to store and load the moniker 120 from the secondary storage.

The member functions which the moniker 120 exposes through the IMoniker interface 124 include two functions, BindToObject and BindToStorage (herein collectively referred to as BindToXxx), which the client 104 calls to bind to the named object 80. The BindToObject function performs binding by instantiating the named object 80 in the memory 40 (FIG. 1) of the computer, and returns an interface pointer of the named object 80 to the client 104. The BindToStorage function performs binding by instantiating the named object 80 onto an OLE storage stream which is stored in the computer's secondary storage 42 (e.g., on the hard drive), rather than into the main memory 40. In the browsing environment 50 illustrated in FIG. 2 for example, the BindToStorage function is used to download a file such as an image or video clip directly onto hard disk storage, whereas the BindToObject function is used to create an instance of an object for an HTML document with code for viewing the document.

The IMoniker interface 124 also exposes the functions, GetDisplayName and ParseDisplayName, of the moniker 120 to the client 104. The GetDisplayName function returns a human-readable display name of the object 80 which the client can display to the user, such as in a list box control or other user interface element. The display name is a text string that names the object 80, such as a path and file name or an Internet URL. The ParseDisplayName function operates in reverse, creating a moniker based on a text string provided by the client.

Further details of the moniker's member functions are described in *Inside OLE, second edition*, supra.

When calling most of the moniker's member functions, the client program 104 passes a pointer to a bind context 126 as a parameter of the call. The bind context 126 is an object which operates as a central repository of information used globally in the binding process, such as a table of running objects. The bind context 126 has an interface 128, designated IBindCtx, which is defined as follows:

```
interface IBindCtx: IUnknown
{
    HRESULT RegisterObjectBound(IUnknown *pUnk);
    HRESULT RevokeObjectBound(IUnknown *pUnk);
    HRESULT ReleaseBoundObjects(void);
    HRESULT SetBindOptions(BIND_OPTS *pbindopts);
    HRESULT GetBindOptions(BIND_OPTS *pbindopts);
    HRESULT GetRunningObjectTable(IRunningObjectTable
**ppROT);
    HRESULT RegisterObjectParam(LPOLESTR pszKey,
IUnknown *pUnk);
    HRESULT GetObjectParam(LPOLESTR pszKey, IUnknown
**ppUnk);
    HRESULT EnumOjbectParam(IEnumString **ppEnum);
    HRESULT RevokeObjectParam(LPOLESTR pszKey);
};
```

The bind context 126 is provided by the system 114. The client program 104 creates the bind context 126 by calling a system API function, CreateBindCtx. The client program 104 creates the bind context once, then passes a pointer to the bind context's IBindCtx interface in calls to the moniker 120. This allows the moniker 120 to retrieve global information stored in the bind context 126 by calling functions on the IBindCtx interface. When called by the client to bind to the named object 80 for example, the moniker 120 can look in the running objects table of the bind context 126 to determine whether the object already exists. If the object exists, the moniker 120 can simply return an interface pointer of the existing object to the client 104, and thus avoid creating the object again. Other uses of the bind context are described in *Inside OLE, second edition*, supra.

FIG. 5 illustrates the operation of the moniker 120 performing the binding process for the client program 104 to an interface of the named object 80. In the illustrated example, the client program 104 uses the moniker 120 to bind to the object referenced by a name with code such as the following:

```
HRESULT hr;
IBindCtx* pbc;
hr=CreatBindCtx(0, &pbc);
...
IMoniker *pmk;
IObj1 *pObj;
GetMonikerSomehow(&pmk);
hr = pmk->BindToObject(pbc,0,IID_IObj1, &pObj);
if(hr==S_OK){
    pObj->SomeFunction(...);
}
```

In this example, the named object 80 exposes a member function, SomeFunction, through an IObj1 interface 130, and includes a second interface 131, IObj2. With the above code, the client first creates the bind context 126 which will be used later by the moniker 120 when binding to the named object 80. The client creates the bind context by calling the CreateBindCtx API function of the system 114 as described above. The CreateBindCtx API function returns an interface pointer of the IBindCtx interface 128 to the client 104, which the client stores as the pointer variable 134, pbc.

The client next creates the moniker 120 which names the object 80 using a moniker creation API function of the system 114 as described above (e.g., MKParseDisplayName). The client is returned an interface pointer of the IMoniker interface 124. In this example code, the client stores this pointer to the IMoniker interface 124 of the moniker 120 as a pointer variable 136, pmk. The client 104 then performs a call 130 to the BindToObject function on the IMoniker interface 124 of the moniker 120 to bind to the named object 80. In the call 140, the client passes an interface identifier (IID_IObj1) to request binding to a particular interface (the IObj1 interface 130) of the named object 80.

In the moniker's BindToObject function, the moniker 120 includes code which launches the object's server application program 100, requests creation of the named object, and queries for a pointer to the interface requested by the client. The moniker 120 typically performs these steps with calls 142 to the GetClassFile and CoCreateInstance API functions described above, and to the QueryInterface member function of the object 80 to query for the requested interface of the object as also described above. As a result, the object 80 is instantiated by its class factory in the server application 100, and returns (144) a pointer of the requested interface (the IObj1 interface 130 in this example) of the named object 80 to the moniker 120. The moniker 120, in turn, returns (146) the object's interface pointer to the client program 104. Whereupon, the client program can directly call (148) member functions on the interface of the named object 80. At this point, the binding process is complete and the moniker 120 is no longer needed by the client program 104 to access the named object 80.

5. Asynchronous Monikers

Figure 6:
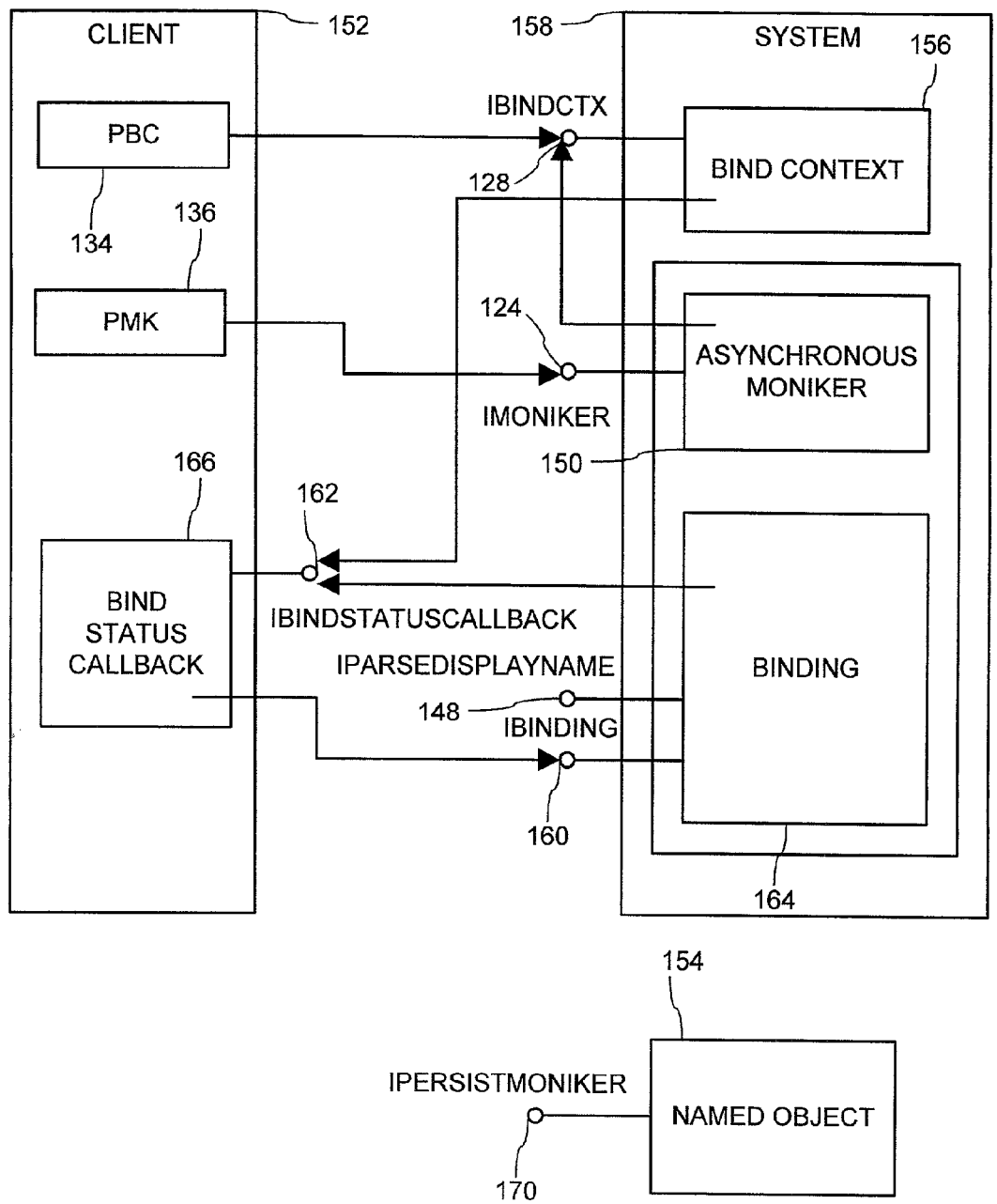
FIG. 6 is a diagram of a client program using an asynchronous moniker to bind to a named object.

In an illustrated embodiment of the invention shown in FIG. 6, a client program (hereafter "client") 152 uses an asynchronous moniker 150 to asynchronously bind to a named object 154. The asynchronous moniker 150 is an instance of an asynchronous moniker class which is derived from the moniker class and supports the IMoniker interface 124. Asynchronous binding effectively retrieves data from its source as a background process which allows the client 152 to continue execution. Since the client 152 is not blocked, the client's user interface remains responsive during the binding process. This is particularly useful for loading objects having data from slow sources, such as the Internet and other remote networks with high latency and slow data transfer connections. The client 152 thus is able to more uniformly browse data from fast and slow sources while maintaining the user perception of equivalent responsiveness and quality of service.

Similar to the use of standard OLE monikers described above, the client 152 creates an asynchronous bind context 156, and the asynchronous moniker 150 by calling API functions (specifically, the CreateAsyncBindCtx API function described below, and the MkParseDisplayName API functions described above) provided by an operating system component 158 (specifically a component such as the COM library 114 of FIG. 4, which additionally implements the asynchronous moniker API functions described below). The asynchronous bind context supports IBindCtx interface 128 of the bind context 126 (FIG. 4). The client 152 then calls the BindToObject or BindToStorage function on the IMoniker interface 124 of the asynchronous moniker 150 to initiate the asynchronous binding process.

The asynchronous binding process involves additional communication or "handshaking" between the client 152 and asynchronous moniker 150 not performed in the synchronous binding process by standard OLE monikers (e.g., the moniker 120). In the asynchronous binding process, the asynchronous moniker 150 returns control immediately to the client 152 from the client's call (e.g., call 140 of FIG. 5) to one of the asynchronous moniker's binding functions (e.g., BindToObject and BindToStorage). After the call returns, instantiation of the named object 154 and loading of the object's data proceeds. Meanwhile, the client and asynchronous binding process continue communicating so that the client remains informed of the progress of loading the data and can interrupt or terminate loading of the data.

This handshaking between the client 152 and the asynchronous binding process is effected using two additional interfaces, an IBinding interface 160 and an IBindStatusCallback interface 162. In the illustrated embodiment of the invention, the IBinding interface 160 is an interface of a binding object 164 which is provided by the asynchronous moniker 150. The client 152 implements a bind-status-callback object 166 which supports the IBindStatusCallback interface 162.

Prior to initiating the asynchronous binding process with a call to the IMoniker interface 124 of the asynchronous moniker 150, the client 152 registers its bind-status-callback object 166 with the asynchronous bind context via the RegisterBindStatusCallback API function described more fully below. When the client thereafter calls the IMoniker::BindToObject or IMoniker::BindToStorage function as shown in FIG. 5 and described above, the client 152 passes an interface pointer of the bind context's IBindCtx interface 128 to the asynchronous moniker 150. In the IMoniker::BindToxxx function, the asynchronous moniker 150 looks up the client's bind-status-callback object 164, creates the binding object 164, and hooks together the binding object 164 and the client's bind-status-callback object 166 by passing an interface pointer of the IBinding interface 160 to the bind-status-callback object 166 (with a call to the bind-status-callback object's IBindStatusCallback::OnStartBinding function described more fully below). The asynchronous moniker 150 then returns control to the client 152 from the IMoniker::BindToxxx function, and allows the binding object 164 to proceed with the binding process with the binding object 164 and bind-status-callback object 166 communicating directly.

5.1 Asynchronous and Synchronous Binding Selection.

In the illustrated embodiment, the client 152 can determine whether any particular moniker supports asynchronous binding (i.e., is an asynchronous moniker) by calling an IsAsyncMoniker API function (described below). The client 152 can further control whether the asynchronous moniker 150 performs binding asynchronously or synchronously by setting a BINDF_ASYNCHRONOUS flag when the asynchronous moniker 150 calls an IBindStatusCallback::GetBindInfo function (described below) of the client's bind-status-callback object 166 at the beginning of the bind operation.

When the client 152 specifies asynchronous binding, the asynchronous moniker 150 does not return an object or storage pointer from the client's call to the iMoniker::BindToObject or IMoniker::BindToStorage function. Instead, the asynchronous moniker 150 returns the value, MS_S_ASYNCHRONOUS, and a NULL pointer. The client 152 then waits to receive the requested object or storage from the asynchronous moniker in a call to the client's IBindStatusCallback::OnObjectAvailable or IBindStatusCallback::OnDataAvailable function (described below).

On the other hand, if the client does not set the BINDF_ASYNCHRONOUS flag, the asynchronous moniker synchronously binds the object or storage, and returns the object or storage from the client's call to the asynchronous moniker's IMoniker::BindToObject or IMoniker::BindToStorage function.

5.2 Asynchronous and Synchronous Storage.

In a call to the IBindStatusCallback::OnDataAvailable function (described below) during asynchronous binding to storage, the asynchronous moniker 150 also may return an asynchronous storage object. The asynchronous storage object may allow access to some of the data being bound while the binding is still in progress. The client 152 can choose between two modes for the asynchronous storage object: blocking and non-blocking. If data is not yet available in the blocking mode (the default), the client's call to the asynchronous storage object blocks until the data arrives. In the non-blocking mode, the asynchronous storage object returns an error value, E_PENDING, to the client's call when data is not yet available. In response, the client waits for further notifications to its IBindStatusCallback::OnDataAvailable function before retrying the operation. The client 152 can choose between a synchronous (blocking) and asynchronous (non-blocking) storage by choosing whether or not to set the BINDF_ASYNCSTORAGE flag in the pgrfBINDF value which the client returns from the IBindStatusCallback::GetBindInfo function (described below) to the asynchronous moniker 150.

5.3 Data-pull and Data-push models.

The client 152 can choose between a data-pull and data-push model for driving the asynchronous binding in the asynchronous moniker's IMoniker::BindToStorage function, and receiving asynchronous notifications. In the data-pull model, the client 152 drives the bind operation. The asynchronous moniker 150 only provides data to the client 152 when the client reads the data. Specifically, this means that beyond the asynchronous moniker's first call to the IBindStatusCallback::OnDataAvailable function (described below), the asynchronous moniker 150 will not provide any data to the client unless the client has consumed all of the data that is already available. Because the asynchronous moniker 150 only downloads data as it is requested, the client nevertheless should read the data in a timely manner. In the case of downloading data from Internet for example, the bind operation may fail if the client 152 waits too long before requesting more data.

On the other hand, in a data-push model, the asynchronous moniker 150 will drive the bind operation and continuously notifies the client whenever new data is available (i.e., by calling the client's IBindStatusCallback::OnDataAvailable function). In such cases, the client 152 may choose whether or not to read the data at any point during the bind operation, but the asynchronous moniker continues to drive the bind operation until completion.

5.4 The IBinding Interface.

The IBinding interface 160 is implemented by the asynchronous moniker 150 on the binding object 164, which is a separate object that the asynchronous moniker 150 creates on a per-bind operation basis. The IBinding interface 160 exposes member functions of the binding object 164 which allow control of the bind operation performed by the binding object. The asynchronous moniker 164 provides the client 152 with access to the IBinding interface 160 by passing a pointer of the IBinding interface to the client's bind-status-callback object 166 via a call to the IBindStatusCallback::OnStartBinding function described below.

The IBinding interface 160 is defined as follows:

```
interface IBinding: IUnknown {
    HRESULT Abort(void);
    HRESULT Suspend(void);
    HRESULT Resume(void);
    HRESULT SetPriority([in] LONG nPriority);
    HRESULT GetPriority([out] LONG* pnPriority);
};
```

5.4.1 The IBinding:Abort Function.

The IBinding::Abort member function permanently aborts the bind operation. After aborting the bind operation, the client may still receive some notifications about the binding.

An aborted bind operation will result in a call to the IBindStatusCallback::OnStopBinding function (described below) with a corresponding error code. Alternatively, the aborted bind operation results in a failure of the client's call to the IMoniker::BindToObject/BindToStorage function in the situation where that call has not previously returned. At this point the bind operation is officially complete and the client must release any pointers obtained during the binding.

The return values of the illustrated IBinding::Abort function are shown in the following table:

TABLE 2

Return Values of the IBinding::Abort Function.

| Argument | Type | Description |
| --- | --- | --- |
| Returns | S_OK | Success |
|  | S_FALSE | The bind operation was already aborted. |
|  | E_FAIL | The bind operation could not be aborted. |

5.4.2 The IBinding::Suspend Function.

The IBinding::Suspend function suspends the bind operation. The bind operation will be suspended until resumed by a later call to the IBinding::Resume function or canceled by a call to the IBinding::Abort function. After calling IBinding::Suspend the client may still receive some notifications about the bind operation.

The return values of the illustrated IBinding::Suspend Function are shown in the following table:

TABLE 3

IBinding::Suspend Function Return Values

| Argument | Type | Description |
| --- | --- | --- |
| Returns | S_OK | Success |
|  | S_FALSE | The bind operation was already suspended. |
|  | E_FAIL | The bind operation could not be suspended. |

5.4.3 The IBinding::Resume Function.

The IBinding::Resume function resumes a suspended bind operation. The bind operation must have been previously suspended by a call to the IBinding::Suspend function. The return values of the illustrated IBinding::Suspend function are shown in the following table:

TABLE 4

Return Values of the IBinding::Resume Function.

| Argument | Type | Description |
| --- | --- | --- |
| Returns | S_OK | Success |
|  | S_FALSE | The bind operation was not previously suspended. |
|  | E_FAIL | The suspended bind operation could not be resumed. |

5.4.4 The IBinding::SetPriority Function.

The IBinding::SetPriority function establishes the priority for the bind operation according to an input parameter, nPriority. The priority values are taken from the Microsoft Corporation's Win32 thread priority APIs (SetThreadPriority and GetThreadPriority). The final priority is determined from values gathered from all clients of the bind operation. The parameter and return values of the illustrated IBinding::SetPriority function are shown in the following table.

TABLE 5

IBinding::SetPriority Function Parameters and Return Values.

| Argument | Type | Description |
| --- | --- | --- |
| nPriority | LONG | A value indicating the priority to establish for this binding relative to other bindings and the system. |
| Returns | S_OK | Success. |
|  | E_FAIL | The priority could not be changed. |

5.4.5 The IBinding::GetPriority Function.

The IBinding::GetPriority function retrieves the current priority of the bind operation. The priority values are taken from the Win32 thread priority APIs (SetThreadPriority and GetThreadPriority). The parameters and return values of the illustrated function are shown in the following table.

TABLE 5

IBinding::GetPriority Function Parameters and Return Values.

| Argument | Type | Description |
| --- | --- | --- |
| pnPriority | LONG* | Location to return a value indicating the priority established for this binding relative to other bindings and the system. May not be NULL. |

TABLE 5-continued

IBinding::GetPriority Function Parameters and Return Values.

| Argument | Type | Description |
|---|---|---|
| Returns | S_OK | Success. |
| | E_INVALIDARG | The pnPriority argument is invalid. |

5.5 The IBindStatusCallback Interface.

The IBindStatusCallback interface 162 exposes member functions of the bind-status-callback object 166 provided by the client 152. These members functions are called by the asynchronous moniker 150 and binding object 164 to provide notifications to the client 152 relating to the bind operation, e.g., the bind operation's status and progress updates. The asynchronous moniker 150 calls the notification member functions of the IBindStatusCallback in the IMoniker::BindToObject and BindToStorage functions, and the binding object 164 will continue to call the notification member functions in an asynchronous bind operation after the asynchronous moniker returns from the BindToObject or BindToStorage function.

The asynchronous moniker 150 also calls two member functions, the GetBindInfo and GetPriority functions (described below), to receive additional information for the bind operation from the client 152. In its BindToObject or BindToStorage function, the asynchronous moniker calls the IBindStatusCallback::GetBindInfo function (described below) to check at least the BINDF_ASYNCHRONOUS flag which indicates whether to perform the bind operation asynchronously. The asynchronous moniker 150 also may call the IBindStatusCallback::GetPriority to set the priority of the bind operation. Further, the asynchronous moniker 150 may call the IBindStatusCallback::QueryInterface function to request an interface pointer of a further interface of the client through which the asynchronous moniker can obtain further information or access additional or extended services.

In the illustrated embodiment, the client 152 provides the bind-status-callback object 166 in association with a specific bind operation. The caller of the member functions exposed through the IBindStatusCallback interface thus need not pass information identifying the specific bind operation.

The client 152 registers the IBindStatusCallback interface of its bind-status-callback object 166 into the asynchronous bind context by calling the RegisterBindStatusCallback API function described below. Multiple clients can register with this API function for the same bind operation. Further, each client can specify receiving calls to only particular ones of the IBindStatusCallback interface's member functions from the asynchronous moniker 150 and binding object 164 which perform the bind operation. The asynchronous moniker 150, however, may set any arbitrary order and limits on the clients that receive notifications on particular IBindStatusCallback interface member functions. The asynchronous moniker 150 retrieves interface pointers of the IBindStatusCallback interfaces which are registered for a particular bind operation from the asynchronous bind context in its IMoniker::BindToObject or BindToStorage member functions.

If the asynchronous moniker 150 invokes other monikers as part of the bind operation, the asynchronous moniker may register its own IBindStatusCallback interface (not shown) in the asynchronous bind context to receive notification from the other moniker. The notifications through the IBindStatusCallback interfaces of more than one moniker involved in a bind operation can thus be chained to provide consolidated progress notifications.

The definition of the IBindStatusCallback interface 162 and related data structures is as follows:

```
typedef enum {
    BINDVERB_GET,
    BINDVERB_POST,
    BINDVERB_PUT,
    BINDVERB_CUSTOM
}BINDVERB;
typedef enum {
    BINDINFOF_URLENCODESTGMEDDATA,
    BINDINFOF_URLENCODEDEXTRAINFO,
}BINDINFOF;
typedef struct tagBINDINFO {
    ULONG           cbSize;
    LPWSTR          szExtraInfo;
    STGMEDIUM       stgmedData;
    DWORD           grfBindInfoF;
    DWORD           dwBindVerb;
    LPWSTR          szCustomVerb;
}BINDINFO;
typedef enum {
    BSCO_ONSTARTBINDING,
    BSCO_GETPRIORITY,
    BSCO_ONLOWRESOURCE,
    BSCO_ONPROGRESS,
    BSCO_ONSTOPBINDING,
    BSCO_GETBINDINFO,
    BSCO_ONDATAAVAILABLE,
    BSCO_ONOBJECTAVAILABLE,
    BSCO_ALLONIBSC
}BSCO_OPTION;
typedef enum {
    BINDF_ASYNCHRONOUS,
    BINDF_ASYNCSTORAGE,
    BINDF_PULLDATA,
    BINDF_GETNEWESTVERSION,
    BINDF_NOWRITECACHE
}BINDF;
typedef enum tagBSCF {
    BSCF_FIRSTDATANOTIFICATION,
    BSCF_LASTDATANOTIFICATION,
    BSCF_INTERMEDIATEDATANOTIFICATION
}BSCF;
typedef enum tagBINDSTATUS {
    BINDSTATUS_FINDINGRESOURCE,
    BINDSTATUS_CONNECTING,
    BINDSTATUS_REDIRECTING,
    BINDSTATUS_BEGINDOWNLOADDATA,
    BINDSTATUS_DOWNLOADINGDATA,
    BINDSTATUS_ENDDOWNLOADDATA
}BINDSTATUS;
interface IBindStatusCallback : IUnknown {
    HRESULT GetBindInfo([out] DWORD* pgrfBINDF, [in,
        out] BINDINFO* pbindinfo);
    HRESULT OnStartBinding([in] DWORD grfBSCOption,
        [in] IBinding* pbinding);
    HRESULT GetPriority([out] LONG* pnPriority);
    HRESULT OnProgress([in] ULONG ulProgress, [in]
        ULONG ulProgressMax, [in] ULONG
        ulStatusCode,[in] LPCWSTR szStatusText);
    HRESULT OnDataAvailable([in] DWORD grfBSC, [in]
        DWORD dwSize,[in] FORMATETC*
        pformatetc, [in] STGMEDIUM* pstgmed);
    HRESULT OnObjectAvailable([in] REFIID riid, [in]
        IUnknown *punk);
    HRESULT OnLowResource([in]DWORD
        dwReserved);
    HRESULT OnStopBinding([in] HRESULT hrStatus, [in]
        LPCWSTR szStatusText);
};
```

5.5.1 The BINDVERB Enumeration.

The BINDVERB enumeration defines values that are passed to the client 152 with the IBindStatusCallback::

GetBindInfo function to distinguish different types of bind operations. The illustrated BINDVERB enumeration values are shown in the following table:

TABLE 6

BINDVERB Enumeration Values.

| Value | Description |
| --- | --- |
| BINDVERB_GET | Perform a "get" operation (the default). The stgmedData member of the BINDINFO should be set to TYMED_NULL. |
| BINDVERB_POST | Perform a "post" operation. The data to post should be specified in the stgmedData member of the BINDINFO. |
| BINDVERB_PUT | Perform a "put" operation. The data to put should be specified in the stgmedData member of the BINDINFO. |
| BINDVERB_CUSTOM | Perform a custom operation (protocol specific, see szCustomVerb member of BINDINFO). The data to use should be specified in the stgmedData member of the BINDINFO. |

5.5.2 The BINDINF OF Enumeration.

The BINDINF OF enumeration defines values that are passed to the client 152 within the IBindStatusCallback::GetBindInfo function to specify additional flags for controlling the bind operation. The values in the illustrated embodiment are shown in the following table.

TABLE 7

BINDINFOF Enumeration Values.

| Value | Description |
| --- | --- |
| BINDINFOF_URLENCODESTGMEDDATA | Use URL encoding to pass is the data provided in the stgmedData member of the BINDINFO. (for PUT and POST operations) |
| BINDINFOF_URLENCODEEXTRAINFO | Use URL encoding to pass is the data provided in the szExtraInfo member of the BINDINFO. |

5.5.3 The BINDINFO Structure.

The BINDINFO structure is returned to the asynchronous moniker 150 from the asynchronous moniker's call to the IBindStatusCallback::GetBindInfo function. The client 152 of the asynchronous moniker 150 uses this structure to qualify the bind operation. The meaning of this structure generally is specific to the class of the asynchronous moniker 150. The following table summarizes the meaning of the data values in the structure for the illustrated URL moniker class of asynchronous moniker described below.

TABLE 8

BINDINFO Structure Members.

| Member | Type | Description |
| --- | --- | --- |
| cbSize | ULONG | Size of this structure, in bytes. |
| szExtraInfo | LPWSTR | The behavior of this field is moniker-specific. For URL monikers, this string is appended to the URL when the bind operation is started. Note: like all other OLE strings, this is a Unicode string that the client should allocate using CoTaskMemAlloc. The URL Moniker will free the memory later. |
| stgmedData | STGMEDIUM | Data to be PUT or POST. |
| grfBindInfoF | DWORD | Flag from the BINDINFOF enumeration specifying additional flags modifying the bind operation. (URL specific |
| dwBindVerb | DWORD | A value from the BINDVERB enumeration specifying the action to be performed for the bind operation. |
| szCustomVerb | LPWSTR | String specifying a protocol specific custom verb to be used for the bind operation (only if grfBindInfoF is set to BINDINFOF_CUSTOM) |

5.5.4 The BSCO OPTION Enumeration.

The BSCO_OPTION enumeration defines values which the client 152 passes into the asynchronous bind context using the RegisterBindStatusCallback API function when registering a callback for a bind operation. The values identify what binding callback notifications the client 152 receives from the asynchronous moniker 150. Clients can specify only the BSCO_ONDATAAVAILABLE flag to receive only the data bits of the object 154 being bound. The flags in the illustrated embodiment are shown in the following table.

TABLE 9

BSCO_OPTION Enumeration Flags.

| Flag | Description |
| --- | --- |
| BSCO_ONSTARTBINDING | The client would like to receive the OnStartBinding callback. |
| BSCO_GETPRIORITY | The client would like to receive the GetPriority callback. |
| BSCO_ONLOWRESOURCE | The client would like to receive the OnLowResource callback. |
| BSCO_ONPROGRESS | The client would like to receive the OnProgress callback. |
| BSCO_ONSTOPBINDING | The client would like to receive the OnStopBinding callback. |
| BSCO_ONGETBINDINFO | The client would like to receive the OnGetBindInfo callback. |
| BSCO_ONDATAAVAILABLE | The client would like to receive the OnDataAvailable callback. |
| BSCO_ONOBJECTAVAILABLE | The client would like to receive the OnObjectAvailable callback. |
| BSCO_ALLONIBSC | The client would like to receive all callbacks. |

5.5.5 The BINDF Enumeration.

The BINDF enumeration defines flags that are returned to the binding object 164 from the client's IBindStatusCallback::OnStartBinding function. The flags identify what type of binding the asynchronous moniker 150 is to perform. The flags in the illustrated embodiment are shown in the following table.

TABLE 10

BINDF Enumeration Flags.

| Flag | Description |
| --- | --- |
| BINDF_ASYNCHRONOUS | The moniker should return immediately from IMoniker::BindToStorage or IMoniker::BindToObject. The actual result of the object bind or the data backing the storage will arrive asynchronously in calls to |

TABLE 10-continued

BINDF Enumeration Flags.

| Flag | Description |
|---|---|
| | IBindStatusCallback::OnDataAvailable or IBindStatusCallback::OnObjectAvailable. If the client does not choose this flag, the bind operation will be synchronous, and the client will not receive any data from the bind operation until the IMoniker::BindToXXX call returns. |
| BINDF_ASYNCSTORAGE | The client of IMoniker::BindToStorage prefers that the IStorage and IStream objects returned in IBindStatusCal back::OnDataAvailable return E_PENDING when they reference data not yet available through I/O methods, rather than blocking until the data becomes available. This flag applies only to BINDF_ASYNCHRONOUS operations. |
| BINDF_PULLDATA | When this flag is specified, the asynchronous moniker will allow the client of IMoniker::BindToStorage to drive the bind operation by pulling the data, (rather than having the moniker driving the operation and pushing the data upon the client). Specifically, when this flag is chosen, new data will only be read/downloaded after the client finishes reading all data that is currently available. This means data will only be downloaded for the client after the client does an IStream::Read operation that blocks or returns E_PENDING. When the client chooses this flag, it must be sure to read all the data it can, even data that is not necessarily available yet. When this flag is not specified, the moniker will continue downloading data and will call the client with IBindStatusCallback::OnDataAvailable whenever new data is available. This flag applies only to BINDF_ASYNCHRONOUS bind operations. |
| BINDF_GETNEWESTVERSION | The moniker bind operation should retrieve the newest version of the data/object possible. |
| BINDF_NOWRITECACHE | The moniker bind operation should not store retrieved data in the disk cache. |

5.5.6 The BSCF Enumeration.

The BSCF enumeration defines flags that are passed to the client 152 by the asynchronous moniker 150 in a call to the client's IBindStatusCallback::OnDataAvailable function to clarify the type of data which is available. The flags in the illustrated embodiment are shown in the following table.

TABLE 11

BSCF Enumeration Flags.

| Flag | Description |
|---|---|
| BSCF_FIRSTDATANOTIFICATION | Identifies the first call to IBindStatusCallback::OnDataAvailable for a given bind operation. |
| BSCF_LASTDATANOTIFICATION | Identifies the last call to IBindStatusCallback::OnDataAvailable for a bind operation. |
| BSCF_INTERMEDIATE-DATANOTIFICATION | Identifies an intermediate call to IBindStatusCallback::OnDataAvailable for a bind operation. |

5.5.7 The BINDSTATUS Enumeration.

The asynchronous moniker 150 passes a single status value from the BINDSTATUS enumeration as the ulStatusCode parameter to the IBindStatusCallback::OnProgress function to inform the client 152 about the progress of the bind operation. The status values in the illustrated embodiment are shown in the following table.

TABLE 12

BINDSTATUS Enumeration Status Values.

| Status Value | Description |
|---|---|
| BINDSTATUS_FINDINGRESOURCE | The bind operation is finding the resource that holds the object or storage being bound to. The szStatusText accompanying IBindStatusCallback::OnProgress ( ) provides the display name of the resource being searched for (e.g. "www.microsoft.com"). |
| BINDSTATUS_CONNECTING | The bind operation is connecting to the resource that holds the object or storage being bound to. The szStatusText accompanying IBindStatusCallback::OnProgress ( ) provides the display name of the resource being connected to (e.g. "www.microsoft.com"). |
| BINDSTATUS_REDIRECTING | The bind operation has been redirected to a different data location. The szStatusText accompanying IBindStatusCallback::OnProgress ( ) provides the display name of the new data location. |
| BINDSTATUS_BEGINDOWNLOADDATA | The bind operation has begun receiving the object or storage being bound to. The szStatusText accompanying IBindStatusCallback::OnProgress ( ) provides the display name of the data location. |
| BINDSTATUS_DOWNLOADINGDATA | The bind operation continues to receive the object or storage being bound to. The szStatusText accompanying IBindStatusCallback::OnProgress ( ) provides the display name of the data location. |
| BINDSTATUS_ENDDOWNLOADDATA | The bind operation has finished receiving the object or storage being bound to. The szStatusText accompanying IBindStatusCallbaCk::OnProgress ( ) provides the display name of the data location. |

5.5.8 The IBindStatusCallback::QueryInterface Function.

The asynchronous moniker 150 calls the IBindStatusCallback::QueryInterface function to query the client 152 for access to an interface which exposes additional services necessary for completing the bind operation. This function provides extensibility to the IBindStatusCallback interface, because it allows querying the client for new interfaces for passing information or querying information. The IEnumFormatEtc interface of URL monikers described below is an example of additional client services that can be made available through this function. The parameters and return values of the illustrated function are shown in the following table.

TABLE 13

IBindStatusCallback::QueryInterface Parameters and Return Values.

| Parameter | Type | Description |
|---|---|---|
| riid | REFIID | The REFIID for the interface for the requested service. |
| ppvObject | void * | The interface returned by the client. |

TABLE 13-continued

IBindStatusCallback::QueryInterface Parameters and Return Values.

| Parameter | Type | Description |
|---|---|---|
| Returns | S_OK | Success. The interface returned is used by the moniker to communicate further information pertaining to the bind operation. |
|  | E_NOINTERFACE | The client does not know how to support the requested interface. Note: if none of the callbacks registered for a particular bind operation return S_OK to this call, the bind operation will perform default action. |
|  | E_OUTOFMEMORY | Out of memory. |
|  | E_INVALIDARG | One or more arguments are invalid. |

5.5.9 The IBindStatusCallback::GetBindInfo Function.

The asynchronous moniker 150 calls the IBindStatusCallback::GetBindInfo function to obtain information from the client 152 pertaining to the bind operation. The asynchronous moniker 150 calls this method within its implementations of the IMoniker::BindToObject and BindToStorage functions before returning. The parameters and return values of the illustrated function are shown in the following table.

TABLE 14

IBindStatusCallback::GetBindInfo Parameters and Return Values.

| Argument | Type | Description |
|---|---|---|
| pgrfBINDF | DWORD* | Location to return a value taken from the BINDF enumeration which indicates whether the bind should proceed synchronously or asynchronously. |
| pbindinfo | BINDINFO* | Location to return the BINDINFO structure which describes how the caller wants the binding to occur. |
| Returns | S_OK | Success. |
|  | E_INVALIDARG | One or more arguments are invalid. |

5.5.10 The IBindStatusCallback::OnStartBinding Function.

The asynchronous moniker 150 also calls the IBindStatusCallback::OnStartBinding function while initiating the bind operation within its implementation of the IMoniker::BindToStorage or IMoniker::BindToObject functions. In this call, the asynchronous moniker 150 notifies the client 152 which of the IBindStatusCallback function the client is registered to receive in response to the callback function notification flags the client requested when registering its IBindStatusCallback interface with the asynchronous bind context using the RegisterBindStatusCallback API function described below.

In its call to this function, the asynchronous moniker 150 also passes an interface pointer of the IBinding interface 160 of the binding object 164 associated with the current bind operation to the client 152. As detailed above, the IBinding interface 160 allows the client 152 to exert control over the bind operation by calling the member functions on the IBinding interface of the binding object. The client's bind-status-callback object 166 stores the IBinding interface pointer and maintains accurate reference counting by calling the standard OLE AddRef and Release functions on the IBinding interface in accordance with OLE conventions.

The parameters and return values of the illustrated IBindStatusCallback::OnStartBinding function are shown in the following table.

TABLE 15

IBindStatusCallback::OnStartBinding Parameters and Return Values.

| Argument | Type | Description |
|---|---|---|
| grfBSCOption | DWORD | Flags from the BSC_OPTION enumeration that specify what callback notifications the client is registered for receiving. |
| pbinding | IBinding* | The IBinding interface of the current bind operation. May not be NULL. The client should call AddRef( ) on this pointer if it wishes to keep a reference to the binding object. |
| Returns | S_OK | Success. |
|  | E_INVALIDARG | The pbinding argument is invalid. |

5.5.11 The IBindStatusCallback::GetPriority Function.

Typically, the asynchronous moniker 150 calls the IBindStatusCallback::GetPriority function to obtain the priority of the bind operation prior to initiating asynchronous binding by the binding object 164. Additionally, the function may be called at any time during the bind operation if the asynchronous moniker 150 needs to make new priority decisions. The asynchronous moniker 150 can use the priority to set the actual priority of a thread associated with a download operation (i.e., the thread executing the binding object 164), but more commonly the asynchronous moniker interprets the priority to perform its own a scheduling among multiple bind operations. The parameter and return values of the illustrated function are shown in the following table.

TABLE 16

IBindStatusCallback::GetPriority Parameters and Return Values.

| Argument | Type | Description |
|---|---|---|
| pnPriority | LONG* | Location to return a value indicating the priority of this download. Priorities may be any of the constants defined for prioritizing threads in Microsoft's Win32 API. |
| Returns | S_OK | Success. |
|  | E_INVALIDARG | One or more arguments are invalid. |

5.5.12 The IBindStatusCallback::OnProgress Function.

The binding object 164 calls the IBindStatusCallback::OnProgress function repeatedly to indicate the current progress of the bind operation, preferably at reasonable intervals during a lengthy bind operation. The client 152 may use the progress notification to provide progress information to the user, such as by displaying a "% complete" bar graph, a download status notification message or like progress indicating user interface control. The client 152 also may use the progress notification to make programmatic decisions based on the ulStatusCode parameter. The parameters and return values of the illustrated function are shown in the following table.

TABLE 17

IBindStatusCallback::OnProgress Parameters and Return Values.

| Argument | Type | Description |
| --- | --- | --- |
| ulProgress | ULONG | Indicates the current progress of the bind operation relative to the expected maximum indicated in ulProgressMax. |
| ulProgressMax | ULONG | Indicates the expected maximum value of ulProgress for the duration of calls to OnProgress for this operation. Note that this value may change across invocations of this method. |
| ulStatusCode | ULONG | Provides additional information regarding the progress of the bind operation. Valid values are taken from the BINDSTATUS enumeration. |
| szStatusText | LPCWSTR | Information about the current progress, depending on the value of ulStatusCode as defined for the BINDSTATUS enumeration described above. |
| Returns | S_OK | Success. |
|  | E_INVALIDARG | One or more arguments are invalid. |

5.5.13 The IBindStatusCallback::OnDataAvailable Function.

During asynchronous binding using the asynchronous moniker's IMoniker::BindToStorage function, the asynchronous moniker 150 calls the IBindStatusCallback::OnDataAvailable function to provide data to the client 152 as it becomes available. As described above, the behavior of the storage passed to the client 152 by the asynchronous moniker 150 in the pstgmed parameter depends on the BINDF flags that the client returned from the IBindStatusCallback::GetBindInfo function. More particularly, the storage may be asynchronous or blocking. Further, the bind operation may follow a "data pull" model or a "data push" model. For the data pull model, the client is not able to seek backwards in the data stream provided by the asynchronous moniker in the IBindStatusCallback::OnDataAvailable call. On the other hand, for push model bind operations, the client 152 commonly can seek back into a data stream and read any data that has been downloaded for an ongoing IMoniker::BindToStorage operation.

The parameters and return values of the illustrated IBindStatusCallback::OnDataAvailable function are shown in the following table.

TABLE 18

Parameters and Return Values of the IBindStatusCallback::OnDataAvailable Function.

| Argument | Type | Description |
| --- | --- | --- |
| grfBSCF | DWORD | Values taken from the BSCF enumeration. |
| dwSize | DWORD | The amount (in bytes) of total data available from the current bind operation. |
| pfmtetc | FORMATETC* | Indicates the format of the available data when called as a result of IMoniker::BindToStorage. If there is no format associated with the available data, pformatetc may contain CF_NULL. |

TABLE 18-continued

Parameters and Return Values of the IBindStatusCallback::OnDataAvailable Function.

| Argument | Type | Description |
| --- | --- | --- |
| pstgmed | STGMEDIUM* | Holds the actual data that became available when called as a result of IMoniker: BindToStorage. If it wishes to keep the data in pstgmed allocated, the client should call AddRefo( ) on pstgmed->pUnkForRelease (if the pointer is non-NULL). |
| Returns | S_OK | Success. |
|  | E_INVALIDARG | One or more arguments are invalid. |

5.5.14 The IBindStatusCallback::OnObjectAvailable Function.

During asynchronous binding using the asynchronous moniker's IMoniker::BindToObject function, the asynchronous moniker 150 calls the IBindStatusCallback::OnObjectAvailable function to pass the requested object interface pointer to the client 152. The asynchronous moniker 150 never calls this function for asynchronous binding performed using the IMoniker::BindToStorage function. The parameters and return values of the illustrated IBindStatusCallback::OnObjectAvailable function are shown in the following table.

TABLE 19

Parameters and Return Values of the IBindStatusCallback::OnObjectAvailable Function.

| Argument | Type | Description |
| --- | --- | --- |
| riid | REFIID | The REFIID of the requested interface. |
| punk | IUnkown* | The object pointer requested in the call to IMoniker::BindToObject. The client should call AddRef( ) on this pointer in order to maintain a reference to the object. |
| Returns | S_OK | Success. |
|  | E_INVALIDARG | One or more arguments are invalid. |

5.5.15 The IBindStatusCallback::OnLowResource Function.

The asynchronous moniker 150 calls this function when it detects low resources. The client 152 should free any resource it no longer needs when receiving this notification. The illustrated function's parameters and return values are shown in the following table.

TABLE 20

BindStatusCallback::OnLowResource Parameters and Return Values.

| Argument | Type | Description |
| --- | --- | --- |
| dwReserved | DWORD | Reserved for future use. Must be zero. |
| Returns | S_OK | Success. |

5.5.16 The IBindStatusCallback::OnStopBinding Function.

The asynchronous moniker 150 calls IBindStatusCallback::OnStopBinding function to indicate the end of the bind operation. This function is always called, whether the bind operation succeeded, failed, or was aborted by the client 152. When this function is called, the client 152 must call the Release function on the IBinding interface pointer it received in the asynchronous moniker's call to the IBind- StatusCallback::OnStartBinding function. The parameters and return values of the illustrated IBindStatusCallback::OnStopBinding function are shown in the following table.

TABLE 21

IBindStatusCallback::OnStopBinding function

| Argument | Type | Description |
| --- | --- | --- |
| hrStatus | HRESULT | Status code which would have been returned from the method that initiated the bind operation (IMoniker::BindToObject or IMoniker::BindToStorage). |
| szStatusText | LPCWSTR | Status text. In case of error, this string may provide additional information describing the error. In case of success, szStatusText provides the friendly name of the data location bound to. |
| Returns | S_OK | Success. |

5.6 The IPersistMoniker Interface.

The object 154 which is named by the asynchronous moniker can support an IPersistMoniker interface 170 to obtain more control over the way the object is bound to its persistent data. When instantiating and initializing the named object 154 in the IMoniker::BindToObject function, the asynchronous moniker 150 queries the named object for persistence interfaces, such as the IPersistMoniker Interface 170 or the standard OLE IPersistFile, IPersistStream[Init], or IPersistStorage interfaces, which the asynchronous moniker then utilizes in the bind operation to load the object's persistent data. In the illustrated embodiment, the asynchronous moniker 150 uses the highest precedence interface supported by the object in the following order: IPersistMoniker, IPersistStream[Init], IPersistStorage, IPersistFile, IPersistMemory.

The IPersistMoniker interface 170 allows monikers and other application programs which instantiate objects from persistent data to give control to the object 154 to choose how the object is bound to its persistent data. The object 154 can implement a IPersistMoniker::Load function (described below) with code that calls IMoniker::BindToStorage on a moniker that names the object's persistent state and specifies a preferred interface and binding options, such as Istorage, IStream, asynchronously bound, etc.

5.6.1 The IPersistMoniker::IsDirty Function.

The IPersistMoniker::IsDirty function checks whether the persistent state of the object has changed since it was last saved. The illustrated function's return values are shown in the following table.

TABLE 22

IPersistMoniker::IsDirty Return Values.

| Argument | Type | Description |
| --- | --- | --- |
| Returns | S_OK | Yes, the object has changed since it was last saved. |
|  | S_FALSE | No, the object has not changed since it was last saved. |

5.6.2 The IPersistMoniker::Load Function.

The IPersistMoniker::Load function loads the object with its persistent state referred to by a parameter, pmkSrc. The implementation of the IPersistMoniker::Load function in the illustrated object immediately binds to its persistent state with the call, pmkSrc->BindToStorage(pbc, . . . ), specifying either IStream or IStorage as the interface pointer parameter of the call. The following table summarizes the parameters and return values of the illustrated IPersistMoniker::Load function.

TABLE 23

IPersistMoniker::Load Parameters and Return Values.

| Argument | Type | Description |
| --- | --- | --- |
| fFullyAvailable | BOOL | The data referred to by the moniker has already been loaded once, subsequent binding to the moniker should be very fast. |
| pmkSrc | IMoniker* | A reference to the persistent state to initialize this object from. |
| pbc | IBindCtx* | The bind context to use for any moniker binding during this method. |
| grfMode | DWORD | A combination of the values from the STGM enumeration which indicate the access mode to use when binding to the persistent state. The IPersistMoniker::Load method can treat this value as a suggestion, adding more restrictive permissions if necessary. If grfMode is zero, the implementation should bind to the persistent state using default permissions. |
| Returns | S_OK | Success. |
|  | E_INVALIDARG | One or more arguments are invalid. |

5.6.3 The IPersistMoniker::Save Function.

The IPersistMoniker::Save function is called to request that the object 154 save itself into the location referred to by the moniker pointer parameter, pmkDst. The illustrated function's parameters and return values are shown in the following table.

TABLE 24

IPersistMoniker::Save Parameters and Return Values.

| Argument | Type | Description |
| --- | --- | --- |
| pmkDst | IMoniker* | Moniker to the location where the object should persist itself. The object typically binds to the location using pmkDst->BindToStorage for either IStream or IStorage. May be NULL, in which case the object is requested to save itself to the same location referred to by the moniker passed to it in IPersistMoniker::Load. This may act as an optimization to prevent the object from binding, since it has typically already bound to the moniker it was loaded from. |
| pbc | IBindCtx* | The bind context to use for any moniker binding during this method. |
| fRemember | BOOL | Indicates whether pmkDst is to be used as the reference to the current persistent state after the save. If TRUE, pmkDst becomes the reference to the current persistent state and the object should clear its dirty flag after the save. If FALSE, this save operation is a "Save A Copy As . . ." operation. In this case, the reference to the current persistent state is unchanged and the object should not clear its dirty flag. If pmkDst is NULL, the implementation should ignore the fRemember flag. |
| Returns | S_OK | Success. |
|  | E_INVALIDARG | One or more arguments are invalid. |

5.6.4 The IPersistMoniker::SaveCompleted

Calling this function notifies the object that it has been completely saved and points the object to its new persisted state. The implementation of this function in the illustrated object 154 immediately bind to the object's persistent state using the code, pmkNew->BindToStorage(pbc, . . . ), and specifying either IStream or IStorage, as in the implementation of IPersistMoniker::Load function. The parameters and return values of the illustrated IPersistMoniker::SaveCompleted function are shown in the following table.

TABLE 25

IPersistMoniker::SaveCompleted Parameters and Return Values.

| Argument | Type | Description |
| --- | --- | --- |
| pmkNew | IMoniker* | The moniker to the object's new persistent state, or NULL as an optimization if the moniker to the object's new persistent state is the same as the previous moniker to the object's persistent state only allowed if there was a prior call to IPersistMoniker::Save with fRemember=TRUE - in which case the object need not rebind to pmkNew. |
| pbc | IBindCtx* | The bind context to use for any moniker binding during this method. |
| Returns | S_OK | Success. |
|  | E_INVALIDARG | One or more arguments are invalid. |

5.6.5 The IPersistMoniker::GetCurMoniker Function.

This function is used to retrieve the moniker that refers to the object's persistent state. Typically, this is the moniker last passed to the object via IPersistMoniker::Load, IPersistMoniker::Save or IPersistMoniker::SaveCompleted. The parameter and return values of the illustrated IPersistMoniker::GetCurMoniker function are shown in the following table.

TABLE 26

IPersistMoniker::GetCurMoniker Parameter and Return Value.

| Argument | Type | Description |
| --- | --- | --- |
| ppmkCur | IMoniker** | Location to return the moniker to the object's current persistent state. |
| Returns | S_OK | Success. |
|  | E_INVALIDARG | The ppmkGur argument is invalid. |

5.7 API Functions for Asynchronous Monikers.

For use in asynchronous binding using the asynchronous moniker 150, the system 158 provides several API functions described below.

5.7.1 The CreateAsyncBindCtx API Function.

The system 158 provides a CreateAsyncBindCtx API function having the following form:

HRESULT CreateAsyncBindCtx(dwReserved, pbsc, grfBSCOption, penumfmtetc, ppbc);

The client 152 calls the CreateAsyncBindCtx API function to create an asynchronous bind context for use with the asynchronous moniker 150. The CreateAsyncBindCtx API function automatically registers the IBindStatusCallback interface 162 and the IEnumFORMATETC interface (described below) with the asynchronous bind context. The grfBSCOption parameter allows the client 152 to specify flags that determine which of the IBindStatusCallback interface's notification functions the client is capable of receiving. The client 152 can implement some notification callback functions that it does not use as empty function stubs (which return the E_NOTIMPL value). The client 152 then specifies not to receive notifications to the unimplemented IBindStatusCallback functions in the bind context registration. As a result, the asynchronous moniker 150 will not call those functions during asynchronous binding.

The parameters and return values of the illustrated CreateAsyncBindCtx API function are shown in the following table.

TABLE 27

CreateAsyncBindCtx API Function Parameters and Return Values.

| Argument | Type | Description |
| --- | --- | --- |
| dwReserved | DWORD | Reserved for future use. Must be zero. |
| pbsc | IBindStatusCallback* | The callback to receiving data availability and progress notification. |
| grfBSCOption | DWORD | Flags from the BSC_OPTION enumeration, specifying which callback methods should be called. |
| penumfmtetc | IEnumFORMATETC* | Enumerator of formats to use for format negotiation during binding, if applicable. May be NULL, in which case the caller is not interested in format negotiation during binding and the default format of the object will be bound to. |
| ppbc | IBindCtx** | Location to return the new bind-context. |
| Returns | S_OK | Success. |
|  | E_OUTOFMEMORY | Out of memory. |
|  | E_INVALIDARG | One or more arguments are invalid. |

5.7.2 The RegisterBindStatusCallback API Function.

The system 158 provides a RegisterBindStatusCallback API function having the following form.

HRESULT RegisterBindStatusCallback(pbc, pbsc, grfBSCOption, dwReserved);

The client 152 call the RegisterBindStatusCallback API function to register its IBindStatusCallback interface with an existing bind context. The RegisterBindStatusCallback API function also allows the client to specify flags that determine which callback notifications the client is capable of receiving. The client may implement functions for callback notifications that it does not receive as empty function stubs (returning E_NOTIMPL).

This API function allows multiple clients to each register a callback for the same bind context. During the bind operation, these callbacks are called in an arbitrary order, and the asynchronous moniker may set policy and limit certain callback notifications (e.g. GetBindInfo, OnDataAvailable, OnObjectAvailable) to only one of the registered callbacks. For this reason, the client 152 should request to receive only those callback notifications that it implements.

The parameters and return values of the RegisterBindStatusCallback API function in the illustrated embodiment are shown in the following table.

TABLE 28

RegisterBindStatusCallback API Function Parameters and Return Values.

| Argument | Type | Description |
|---|---|---|
| pbc | IBindCtx* | The bind context to register the callback with. |
| pbsc | IBindStatusCallback* | The callback interface to register. |
| grfBSCOption | DWORD | Flags from the BSC_OPTION enumeration, specifying which callback methods should be called. |
| dwReserved | DWORD | Reserved for future extension. |
| Returns | S_OK | Success. |
| | E_OUTOFMEMORY | Insufficient memory to register the callback with the bind context. |
| | E_INVALIDARG | One or more arguments are invalid. |

5.7.3 The RevokeBindStatusCallback API Function.

The system 158 provides a RevokeBindStatusCallback API function having the following form.

HRESULT RevokeBindStatusCallbacko( );

The client 152 calls the RevokeBindStatusCallback API function to revoke a previous IBindStatusCallback interface registration in the asynchronous bind context. This call will not succeed if it is made during a bind operation.

TABLE 29

RevokeBindStatusCallback API Function Parameters and Return Values.

| Argument | Type | Description |
|---|---|---|
| pbc | IBindCtx* | The bind context to revoke the callback from. |
| pbsc | IBindStatusCallback* | The callback interface to revoke. |
| Returns | S_OK | Success. |
| | E_FAIL | The IBindStatusCallback is not registered on the bind context. |
| | E_INVALIDARG | One or more arguments are invalid. |

5.7.4 The IsAsyncMoniker API Function.

The system 158 provides an IsAsyncMoniker API function having the following form.

HRESULT IsAsyncMoniker(pmk);

By calling this API, the client 152 tests whether a moniker supports asynchronous binding. The illustrated asynchronous moniker 150 implementation indicates that it is asynchronous by supporting an IMonikerAsync interface, an "empty" interface which is actually just IUnknown, having the following form.

```
MyCustomMoniker::QueryInterface(REFIID riid, void** ppv) {
    if (riid == IID_IUnknown || riid == IID_IPersistStream || riid
        == IID_IMoniker || riid == IID_IAsyncMoniker) {
        *ppv = this;
        AddRef();
        return S_OK;
    }
    *ppv = NULL;
    return E_NOINTERFACE;
}
```

The implementation of the IsAsyncMoniker API function tests support for this interface by the moniker to determine if it is asynchronous. The parameter and return values of the illustrated IsAsyncMoniker API function are shown in the following table.

TABLE 30

IsAsyncMoniker API Function Parameter and Return Values.

| Argument | Type | Description |
|---|---|---|
| pink | IMoniker* | The moniker to test. |
| Returns | S_OK | Yes, the moniker is asynchronous. |
| | S_FALSE | No, the moniker is not asynchronous. |
| | E_INVALIDARG | The pink argument is invalid. |

6. URL Monikers.

According to the illustrated embodiment of the invention shown in FIG. 7, a client program (hereafter "client") 202 utilizes an URL moniker 200 provided by an operating system component (hereafter "system") 204 (specifically a component such as the COM library 114 which also implements the API functions described above for asynchronous monikers and the API functions described below for URL monikers) to asynchronously bind to an object 208 named by an uniform resource locator (URL). URLs are a well known encoding of names and addresses of resources (e.g., documents, images, and other data) residinvg on the Internet. URLs generally comprise a transport protocol identifier (e.g., "http," "ftp," "gopher," etc.), a site name (e.g., "www" dot "microsoft" dot "com"), and a resource name (e.g., "document.html")., URLs are described in more detail in the following documents currently available from the Internet: Uniform Resource Locators (URL), at the "ds.internic" dot "net" site name, under the resource name "rfc1738.txt" ("the rfc1738 resource"); Relative Uniform Resource Locators, at the "ds.internic" dot "net" site name, under the resource name "rfc11808.txt" ("the rfc11808 resource"); Universal Resource Identifiers in WWW (RFC1630), at the "ds.internic" dot "net" site name, under the resource name "rfc1630.txt" ("the rfc1630 resource"); Names and Addresses, URIs, URLs, URNs, URCs, at the "w3" dot "org" site name, under the resource name "Addressing-.html"; and IETF—Hypertext Transfer Protocol (HTTP) Working Group, at the "ics.uci" dot "edu" site name under the resource name "http" ("the HTTP resource").

The URL moniker 200 is an instance of a class derived from the asynchronous moniker class, and supports the IMoniker interface 124. Since the IMoniker interface 124 is derived from the IPersistStream interface, the URL moniker 200 also supports the IPersistStream, IPersist, and IUnknown interfaces (which are standard OLE interfaces). Also, as described above for the asynchronous moniker 150, the URL moniker 200 supports the IAsyncMoniker interface which is a stub interface that is used to allow the client 202 to determine whether the moniker supports asynchronous binding (which the URL moniker does).

In an asynchronous bind operation, the URL moniker 200 makes use of a transport object 210 which supports the IBinding interface 152 and implements an Internet transport protocol (e.g., HTTP, FTP, or Gopher) associated with the URL of the URL moniker. The illustrated transport object 210 is provided by the system 204, and additionally supports an IBindProtocol interface 212 (described more fully below), the IParseDisplayName interface (described above), and protocol specific interfaces 214 which may be required for interacting with other operating system components involved in downloading data from the Internet (e.g., the "WinSock" or "WinInet" layer of the Windows® 95 operating system).

To support asynchronous binding, the client 202 implements the bind-status-callback object 166 which supports the IBindStatusCallback interface 162, and registers the IBindStatusCallback interface 162 with the asynchronous bind context 156. The illustrated client 202 additionally implements a format enumerator object 220 which supports an IEnumFORMATETC interface 222 for media-type negotiation (described more fully below). The client 202 also registers the IEnumFORMATETC interface 222 with the asynchronous bind context 156.

The client 202 makes use of the URL moniker 200 in a way generally similar to the use of the asynchronous moniker 150 described above. The client 202 creates the asynchronous bind context 156 with a call to the CreateAsyncBindCtx API function (described above) of the system component 204, and registers the IBindStatusCallback interface 162 of its bind-status-callback object 166 in the asynchronous bind context 156 with flags specifying which callback notifications the bind-status-callback object receives from the URL moniker. The client 202 also creates the URL moniker 200, such as by calling the CreateURLMoniker API function (described below) or the MkParseDisplayName API function of the system 204. From creating the asynchronous bind context 156 and the URL moniker 200, the client 202 obtains pointers to the IBindCtx interface 128 and the IMoniker interface 124 which the client stores as pbc and pmk pointer variables 134, 136. The client 202 then calls the IMoniker::BindToObject or IMoniker::BindToStorage functions of the URL moniker and passes an interface pointer of the IBindCtx interface 128 of the asynchronous bind context 156 to the URL moniker 200 to initiate binding to the object named by the URL moniker 200.

In the URL moniker's IMoniker::BindToObject or BindToStorage function, the URL moniker 200 identifies the Internet protocol associated with the URL according to the transport prefix of the URL, and retrieves the IBinding interface 160 of the transport object 210 which implements the associated Internet protocol. The URL moniker 200 also looks up the IBindStatusCallback interface 162 of the bind-status-callback object 166 registered by the client 202 in the asynchronous bind context 156. The URL moniker 200 then passes an interface pointer of the IBinding interface 160 to the bind-status-callback object 166 in a call to the OnStartBinding function on the IBindStatusCallback interface 162. As described above, the client calls functions on the IBinding interface 160 to effect pausing, cancellation, and prioritization of the asynchronous binding operation.

The URL moniker 200 also passes its pointer for the IBindStatusCallback interface 162 to the transport object 210 when initiating the bind operation. During the bind operation, the transport object 210 calls notification functions on the IBindStatusCallback interface 162. In particular, the bind-status-callback object 166 receives progress notification through the IBindStatusCallback::OnProgress function, data availability notification through the IBindStatusCallback::OnDataAvailable function, as well as various other notifications from the transport object 210 about the status of the bind operation.

The URL moniker 200 or transport object 210 may also request extended information from the client 202 via the IBindStatusCallback::QueryInterface function, allowing the client 202 to provide protocol-specific information that will affect the bind operation.

6.1 Media-type Negotiation with the URL Moniker.

The URL moniker 200 supports media type negotiation in order to allow clients to negotiate the format of the named object's data to be downloaded in the URL's BindToStorage function (i.e., where the URL moniker downloads the named object's data directly into the computer's secondary storage 42 (FIG. 1), rather than loading the data into the running object 208). The client 202 requests preferred data format(s) using the IEnumFORMATETC interface 222 on the format enumerator object 220. The client 202 creates the format enumerator object 220, and registers the IEnumFORMATETC interface 222 with the asynchronous bind context 156. The client registers the IEnumFORMATETC interface 222 in a call to the CreateAsyncBindCtx API function (described above), or with the RegisterFormatEnumerator API function (described below) as shown in the following example code:

CreateBindCtx(0, &pbc);
RegisterFormatEnumerator(pbc, &enumfmtetc, 0);

The URL moniker 200 obtains an interface pointer to the IEnumFORMATETC interface 222 from the asynchronous bind context 156 when performing a bind operation in the IMoniker::BindToStorage or BindToObject functions. The URL moniker 200 then calls functions on the IEnumFORMATETC interface 222 to obtain the client's preferred data format(s). The client 202 represents the requested preferred format(s) to the URL moniker 200 through FORMATETC data structures (described below) in the format enumerator object 220 which the client makes available from the IEnumFORMATETC interface 222.

Each FORMATETC data structure specifies a clipboard format value identifying a preferred data format (media type), a "NULL" target device value, a "DVASPECT_CONTENT" value, a "lindex" value of –1, and a "TYMED_NULL" value. The clipboard format values are value used by the well known OLE Clipboard protocol for exchanging data between two programs, such as in cut/copy/paste or drag-and-drop operations between programs. An example of code for creating a FORMATETC data structure in the client 202 follows:

```
FORMATETC fmtetc;
fmtetc.cfFormat =
    RegisterClipboardFormat(CF_MIME_POSTSCRIPT);
fmtetc.ptd = NULL;
fmtetc.dwAspect = DVASPECT_CONTENT;
fmtetc.lindex = -1;
fmtetc.tymed = TYMED_NULL;
```

A special clipboard format value, "CF_NULL", can be used by the client 202 in a FORMATETC data structure to indicate that the default media type of the resource pointed to by the URL should be retrieved. Although the FORMATETC data structure with the CF_NULL clipboard format value can be placed anywhere within the enumerator, the client 202 generally lists such a FORMATETC data structure as last in order of priority of the client's preferred data formats.

When no FORMATETC enumerator 220 is registered with the asynchronous bind context 156 (which is a common case), the URL moniker 200 operates as if an enumerator containing a single FORMATETC with a clipboard format value equal to CF_NULL is available. More specifically, the URL moniker 200 will automatically bind to or download the default media-type of the resource named by the URL.

When performing a bind operation for the client 202, the URL moniker 200 translates the preferred data format(s) specified in the FORMATETC data structures into Multi-purpose Internet Mail Extension (MIME) media types. MIME is a well known protocol for electronic mail exchange on the Internet. Many application-level Internet protocols are based on the exchange of messages using MIME media types. MIME was originally developed for exchanging electronic mail messages with rich content across heterogeneous networking, machine, and e-mail environments. MIME has since been adopted in numerous non-mail applications, and several of its useful core features extended by further protocols, such as Hyper-Text Transfer Protocol (HTTP) used on the world wide web. Further details of MIME and its use in HTTP are described in the following documents available from the Internet: MIME Overview, at the "internic" dot "net" site name, under the rfc1630 resource; Media Type Registration Procedure, at the site name "ds.intemic" dot "net" under the resource name "rfc 1590.txt" ("the rfc1590 resource"); and IETF—Hyper-text Transfer Protocol (HTTP) Working Group, the HTTP resource.

The URL moniker 200 uses the MIME media types to request downloading the data named by the URL using the highest priority of the client's preferred data formats in which the data is available from its site on the Internet. MIME media types are simple strings which denote a type and subtype (such as "text/plain" or "text/html") and are used to label data or qualify a request. In general, the URL moniker 200 lists media types in the client's priority order, and the Internet server (or world wide web site) where the data resides responds with the highest priority available data format. For example, when the URL moniker is binding to a URL of an image which specifies the HTTP protocol, the transport object 210 lists as part of an HTTP request-for-data (Get Request-Line) or request-for-info (Head Request-Line) that it is requesting "image/gif" or "image/jpeg" MIME media types. If the data is available in the image/gif data format, the world wide web site for the URL responds by returning the MIME media type of "image/gif" and optionally the image data itself in the GIF format if the call was a request-for-data.

The client 202 is notified of the actual data format that it receives during the bind operation of the BindToStorage function through the pformatetc argument on the client's IBindStatusCallback::OnDataAvailable function.

6.1.1 The RegisterMediaTypes API Function. This API function registers text strings of MIME media types with corresponding clipboard format values for use in clipboard format value to MIME media type mapping by the URL moniker 200 in media type negotiation for the client 202. The RegisterMediaTypes API function has the following form:

HRESULT RegisterMediaTypes(ctypes, rgszTypes, rgcfTypes);

The parameters and return values of the RegisterMediaTypes API function are shown in the following table.

TABLE 31

RegisterMediaTypes API Function Parameters and Return Values.

| Argument | Type | Description |
|---|---|---|
| ctypes | UINT | The number of media type strings in the rgszTypes array. May not be zero. |

TABLE 31-continued

RegisterMediaTypes API Function Parameters and Return Values.

| Argument | Type | Description |
|---|---|---|
| rgszTypes | LPTSTR* | Array of strings identifying the media types to be registered. None may be NULL. |
| rgcfTypes | CLIPFORMAT* | An array of 32-bit values that should be assigned to the corresponding media types in rgszTypes. |
| Returns | S_OK | Success. |
|  | E_INVALIDARG | One or more arguments are invalid. |

6.1.2 The CreateFormatEnumerator API Function. This function creates an object which implements the IEnumFORMATETC interface over a static array of FORMATETC data structures. The client 202 can call this API function to create the format enumerator object 220 for use in media type negotiation with the URL moniker 200. The CreateFormatEnumerator API function has the following form:

HRESULT CreateFormatEnumerator(cfmtetc, rgfmtetc, ppenumfmtetc);

The parameters and return values of the CreateFormatEnumerator API function are shown in the following table.

TABLE 32

CreateFormatEnumerator API Function Parameters and Return Values.

| Argument | Type | Description |
|---|---|---|
| cfmtetc | UINT | The number of FORMATETCs in rgfmtetc. May not be zero. |
| rgfmtetc | CLIPFORMAT* | Static array of formats. |
| ppenumfmtetc | IEnumFORMATETC** | Location to return the IEnumFORMATETC interface of the enumerator. |
| Returns | S_OK | Success. |
|  | E_INVALIDARG | One or more arguments are invalid. |

6.1.3 The RegisterFormatEnumerator API Function. The client 202 calls this API function to register the format enumerator object 220 onto the bind context 156. This allows the URL moniker 200 to query for the client's preferred data formats for media type negotiation in a subsequent bind operation as described above. The RegisterFormatEnumerator API function has the following form:

HRESULT RegisterFormatEnumerator(pbc, pEFetc, dwReserved);

The parameters and return value of the RegisterFormatEnumerator API function are shown in the following table.

TABLE 33

RegisterFormatEnumerator API Function Parameters and Return Values.

| Argument | Type | Description |
|---|---|---|
| pbc | LPBC | The pointer to the bind context. |
| pEFetc | IEnumFORMATETC* | The format enumerator. |
| dwReserved | DWORD | Reserved for future use, must be zero. |

TABLE 33-continued

RegisterFormatEnumerator API Function Parameters and Return Values.

| Argument | Type | Description |
|---|---|---|
| Returns | S_OK | Success. |
| | E_INVALIDARG | One or more arguments are invalid. |

6.1.4 The RevokeFormatEnumerator API Function. The client 202 calls this API function to removes the format enumerator object 220 from registration with the asynchronous bind context 156. The API function has the following form:

HRESULT RevokeFormatEnumerator(pbc, pEFetc);

The parameters and return values of the RevokeFormatEnumerator API function are shown in the following table.

TABLE 34

RevokeFormatEnumerator API Function Parameters and Return Values.

| Argument | Type | Description |
|---|---|---|
| pbc | LPBC | The pointer to the bind context. |
| pEFetc | IEnumFORMATETC* | The format enumerator. |
| Returns | S_OK | Success - the format enumerator was removed. |
| | E_INVALIDARG | One or more arguments are invalid. |

6.1.5 The CreateURLMoniker API Function. The client 202 calls this function to create the URL moniker 200 from a given URL. The function also can be called from a ParseDisplayName function called through the IParseDisplayName interface described above. The CreateURLMoniker API function has the following form:

HRESULT CreateURLMoniker(pmkContext, szURL, ppmk);

The CreateURLMoniker API function creates the URL moniker 200 from either a full URL string or from a partial URL string. The partial URL string identifies a resource on the Internet relative to a base context. The full URL string identifies a resource independent of any context. The caller can create the URL moniker to name a partial URL string by specifying a separate URL moniker that names the base context as the pmkContext parameter. In this case, the CreateURLMoniker API function retrieves the display name of the base context URL moniker by calling the IMoniker::GetDisplayName function on the base context URL moniker, and then manually composes the base context together with the partial URL string specified in the szURL parameter according to URL composition rules.

The caller alternatively can create the URL moniker 200 from a partial URL string without specifying the base context (i.e., with pmkContext=NULL). In such case, the URL moniker 200 will draw further context during binding (i.e., in the IMoniker::BindToObject and iMoniker::BindToStorage functions) from the asynchronous bind context 156. The URL moniker 200 obtains the base context by looking for a contextual URL moniker parameter held by the asynchronous bind context 156, such with the function call, IBindCtx::GetObjectParam(SZ_URLCONTEXT, (IUnknown**)&pmkContext). The base context can be contained as a set of URL monikers which form a compound moniker (a well known type of OLE moniker), in which case the URL moniker 200 continues looking at each URL moniker to the left of the first URL moniker obtained from the IBindCtx::GetObjectParam function call to complete the base context.

The parameters and return values of the CreateURLMoniker API function are shown in the following table.

TABLE 35

CreateURLMoniker API Function Parameters and Return Values.

| Argument | Type | Description |
|---|---|---|
| pmkContext | IMoniker* | The URL to use as the base context when szURL is a partial URL string. NULL when szURL is a full URL string or if this moniker will retrieve full URL context from its left or from the bind-context during IMoniker::BindToObject or IMoniker:: BindToStorage. |
| szURL | LPWSTR | The display name to be parsed. |
| ppmk | IMoniker** | Location to return a moniker if successful. |
| Returns | S_OK | Success. |
| | E_OUTOFMEMORY | Out of memory. |
| | MK_E_SYNTAX | A moniker could not be created because szURL does not correspond to valid URL syntax for a full or partial URL. This is uncommon, since most parsing of the URL occurs during binding and also since the syntax for URLs is extremely flexible. |

6.2 URL Moniker Functions.

The implementation of the member functions of the URL moniker 200 is described in further detail below. These functions have the form defined for the member functions of the IUnknown, IAsyncMoniker, IPersist, IPersistStream, and IMoniker interfaces which are described above or are well known OLE interfaces described in *Inside Ole, Second Edition*, supra.

6.2.1 The URL Moniker-IUnknown::QueryInterface Function. The client 202 uses this function to request an interface pointer of another of the OLE moniker's interfaces. The URL Moniker 200 supports the interfaces, IUnknown, IAsyncMoniker, IPersist, IPersistStream, and IMoniker. As described above, the IAsyncMoniker interface is a stub interface having no member functions that is used to allow the client 202 to determine transparently if the URL moniker 200 supports asynchronous binding. This function has the form of the standard OLE IUnknown::QueryInterface function.

6.2.2 The URL Moniker-IPersist::GetClassID Function. This function returns the class identifier of the URL moniker's class, CLSID_StdURLMoniker. This function has the form of the standard OLE IPersist::GetClassID function.

6.2.3 The URL Moniker-IPersistStream::IsDirty Function. The client 202 calls this function to check whether the URL held by the URL moniker 200 has changed since the URL moniker was last saved to the computer's secondary storage 42 (FIG. 1). The implementation of this function in the URL moniker 200 returns the value, S_OK, if the URL Moniker 200 has changed since it was last saved (i.e., with a call to the IPersistStream::Save function described below, with the parameter fClearDirty=TRUE). Otherwise, the function returns the value, S_FALSE. This function has the form of the standard OLE IPersistStream::IsDirty function.

6.2.4 The URL Moniker-IPersistStream::Load Function. This function initializes the URL moniker 200 from data (a URL string) stored within a stream. The stream usually is stored previously using the URL moniker's IPersistStream:: Save function described below (via OleSaveToStream or OleSaveToStreamEx). The binary format of the stream is the URL string in Unicode™, which is a well known fixed width 16-bit encoding standard of international character sets. The URL string may be a full or partial URL string as described above in connection with the CreateURLMoniker API function. The URL string is represented as a ULONG (32-bit) data type value indicating a count of characters followed by that many Unicode characters. This function has the form of the standard OLE IPersistStream::Load function.

6.2.5 The URL Moniker-IPersistStream::Save Function. This function saves the URL named by the URL moniker 200 to a data stream in the computer's secondary storage 42 (FIG. 1). The function saves the URL in a binary format comprising a ULONG (32-bit) data type value indicating a count of characters in the URL followed by that many Unicode™ characters. As described above, the URL may be a full or partial URL string. This function has the form of the standard OLE IPersistStream::Save function.

6.2.6 The URL Moniker-IPersistStream::GetSizeMax Function. This function returns the maximum number of bytes in the data stream in which a subsequent call to the IPersistStream::Save function stores the URL of the URL moniker 200. The function computes the maximum bytes value as SIZEOF(ULONG)=4 plus SIZEOF(WCHAR)*n, where n is the length of the full or partial URL string including the NULL terminator character. The function has the form of the standard OLE IPersistStream::GetSizeMax function.

6.2.7 The URL Moniker-IMoniker::BindToObject Function. This function has the form of the standard OLE IMoniker::BindToObject function, and implements the URL moniker's binding process which instantiates the named object 208 as a running object in the computer's main memory 40 (FIG. 1). In the same manner as the asynchronous moniker 150 described above, the URL moniker 200 supports asynchronous and synchronous binding as determined by the client setting the BINDF_ASYNCHRONOUS flag passed in response to the URL moniker's IBindStatusCallback::GetBindInfo function call.

Figure 8A:
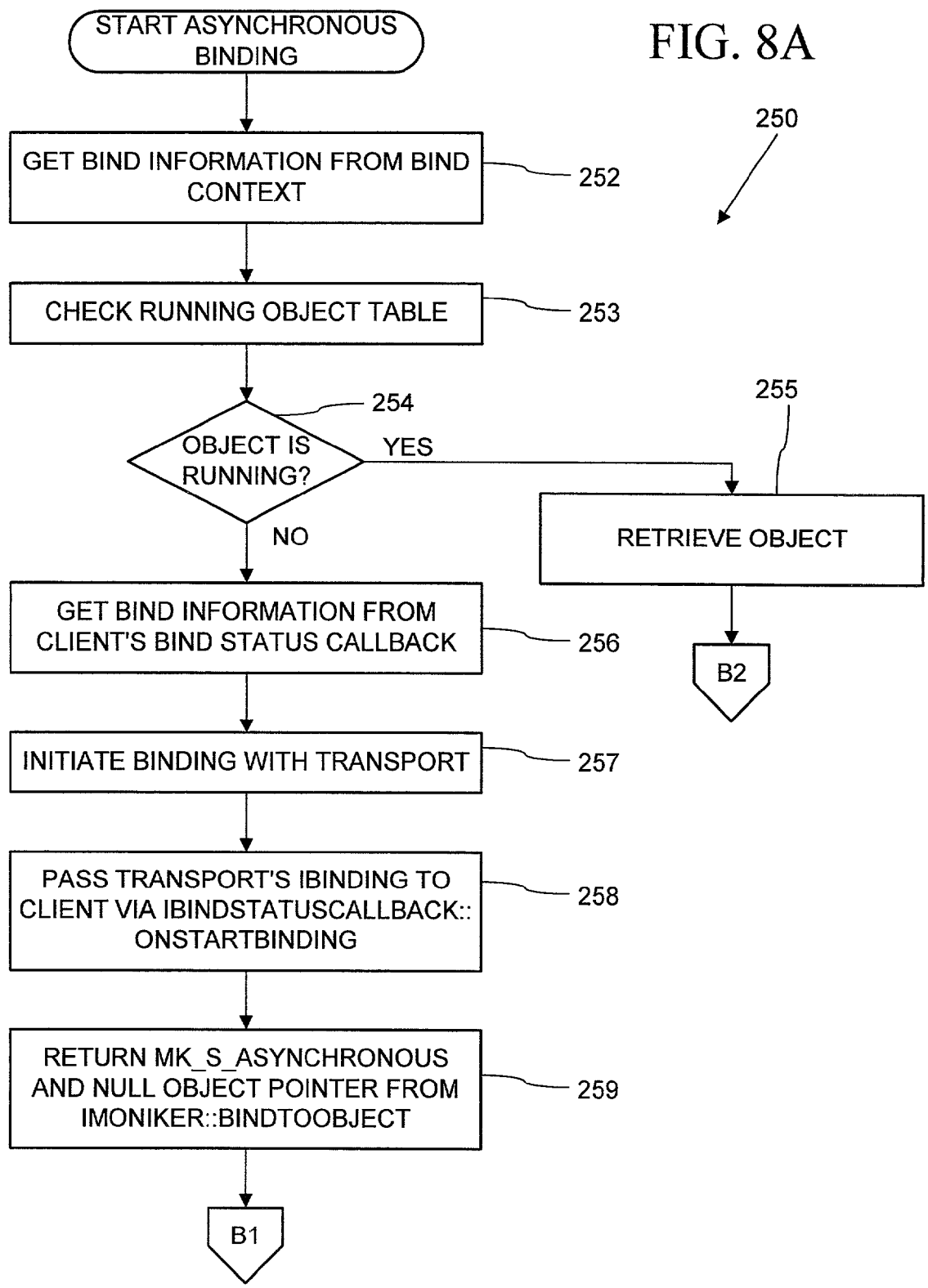
FIGS. 8A–8B is flow diagram of an asynchronous binding process implemented in a binding function of a uniform resource locator moniker.
Figure 8B:
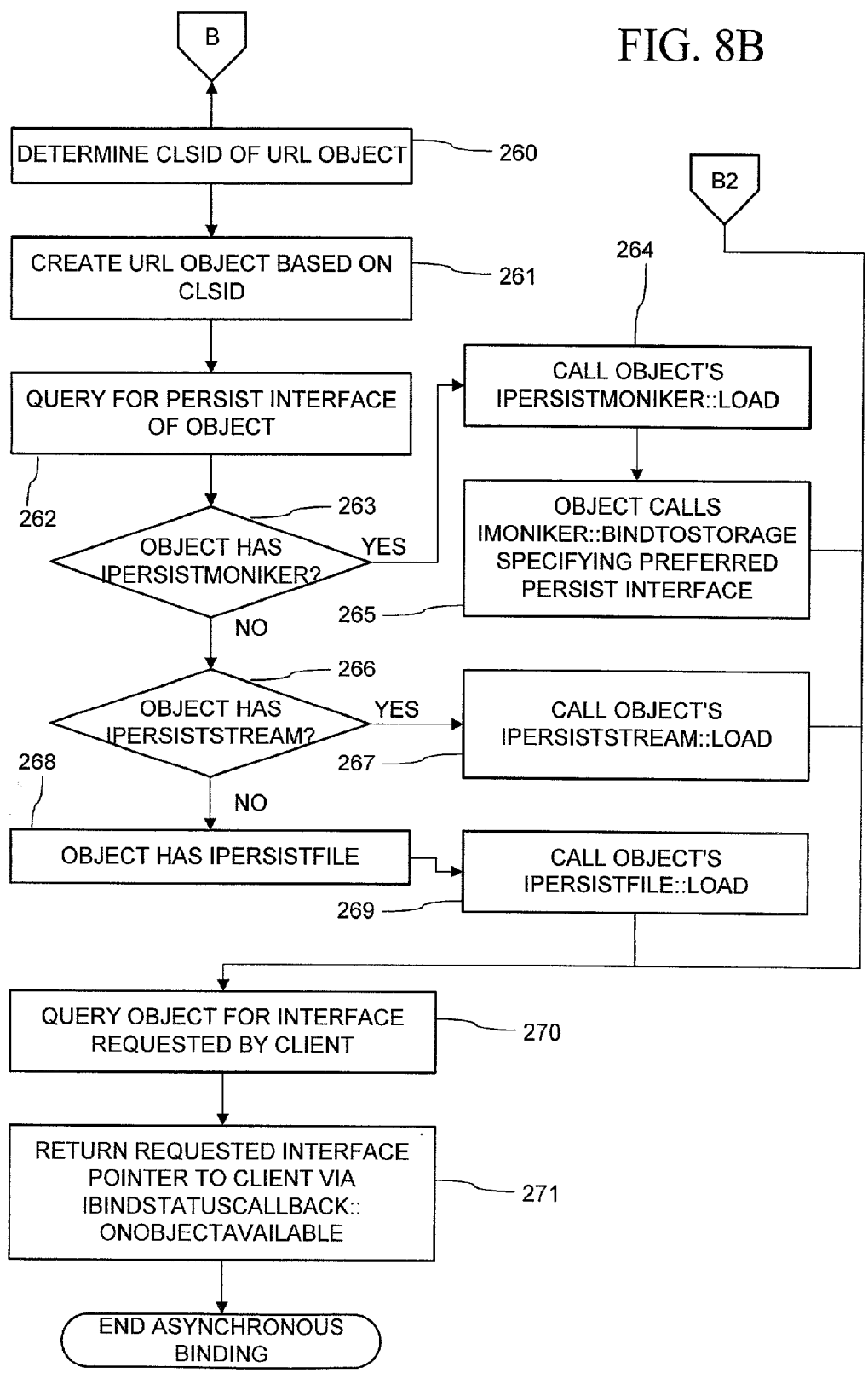

FIGS. 8A-8B show the asynchronous binding process 250 implemented in the IMoniker::BindToObject function of the URL moniker 200 (which the URL moniker performs when the BINDF_ASYNCHRONOUS flag is set). At a first step 252, the URL moniker 200 gets information for use in the bind operation from the asynchronous bind context 156, including particularly pointers for the IBindStatusCallback interface 166 and the IEnumFORMATETC interface 222 which are registered by the client 202 in the asynchronous bind context.

In a next step 253, the URL moniker 200 checks the running object table of the asynchronous bind context 156 to determine if the object 208 named by the URL moniker is already running, such as with the following code statements:
IBindCtx::GetRunningObjectTable(&prot);
prot->IsRunning(this);
If the named object 208 is already running, the URL moniker 200 retrieves the running named object 208 at step 254 (such as with the code statement: prot->GetObject(this, &punk)), and continues to step 270 of FIG. 8B.

Otherwise, the URL moniker 200 proceeds to query the client 202 for bind information by calling the IBindStatusCallback::GetBindInfo function at step 256. In this bind information, the client 202 indicates that the bind operation is to be performed asynchronously by setting the BINDF_ASYNCHRONOUS flag. At step 257, the URL moniker 200 then initiates the bind operation with the transport object 210 according to the bind information specified by the client. The URL moniker 200 selects the transport object which implements the transport protocol specified in the URL prefix (e.g., an HTTP transport object for an URL with the prefix, "http:\\"). The transport object 210 begins retrieving the resource designated by the URL, such as by connecting to the URL's site on the Internet, and requesting the resource. The illustrated transport object 210 retrieves the resource to a stream object which supports the standard OLE interface, IStream.

The URL moniker 200 also passes an interface pointer of the transport object's IBinding interface to the client 202 at step 258 via the client's IBindStatusCallback::OnStartBinding function. Finally at step 259, the IMoniker::BindToObject function of the URL moniker 200 returns the value, MK_S_ASYNCHRONOUS, to the client 202, with NULL as the ppv output parameter. The remaining steps 260-271 of FIG. 8B are executed asynchronously (i.e., without blocking the client's execution) in the URL moniker's transport object 210.

At step 260, the class (i.e., CLSID) associated with the resource designated by the URL Moniker 200 is determined in one of several ways. In the case of the HTTP transport protocol, the initial HTTP response packet header that the transport object 210 receives when requesting the resource from its Internet site may contain the CLSID associated with the resource as an "Extension-Header" to the "Entity Header" section of the "Full-Response" message. The CLSID in the HTTP response packet header is a character string having the following form:

CLSID="CLSID" ":" stringized-clsid where stringized-clsid is a character string created using the StringFromCLSID API function. The transport object 210 interprets the stringized-cisid using the CLSIDFromString API function. The StringFromCLSID and CLSIDFromString API functions are well known OLE API functions. The extension header of the HTTP response packet is described in more detail in the following documents available from the Internet: Hypertext Transfer Protocol—HTTP 1.0, at the "ics.uci" dot "edu" site name, under the resource name "draft-ietf-http-v10-spec-04. html" and the HTTP resource.

The URL moniker 200 also can determine the class associated with the URL by examining the MIME media type of the resource. If the resource has the media type, "application/x-oleobject," then the first 16-bytes of the resource's actual (i.e., non-header) data (termed the "Content-Body") contain the CLSID associated with the resource, and subsequent data of the Content-Body is to be interpreted by the class identified by the CLSID. For all other media types, the URL moniker 200 looks in the system registry for the key, HKEY_CLASSES_ROOT\MIME\Database\ContentType\<media-type>\CLSID, where <media-type> is the resource's media type and "CLSID" is the CLSID associated with that media type.

The URL moniker 200 can further determine the CLSID of the URL designated resource's class by matching portions of arriving data to patterns registered in the system registry under the keys, HKEY_CLASSES_ROOT\FileTypes, as is well known in OLE and used in the GetClassFile API function.

Finally, if the above techniques fail, the URL moniker correlates the trailing extension of the resource's name (e.g., ".gif," ".html," ".doc," ".vsd," etc.), if any, to a CLSID using the HKEY_CLASSES_ROOT\.xxx keys in the system registry, as is also well known in OLE and used in the GetClassFile API function and by the Windows® operating system shell program.

Next, at step 261, the URL moniker 200 creates the named object 208 based on the resource's CLSID using the CoCreateInstance API function, and requesting the IUnknown interface. The URL Moniker 200 then calls the QueryInterface function on the IUnknown interface of the object 208 to obtain the highest level IPersistxxx interface supported by the object (i.e., in the order IPersistMoniker, IPersistStream, and IPersistFile) as shown at steps 262, 263, 266 and 268.

If the object 208 supports the IPersistMoniker interface 170, the URL moniker calls the objects's IPersistMoniker::Load function and specifies itself as that function's moniker parameter (e.g., by passing the pointer, "this," as the parameter) at step 264. The object 208, in turn, typically calls the URL moniker's IMoniker::BindToStorage at step 265, and specifies the object's preferred IPersistxxx interface in the call.

Otherwise, if the object 208 supports the IPersistStream interface, the URL moniker calls the object's IPersistStream::Load function, and passes as a parameter of the call the IStream object which is being filled with the data of the resource that the transport object 210 is downloading asynchronously from the Internet. This causes the object 208 to load its state from the resource that the transport object is asynchronously downloading. If the object 208 is of an asynchronously aware class (i.e., the CLSID of the object's class is marked in the system registry with the category CATID_AsyncAware), the object can access the resource's data from the IStream as it is downloaded by the transport object 210 from the Internet with the IStream::Read and IStream::Write functions. If the object's class is not in the asynchronously aware category, calls to the IStream::Read or IStream::Write function which reference data that is not yet available block until the data becomes available. If the object's class is marked with the category CATID_AsyncAware, then calls to the IStream::Read or IStream::Write function which reference data not yet available return the value, E_PENDING.

Finally, if the IPersistFile interface is the highest IPersistxxx interface supported by the object, the URL moniker 200 completes the download of the resource's data into a temporary file. The URL moniker 200 then calls the load function on the object's IPersistFile interface. In the illustrated embodiment, the temporary file is cached along with other Internet-downloaded data, so the client must be sure not to delete the file.

When the object 208 returns from one of the various IPersistXXX::Load calls above at steps 265, 267 and 269, the URL moniker 200 queries the object using the IUnknown::QueryInterface function at step 270 for an interface pointer that the client 202 originally requested in the client's call to the URL moniker's IMoniker::BindToObject function. Finally, at step 271, the URL moniker 200 returns this interface pointer to the client using the client's IBindStatusCallBack::OnObjectAvailable function.

6.2.8 The URL Moniker-IMoniker::BindToStorage Function. The client 202 calls the BindToStorage function to cause the URL moniker 200 to download the named resource into the secondary storage 42 of the computer 20 (FIG. 1). The implementation of the BindToStorage function in the illustrated URL moniker 200 is similar to the BindToObject function (i.e., having the operation shown in FIGS. 8A and 8B) except that, rather than instantiating the data of the resource designated by the URL moniker as an object of a class associated with the resource (as shown at steps 260-269 of FIG. 8B), the URL moniker provides the resource's data to the client as a storage object. More specifically, in its call to the BindToStorage function, the client 202 can specify the IStream, IStorage, or IUnknown interfaces (which are each well known OLE interfaces described in *Inside OLE, Second Edition*, supra). If the IStream interface is requested, the URL moniker 200 provides the downloaded data to the client 202 as an object ("IStream object") which supports the IStream interface. If the IStorage interface is requested and the resource named by the URL moniker is an OLE compound file (a well known OLE file format described in *Inside OLE, Second Edition*, supra), the URL moniker 200 provides the downloaded data to the client 202 as an IStorage object (i.e., an object supporting the IStorage interface). Otherwise, if IUnknown is requested, the downloaded data is provided as a file. The IStream or IStorage interface requested by the client 202 is passed to the client via the IBindStatusCallback::OnDataAvailable function (in place of the step 271 of FIG. 8B in the BindToObject function).

As with the BindToObject function, the client 202 can specify synchronous or asynchronous operation with the BindToStorage function by setting the BINDF_ASYNCHRONOUS flag in the bind information returned when the URL moniker 200 calls the client's IBindStatusCallback::GetBindInfo function. For synchronous operation, the BindToStorage function blocks execution of the client 202 during downloading of the resource designated by the URL moniker 200. For asynchronous operation, the URL moniker 200 returns immediately from the BindToStorage function, and the client 202 is not blocked.

In cases where the data is provided as the IStream or IStorage objects, the client 202 can further request asynchronous storage operation by setting the BINDF_ASYNCSTORAGE flag in the bind information returned from the client's IBindStatusCallback::GetBindInfo function. When asynchronous storage is requested, the IStream or IStorage object provided by the URL moniker 200 allows the client 202 to access the data as it is downloaded. When the client 202 call the Read function on the IStream or IStorage interface, the IStream or IStorage object returns the data if available, or returns the value E_PENDING if not yet available. Otherwise, if asynchronous storage is not requested, the IStream or IStorage object provided by the URL moniker 200 blocks the client 202 when the client calls the Read function on the object.

6.2.9 The URL Moniker-IMoniker::Reduce Function. In the illustrated URL moniker 200, this function returns a value, MK_S_REDUCED_TO_SELF, and a pointer to itself (i.e., the pointer, "this") as its output parameter, *ppmkReduced.

6.2.10 The URL Moniker-IMoniker::ComposeWith Function. The illustrated URL moniker 200 supports generic composition via this function. If the function's fOnlyIfNotGeneric flag is set to TRUE, the function returns the value, MK_E_NEEDGENERIC. Otherwise, the function simply returns the result of the OLE API function call, CreateGenericComposite(this, pmkRight, ppmkComposite).

6.2.11 The URL Moniker-IMoniker::Enum Function. This function returns the value, S_OK, and sets its "*ppenumMoniker" output parameter to NULL, indicating that the URL moniker 200 does not contain sub-monikers.

6.2.12 The URL Moniker-IMoniker::IsEqual Function. This function checks another moniker specified in its pmkOtherMoniker parameter is equivalent to the URL moniker 200, meaning the other moniker also is of the URL moniker class and has a same display name (i.e., the URL string designated by the URL moniker 200). The function checks whether the other moniker's CLSID (obtained via the IPersist::GetClassID function) is CLSID_URLMoniker, and also compares the display names of the URL moniker 200 and the other moniker for equality. If the other moniker is equivalent to the URL moniker, the function returns S_OK. If not, the function returns S_FALSE.

6.2.13 The URL Moniker-IMoniker::Hash Function. This function creates a hash value based on the URL designated by the URL moniker 200. The function typically is used to speed up comparisons by reducing the number of times that it is necessary to call the IsEqual function.

6.2.14 The URL Moniker-IMoniker::IsRunning Function. This function returns S_OK if the URL moniker 200 is currently "running", otherwise returns S_FALSE. The implementation of the function in the illustrated URL moniker 200 determines if the URL moniker is running by first checking whether the URL moniker is equal to the newly running moniker (i.e., by calling pmkNewlyRunning->IsEqual(this)), and next by checking whether the URL moniker 200 is registered with the Running Object Table of the bind context 156.

6.2.15 The URL Moniker-IMoniker::GetTimeOfLastChange Function. This function returns the time of last change of an object that is registered in the running object table of the bind context 156.

6.2.16 The URL Moniker-IMoniker::Inverse Function. This function returns the value, MK_E_NOINVERSE.

6.2.17 The URL Moniker-IMoniker::CommonPrefixWith Function. This function computes a common prefix of the URL moniker 200 and a specified other URL moniker.

6.2.18 The URL Moniker-IMoniker::RelativePathTo Function. This function computes a relative path between the URL moniker 200 and a specified other URL moniker.

6.2.19 The URL Moniker-IMoniker::GetDisplayName Function. This function returns the URL string designated by the URL moniker 200. The function returns the full URL string if the URL moniker designates a full URL string. If the moniker was created with a partial URL string (as described above for the CreateURLMoniker), the function attempts to find an URL moniker which designates a base context of the URL moniker 200. The function 200 first checks in the bind context 156 under the data member, SZ_URLCONTEXT, and next checks to the left of the URL moniker if the URL moniker is part of a compound moniker. If the function does not find a base context, the function returns the partial URL string designated by the URL moniker 200.

6.2.20 The URL Moniker-IMoniker::ParseDisplayName Function. This function parses a full or partial URL string (which is input as parameter, szDisplayName) to create a resulting URL moniker (which is output as paramter, ppmkOut). If the szDisplayName parameter represents a full URL string (e.g., "http://foo.com/default.html"), the function creates a new full URL moniker which designates the full URL string. If the szDisplayName parameter represents a partial URL string (e.g., "..\default.html"), the function creates a new full URL moniker which designates a full URL string formed by combining the parameter with a base context from either the SZ_URLCONTEXT object-parameter of the bind context 156 or from the URL moniker 200. For example, if the context moniker is "http://foo.com/pub/list.html" and szDisplayName is "..\default.html," the resulting URL moniker would represent "http://foo.com/default.html." The function is used by the MkParseDisplayName (described in the Moniker Overview section above) and MkParseDisplayNameEx (described below) API functions.

6.2.21 The URL Moniker-IMoniker::IsSystemMoniker Function. This function returns the value, S_TRUE, and outputs the value, MKSYS_URLMONIKER, as its output parameter, *pdwMksys.

6.3 Client Extension Services.

In some cases, the bind operation with the URL moniker 200 requires additional services from the client 202 in order to complete negotiations necessary for downloading the resource designated by the URL moniker from the Internet. The illustrated client 202 supports an IAuthenticate interface 230 and an IHttpNegotiate interface 232 which expose services for authentication and HTTP negotiations. The URL moniker 200 requests pointers to these interfaces using the IBindStatusCallback::QueryInterface function.

6.4 The IAuthenticate interface. The illustrated client 202 supports the IAuthenticate interface 230 to provide a service, the authentication function, which the URL moniker 200 calls to retrieve information needed for authentication during a download. The illustrated IAuthenticate interface has the following form.

```
interface IAuthenticate : IUnknown {
    HRESULT Authenticate( [out] HWND* phwnd, [out]
        LPWSTR szUsername, [out] LPWSTR
        szPassword);
};
```

The Authenticate member function of this interface is called by the URL moniker 200 when it needs basic authentication information from the client 202. In response, the client 202 can return a user name and a password strings to the URL moniker 200. Alternatively, the client can provide a window handle, HWND, of a window that is used to present a default authentication user interface. The URL moniker 200 uses the authentication user interface to obtain authentication information (i.e., the user name and password) from the user. The parameters and return values of the illustrated Authenticate function are shown in the following table.

TABLE 35

The IAuthenticate::Authenticate Function Parameters and Return Values.

| Argument | Type | Description |
|---|---|---|
| phwnd | HWND * | Client-provided HWND of the parent window for default authentication UI. If no UI is desired, the client must provide a user name and password in the other parameters, and this handle is set to the value −1. |
| szUsername | LPWSTR | Client-provided user name for authentication. If the client returns a value here it should also set *phwnd = −1. |
| szPassword | LPWSTR | Client-provided password for authentication. If the client returns a value here it should also set *phwnd = −1. |
| Returns | S_OK | Success. |
| | E_INVALIDARG | One or more arguments are |

TABLE 35-continued

The IAuthenticate::Authenticate Function Parameters and Return Values.

| Argument | Type | Description |
|---|---|---|
| | | invalid. |

6.5 The IHttpNegotiate Interface. The URL moniker 200 utilizes the services provided by the illustrated client 200 through the IHttpNegotiate interface 232 to allow the client to negotiate HTTP download parameters. The IHttpNegotiate interface 232 has the following form.

```
interface IHttpNegotiate : IUnknown {
    HRESULT BeginningTransaction( [in] LPCWSTR
        szURL, [in] DWORD dwReserved, [in] LPCWSTR
        szHeaders, [out] LPWSTR szAdditionalHeaders);
    HRESULT OnHeadersAvailable([in] DWORD
        dwResponseCode, [in] LPCWSTR szHeaders);
    HRESULT OnError[in] DWORD dwResponseCode, [in]
        LPCWSTR szRequestHeaders, [in] LPCWSTR
        szResponseHeaders, [out] LPWSTR
        szAdditionalRequestHeaders);
};
```

6.5.1 The IHttpNegotiate::BeginningTransaction Function. The URL moniker 200 calls this function before sending an HTTP request for downloading the resource designated by the URL moniker. In the URL moniker's call to this function, the URL moniker notifies the client of the URL of the resource which is to be downloaded in the HTTP request. The URL moniker 200 also allows the client 202 to add additional headers to the HTTP request. The illustrated IHttpNegotiate::BeginningTransaction function has the parameters and return values shown in the following table.

TABLE 36

IHttpNegotiate::BeginningTransaction Function Parameters and Return Values

| Argument | Type | Description |
|---|---|---|
| szURL | LPCWSTR | The URL for the HTTP transaction. |
| dwReserved | DWORD | Reserved for future use. |
| szHeaders | LPCWSTR | The current request headers. |
| szAdditionalHeaders | LPWSTR | Additional headers to append to the HTTP request header. |
| Returns | S_OK | Success, append the headers. |
| | S_FALSE | Do not append any headers. |
| | E_INVALIDARG | The argument is invalid. |
| | E_ABORT | Abort the HTTP transaction. |

6.5.2 The IHttpNegotiate: OnHeadersAvailable Function. This function is called by the URL moniker 200 to provide the client with the HTTP response header information used in downloading the resource designated by the URL moniker. In the function, the client 202 may examine these headers and choose to abort the HTTP transaction. The illustrated IHttpNegotiate::OnHeadersAvailable function's parameters and return values are shown in the following table.

TABLE 37

IHttpNegotiate::OnHeadersAvailable Function Parameters and Return Values

| Argument | Type | Description |
|---|---|---|
| dwResponseCode | DWORD | HTTP response code. |
| szHeaders | LPCWSTR | The response headers (a NULL-terminated string). |
| Returns | S_OK | Success. Continue the HTTP transaction. |
| | E_INVALIDARG | The argument is invalid. |
| | E_ABORT | Abort the HTTP transaction. |

6.5.3 The IHttpNegotiate::OnError Function. The URL moniker 200 calls this function when an HTTP error occurs that cannot be resolved. The function allow the client 202 to add HTTP headers that are used to respond to the error. The function's parameters and return values are shown in the following table.

TABLE 38

IHttpNegotiate::OnError Function Parameters and Return Values

| Argument | Type | Description |
|---|---|---|
| dwResponseCode | DWORD | HTTP response code. |
| szRequestHeaders | LPCWSTR | HTTP headers sent to the HTTP server. |
| szResponseHeaders | LPCWSTR | Response headers from the HTTP server. |
| szAdditionalRequestHeaders | LPWSTR | Headers to add to the request headers before resending. |
| Returns | S_OK | Success, append the headers to the request. |
| | S_FALSE | Do not append any headers. |
| | E_INVALIDARG | The argument is invalid. |
| | E_ABORT | Abort the HTTP transaction. |

6.6 Display Name Parsing.

Figure 7:
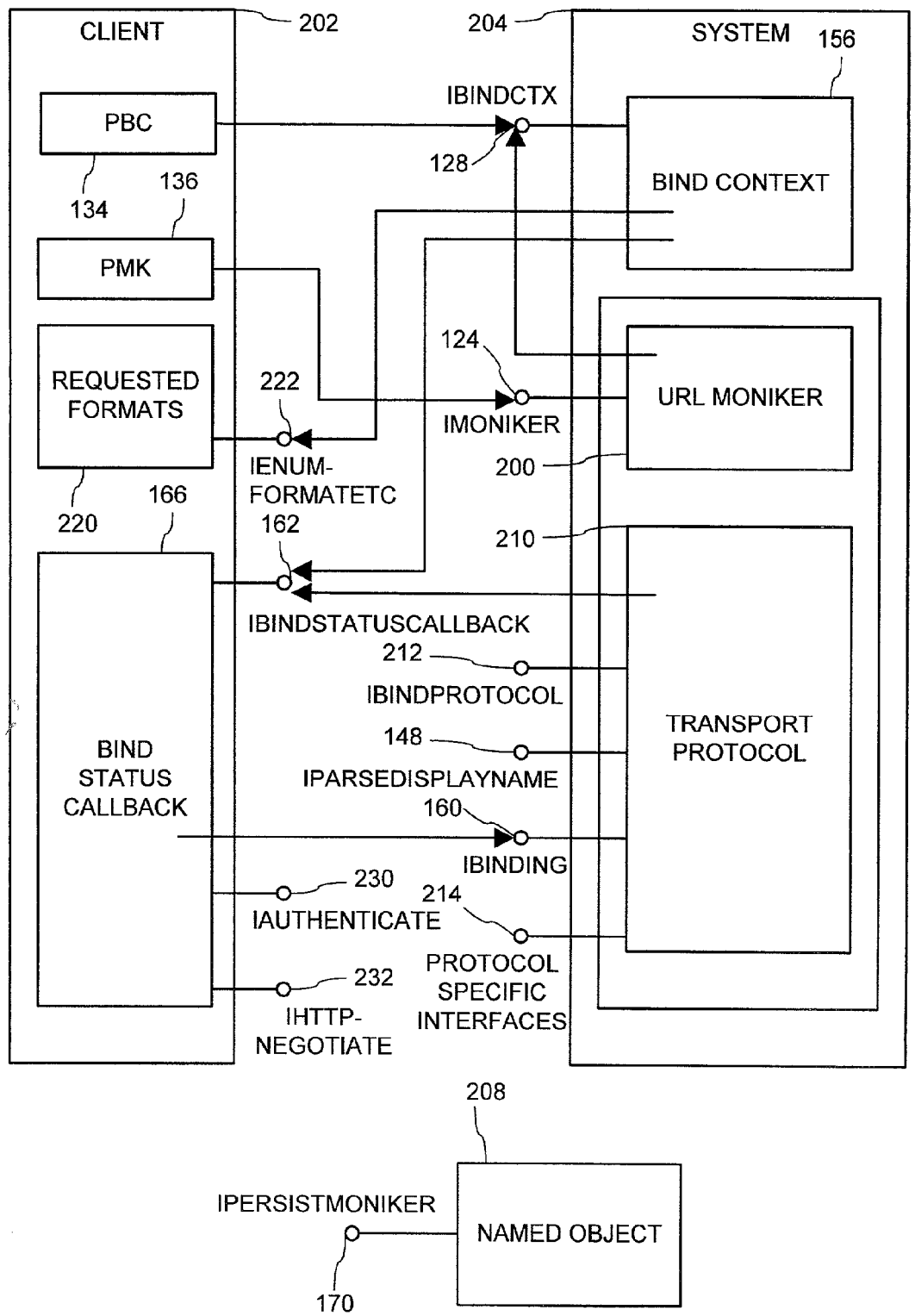
FIG. 7 is a diagram of a client program using a uniform resource locator moniker to bind to an object named by a uniform resource locator moniker.

With reference still to FIG. 7, the illustrated system 204 extends parsing of display names into monikers to also support the Universal Resource Indicator (URI) syntax, which is used for Internet URLs. The URI syntax specifies that a string begins with a transport protocol identifier followed by a colon character (e.g., "http:" for the Hypertext Transport Protocol, "ftp:" for the File Transport Protocol, etc.). A sub-string following the transport protocol prefix designates a resource and its site. The URI syntax is described in the IETF RFC1630specification, which is available from the Internet.

For parsing URI syntax display names, the illustrated system 204 provides a MkParseDisplayNameEx API function. Similar to the MkParseDisplayName API function described in the Moniker Overview section above, this API function is called by the client 202 to obtain a moniker that references data identified by a text string (referred to herein as the "display name" of the data). This is referred to herein as "parsing" the display name.

In an initial step of the parsing process, the MkParseDisplayNameEx API function parses a first portion of the display name and creates an initial moniker appropriate to that portion. For parsing with the MkParseDisplayNameEx API function, the display name is allowed to begin in one of three ways: with a program identifier ("ProgID") followed by a colon character (":"), with a valid file system name, or with the '@' character followed by a ProgID. A ProgID is a short text string used in the Windows® operating system registry to identify applications installed on the computer system. The MkParseDisplayNameEx API function creates the initial moniker by attempting each of the following strategies in order.

"ProgID:" Case. If a prefix of the display name in the szDisplayName parameter conforms to legal ProgID syntax, is longer than a single character, and is followed by a colon character (':'), the API function converts the ProgID to a CLSID using the CLSIDFromProgID API function (a well known Windows® operating system API function). The MkParseDisplayNameEx API function then calls the CoCreateInstance API function (described in the Document Object and Server Overview section above) to create an object of the class identified by the CLSID (which is the initial moniker), and obtains an interface pointer to the IParseDisplayName Interface on the initial moniker.

Running Object Table Case. If a prefix of the display name is a valid file name, the MkParseDisplayNameEx API consults the running objects table for a file moniker that references the file name. If there is a running file moniker that references the display name prefix, the MkParseDisplayNameEx API treats the file moniker as the initial moniker.

File System Case. The MkParseDisplayNameEx API function consults the file system of the computer 20 (FIG. 1) to check whether a prefix of the display name matches any existing file in the file system. The MkParseDisplayNameEx API function then creates a file moniker (as described in the Moniker Overview section above) which references this file as its initial moniker.

"@ProgID" Case. If the initial character of the display name is the '@' character, the MkParseDisplayNameEx API function converts a portion of the display name following the '@' character which conforms to the ProgID syntax into a CLSID using the CLSIDFromProgID API function. The MkParseDisplayNameEx API function then creates a instance of the class identified by the CLSID (which is the initial moniker).

The MkParseDisplayNameEx API function then iteratively calls the IParseDisplayName::ParseDisplayName function of the moniker it has created thus far (the "current" moniker), passing a suffix portion of the display name which remains to be parsed (the "current" portion) in the call. The ParseDisplayName function parses this remaining portion of the display name into a new moniker, and returns the new moniker with a new suffix portion of the display name that remains to be parsed. The returned moniker and display name portion become the current moniker and current portion in the next iteration of this step. The iterations end when the display name is fully parsed, an error occurs, or the remaining suffix of the display name cannot be parsed. As a result of the iterative parsing, the MkParseDisplayNameEx API function creates a succesion of increasingly more specific monikers which it combines into a composite moniker. Each successive moniker is able to parse a next more specific portion of the display name into a moniker. For example, a display name can be parsed by the API function into a composite moniker which includes a file moniker that references a file designated in the display name, and an item moniker that references a part of the file designated in a further portion of the display name.

The MkParseDisplayNameEx API function supports the URI syntax in an extensible fashion with the "ProgID:" case strategy for parsing the display name prefix to an initial moniker. In the illustrated embodiment, the display name prefixes that designate Internet transport protocols (e.g., "http:," "ftp:," and "gopher:") are registered as ProgIDs in the system registry which map to a CLSID for the URL moniker. Thus, when the MkParseDisplayNameEx API function is called to parse an URL, the MkParseDisplayNameEx API function creates a URL moniker in its initial parsing step, and calls the URL moniker's IParseDisplayName::ParseDisplayName function to parse the remainder of the URL. Likewise, the MkParseDisplayNameEx API function can be extended to parse display names with new transport protocols by registering the protocol identifier as a ProgID in the system registery that maps to a handler moniker, and implementing a ParseDislayName function in the handler moniker to parse display names using the protocol.

The MkParseDisplayNameEx API function is defined as shown in the following C programming language statement, and has the parameters and return values shown in the following table 39.

HRESULT  MkParseDisplayNameEx([in] IBindCtx* pbc, [in] LPWSTR szDisplayName, [out] ULONG* pcchEaten, [out] IMoniker** ppmk);

TABLE 38

MkParseDisplayNameEx API Function Parameters and Return Values

| Argument | Type | Description |
| --- | --- | --- |
| pbc | IBindCtx* | The binding context in which to accumulate bound objects. |
| szDisplayName | LPCWSTR | The display name to be parsed. |
| pcchEaten | ULONG* | On exit the number of characters of the display name that was successfully parsed. Most useful on syntax error, when a non-zero value is often returned and therefore a subsequent call to MkParseDisplayNameEx with the same pbc and a shortened szDisplayName should return a valid moniker. |
| ppmk | IMoniker** | Location to return a moniker if successful. |
| Returns | S_OK | Success. |
|  | MK_E_SYNTAX | Parsing failed because szDisplayName could only be partially resolved into a moniker. In this case, *pcchEaten holds the number of characters that were successfully resolved into a moniker prefix. |
|  | E_OUTOFMEMORY | Out of memory. |

7. Hyperlink Navigation Architecture

Figure 9:
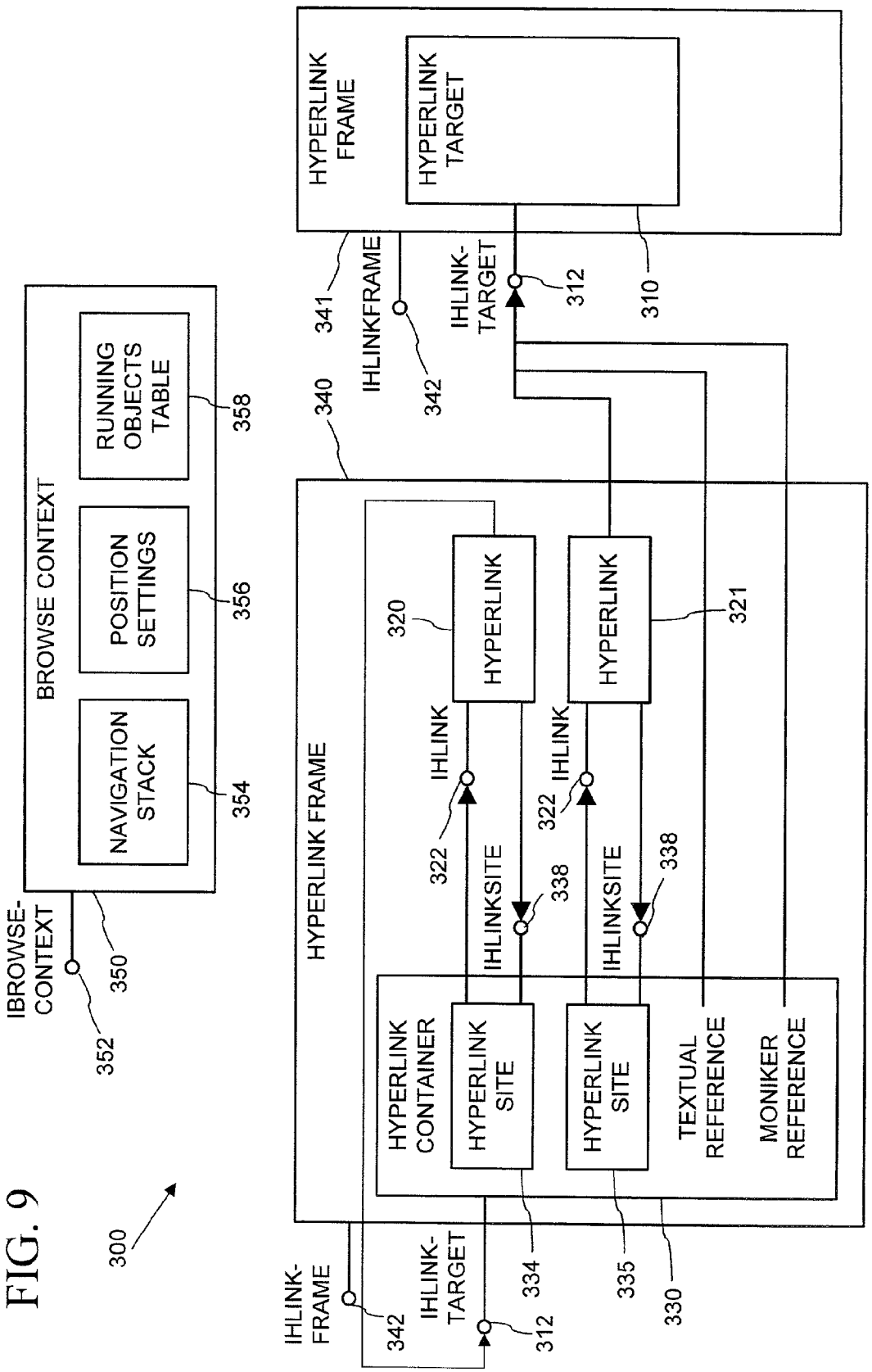
FIG. 9 is a block diagram of a software component architecture for unified hyperlink navigation in the computer of FIG. 1 according to a further illustrated embodiment of the invention.

With reference to FIG. 9, the illustrated embodiment of the invention provides a object-oriented framework or architecture 300 for unified hyperlink navigation between any documents, objects and applications. In particular, this unified hyperlink navigation is not limited to just HTML documents of the World-Wide Web, or to hyperlinking within a single application such as a web browser. The illustrated architecture 300 supports each of the following forms of hyperlink navigation:

From a standalone application to another standalone application, neither of which implements document objects;

From a standalone application to a document object or HTML document hosted in the browser of FIG. 2;

From a document object in the browser of FIG. 2 to another document object in the same browser;

From a document object in the browser of FIG. 2 to a document object embedded in a binder document (a document which contains one or more document objects, which may have different types) hosted in a binder application (e.g., the Microsoft® Office Binder application in the Microsoft® Office 95 application suite); and From one location in a document object (or a document displayed by a standalone application) to another location in the same document object (or standalone application document).

The architecture 300 comprises a set of system provided services and a set of integration interfaces and objects which support the unified hyperlink navigation.

7.1 Hyperlink Navigation Overview.

A hyperlink in the illustrated architecture 300 is a reference to another location in a document or object. The location can be in the same document or object in which the hyperlink appears, or in a new document or object. The document's or object's data can be stored in a file of the computer's file system, a resource residing at a site on the Internet, or any arbitrary location that can be referenced by a moniker. The illustrated hyperlink reference is a (target, location) tuple. The target portion of the tuple is stored as a moniker, and the location portion is stored as a string. The hyperlink can be navigated by binding to the target, and then requesting that the target navigate to the location. When the document or object that contains a hyperlink is displayed, the illustrated hyperlink is presented as colored and/or underlined text, as "hot spot" regions on an image, as push buttons, or other user interface control. The appearance of the hyperlink, however, is dependent on the document or object which contains the hyperlink and the context of the hyperlink. The illustrated architecture does not impose any requirements limiting the presentation of hyperlinks, although preferably the hyperlinks should be made obvious, e.g., via coloring, underlining, or by changing the cursor or displaying "tool tips" (i.e., a small descriptive text box) when a mouse cursor passes over the hyperlink.

Hyperlink navigation involves a transition (also known as a "jump") from one document, object, or application (referred to as the "hyperlink container") to another document, object, or application (referred to as the "hyperlink target"). Both the hyperlink container and target usually remain running, but the hyperlink target visually replaces the hyperlink container. In cases where the containing document or object and the target document or object are displayed in a same application (e.g., the browser window 68 of FIG. 2), the target document or object is displayed in place of the containing document or object in that application's window (e.g., within the document display area 72 of FIG. 2). In cases where the target document or object is displayed with a different application than the hyperlink container, the illustrated architecture 300 creates the appearance of window reuse by passing the window position and size of the hyperlink container application to the target, having the target's application size and position its window in the same location on the computer's display, and hiding the container application's window.

Hyperlink navigation utilizes a global context (referred to herein as the "browse context") which records each hyperlink navigation transition and chains the transitions in order of their occurrence as a "navigation stack." This context allows traversing previous hyperlink transitions in forward or reverse directions, such as with "go back" or "go forward" commands (e.g., back and forward buttons 490-491 in the toolbar 480 (FIG. 12) of the browser window 68 (FIG. 2)). The browse context is global in scope and includes hyperlink transitions between applications. However, a single user can maintain multiple separate browse contexts concurrently, such as for running two instances of the browser in separate browser windows 68 (FIG. 2).

7.2 Hyperlink Navigation Architecture Overview.

Referring still to FIG. 9, the illustrated hyperlink navigation architecture 300 includes some components which are provided by the operating system of the computer 20 (FIG. 1) and other user-defined components that integrate with the architecture 300 by supporting interfaces described below.

7.2.1 "Simple" Hyperlinking API Functions.

The architecture 300 allows application programs to participate in hyperlink navigation at different levels. For minimal participation in hyperlink navigation (e.g., to allow navigation from the application to a hyperlink target), an application program can utilize a set of system API functions (referred to herein as simple hyperlinking API functions), which include the HlinkSimpleNavigateToString, HlinkSimpleNavigateToMoniker, HIinkNavigateString, HlinkNavigateMoniker, HlinkGoBack, and HlinkGoForward API functions described below. An application can implement the additional objects and integration interfaces described below to support more complex hyperlink navigation features, such as navigation to a sub-location within a document or object, or cut and paste as well as drag and drop operations with hyperlinks. Thus, an application such as an Internet browser which is a viewer of documents that contain hyperlinks would implement the objects and integration interfaces so as to support all hyperlink navigation features. On the other hand, another application without implementing the objects and integration interfaces can use the simple hyperlinking API function to provide simpler hyperlink features, such as a menu command or button control which hyperlinks to the application developer's home page or to a help or customer technical support page on the World Wide Web.

7.2.2 Hyperlink Target.

A hyperlink target is a destination of hyperlink navigation. In the illustrated architecture 300, hyperlink targets can be an object (referred to as a hyperlink target object 310) that supports an IHlinkTarget interface 312 described below, an object that supports the IOleObject interface (a well known OLE interface), or a file that can be viewed by launching a viewer application program via the shell execute operating system service as described above. For full integration with the architecture 300, a document which is to be a hyperlink target preferably is encapsulated as a hyperlink target object 310 which supports the IHlinkTarget interface 312. Objects and documents which do not support the IHlinkTarget interface 312 also can act as a hyperlink target, but do not provide the internal navigation feature (i.e., hyperlink navigation to an internal location of a document) available through this interface and do not have access to the browse context that holds the navigation stack described above.

7.2.3 Hyperlink Object.

In the illustrated architecture 300, hyperlink navigation is performed using hyperlink objects 320–321. Each hyperlink object 320–321 implements an IHlink interface 322 and encapsulates four pieces of reference information that characterize a hyperlink: a moniker (hereafter "hyperlink target moniker") to the hyperlink's target (e.g., hyperlink target object 310), a string for referencing a sub-location within the target, a descriptive name for the target (hereafter "friendly name"), and additional parameters. The moniker can be of any type. Where the hyperlink target is a resource residing on the remote computer 58 (FIG. 2), a URL moniker or other asynchronous moniker preferably is used as the hyperlink target moniker. Where the hyperlink target resides as a file in the file system on the computer 20 (FIG. 2) or on a connected LAN, a file moniker preferably is used as the hyperlink target moniker.

The illustrated hyperlink objects 320–321 support the IPersistStream, and IDataObject interfaces (which are well known OLE interfaces), in addition to the IHlink interface 322. The hyperlink objects 320–321 include member functions which implement the behavior of navigating to the location in the target which is referenced by the hyperlink object, and are exposed through the IHlink interface 322. The hyperlink objects 320–321 also expose functions via the IPersistStream interface to save and load itself in the computer's secondary storage 42, and functions via the IDataObject interface for transferring itself between applications with cut, copy and paste operations using the clipboard as well as drag-and-drop operations. A document can use the hyperlink object to represent hyperlinks contained in the document, thus encapsulating the functionality of hyperlink navigation, as well as saving, loading, dragging, dropping, cutting and pasting of the hyperlinks.

The hyperlink objects 320–321 in the illustrated architecture are system-provided objects. Documents and objects which contain hyperlinks can create hyperlink objects via HlinkCreateFromData, HlinkCreateFromMoniker, HlinkCreateFromString, and OleLoadFromStream API functions described more fully below.

7.2.4 Hyperlink Container and Hyperlink Sites.

A hyperlink container 330 in the illustrated architecture 300 is a document or application that contains hyperlinks. More specifically, the hyperlink container 330 can be a document object (described above) or an object implemented by an application program. Often, hyperlink containers also act as hyperlink targets. The illustrated hyperlink container 330 also acts as a hyperlink target, and supports the IHlinkTarget interface 312.

Hyperlink containers which use hyperlink objects for hyperlink navigation optionally can implement hyperlink site objects for each of the hyperlink objects. The illustrated hyperlink container 330 includes hyperlink site objects 334–335 for the hyperlink objects 320–321. The hyperlink site objects 334–335 support an IHlinkSite interface 338, and are used by their corresponding hyperlink objects 320–321 to retrieve a moniker that references the hyperlink container 330. The hyperlink objects 320–321 use this moniker to evaluate monikers which reference hyperlink targets relative to the hyperlink container. For example, the hyperlink target moniker contained in the hyperlink object 320 is null, which indicates the hyperlink target is the hyperlink container 330 (such as for an internal jump to a particular location within the hyperlink container). Accordingly, the hyperlink object 320 uses the hyperlink site 334 to efficiently navigate this internal jump.

7.2.5 Hyperlink Frame.

A hyperlink frame object 340 acts as an outer frame that manages one or more hyperlink container documents. Referring more specifically to FIG. 2, the illustrated hyperlink frame object 340 is the browser that runs on the computer 20 and displays the window 68. In the window 68, the browser provides a document viewing user interface in the form of a frame 70 with user interface controls 74 and a document display area 72. The illustrated hyperlink frame object 340 operates as a host or container for document objects provided by a server application, and allows such a document object to display its document in the display area 72 for viewing by the user. For managing multiple hyperlink target document types, the illustrated hyperlink frame object 340 supports an IHlinkFrame interface 342.

7.2.6 Hyperlink Browse Context.

The illustrated architecture includes a hyperlink browse context object 350 which supports an IBrowseContext interface 352. The hyperlink browse context object 350 is a system provided object which maintains a navigation stack 354 for tracking hyperlink navigation transitions. The hyperlink browse context object 350 is passed between the components involved in hyperlinking to provide access to the navigation stack.

In addition to the navigation stack, the hyperlink browse context object 350 also contains other context information. The hyperlink browse context object 350 maintains information to enable or disable "go back" and "go forward" navigation commands. The object 350 also stores window position and hyperlink navigation toolbar position information 356 for use in positioning a window of the hyperlink target's hyperlink frame 341 over that of the hyperlink container as well as the hyperlink navigation toolbar 480 (FIG. 12) within the window to provide a perception of window reuse.

When a hyperlink target (e.g., objects 310, 330) is navigated for a first time, the hyperlink browse context object 350 is passed to the hyperlink target (using the IHlinkTarget::SetBrowseContext function described below). The hyperlink target registers with the hyperlink browse context object 350 (using the IHlinkBrowseContext::Register function described below). When the hyperlink target is again navigated, the hyperlink target also notifies the hyperlink browse context object 350 using the IHlinkBrowseContext::OnNavigateHlink function described below. In response to these notifications, the hyperlink browse context object 350 updates the navigation stack so as to add the newly navigated hyperlink target and to record the currently navigated hyperlink target in the navigation stack.

The hyperlink browse context object 350 also utilizes the notifications to manage the lifetimes of registered hyperlink target applications using a MRU (most recently used) scheme. When a hyperlink is navigated to a new hyperlink target (i.e., other than an internal hyperlink navigation to a new location within the hyperlink container), the hyperlink target is displayed and the hyperlink container hidden. Although no longer displayed, the hyperlink container remains a running object which is stored in a cache portion of the memory 26 in the computer 20 (FIG. 1). The hyperlink browse context object keeps a reference to this object in a running objects table 358.

The cache and running objects table 358 are updated according to a least recently used scheme. Specifically, when a new object is added to the cache and running objects table 358, the least recently used running object is dropped from the cache and running objects table 358. When an object is removed from the running objects table, the hyperlink browse context still maintains the original reference to the object's data in the navigation stack.

Since the hyperlink container and other recently used objects are kept in their running state in the cache, the hyperlink navigation architecture allows quicker return navigation to these objects (such as with the history drop down list 499, back button 490, and forward button 491 on the hyperlink navigation toolbar 480 of FIG. 12). When navigating to a hyperlink target, the running objects table 358 is first consulted. If the hyperlink target is in the running objects table 358, the running hyperlink target can be immediately displayed. Otherwise, navigating to the hyperlink target requires loading the hyperlink target's server application, instantiating the hyperlink target, and retrieving the hyperlink target's data from its original source (e.g., from the Internet).

7.3 Simple Hyperlinking Process.

Figure 10:
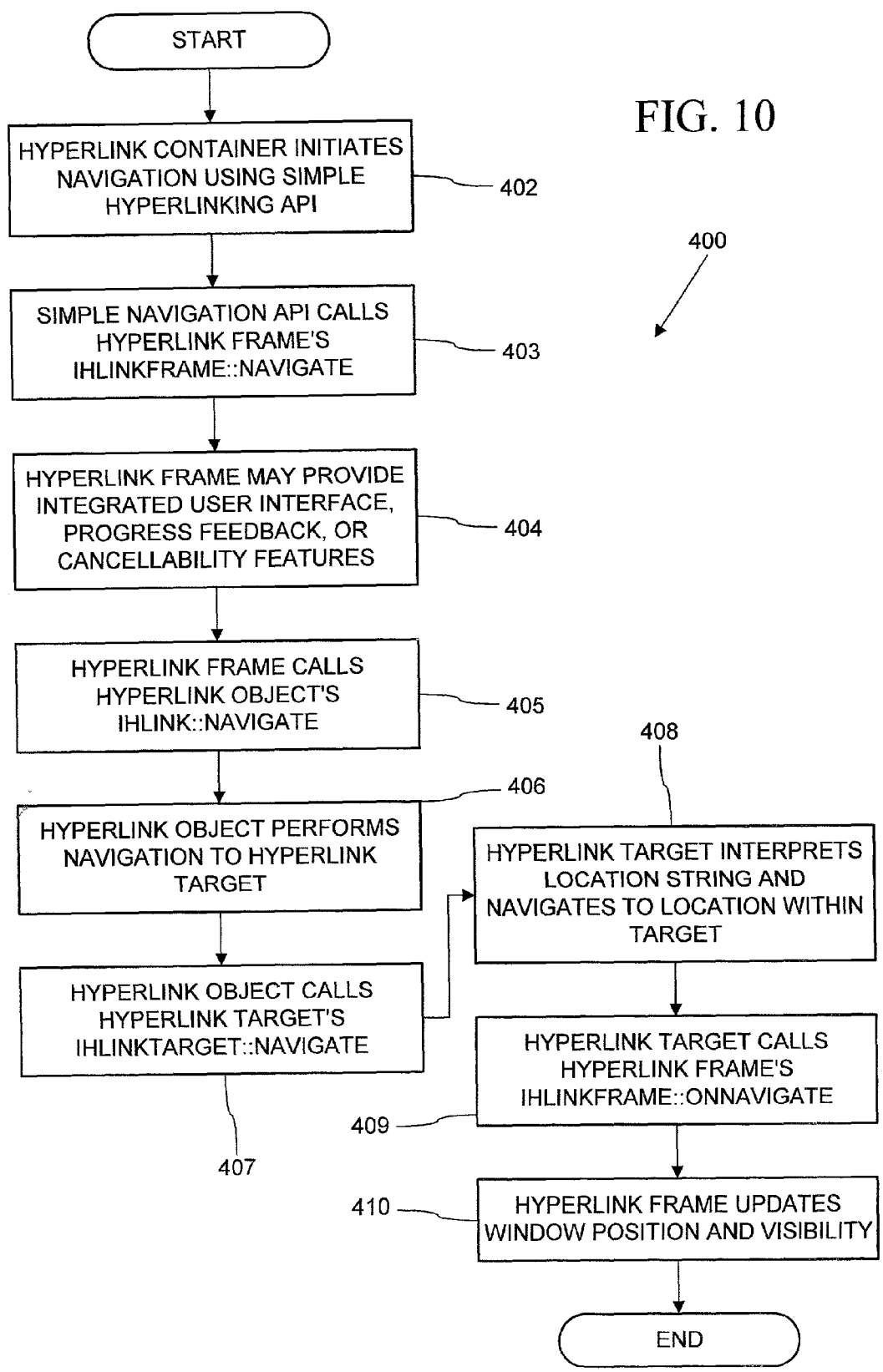
FIG. 10 is a flow chart of a simple hyperlink navigation process performed in the hyperlink navigation architecture of FIG. 9.

FIG. 10 shows a process 400 for simple hyperlink navigation between a hyperlink container and a hyperlink target, neither of which directly use the hyperlinking browse context object 350 (FIG. 9). In the illustrated simple hyperlink navigation process 400, the hyperlink container and hyperlink target are documents or objects which are hosted by one or both of the hyperlink frame objects 340–341 (i.e., displayed within the document display area 72 of FIG. 2 which the hyperlink frame object provides). In the process 400, the hyperlink frame objects 340–341 take responsibility for integrating with the hyperlink browse context object 350 to maintain the navigation stack, along with features such as history and favorites lists. This simplifies the support for hyperlinking navigation that the hyperlink container and hyperlink target must provide.

At a first step 402 of the process 400, the hyperlink container 330 initiates hyperlink navigation using one of the "simple hyperlinking" APIs when the user activates a hyperlink. The following pseudo-code is an example of code in the hyperlink container 330 for initiating hyperlink navigation.

```
// do the navigation
HlinkSimpleNavigateToString( "http://www.microsoft.com/foo.htm",
    NULL, NULL, punkMe, 0, pbc, pbsc, 0);
```

The simple hyperlinking API function calls the IHlinkFrame::Navigate function of the hyperlink frame object 340 (e.g., the browser of FIG. 2) at step 403. The hyperlink frame object's gHlinkFrame::Navigate function packages the simple hyperlinking API function's call into a call to the IHlink::Navigate function of a hyperlink object as shown at step 405. The hyperlink frame object 340 may simply set some flags and defer to the hyperlink object's IHlink:: Navigate function (as demonstrated in the example code for step 454 of the process shown in FIG. 11 described below). However, the procedure of calling the IHlink::Navigate through the hyperlink frame object 340 also affords the hyperlink frame object the chance to provide an integrated user-interface, progress feedback, cancellation options, and other features as indicated at step 404. For displaying progress indication and cancellation user interface controls, the hyperlink frame object 340 can register an IBindStatusCallback interface of its own callback object at the step 404 with the browse context 358 so as to receive progress notification call backs during navigation. At step 405, the hyperlink frame object calls the hyperlink object's IHlink:: Navigate function.

In the IHlink::Navigate function at step 406, the hyperlink object 320–321 navigates to the hyperlink target, such as by binding with the hyperlink target moniker. After completing navigation to the hyperlink target, the hyperlink object calls the hyperlink target's IHlinkTarget::Navigate function at step 407.

At step 408 in the IHinkTarget::Navigate function, the hyperlink target navigates to the specific location within the target indicated by the hyperlink (if any). Typically, this involves the hyperlink object interpreting the location string of the hyperlink and completing hyperlink navigation accordingly. The following pseudo-code is an example implementation of the IHlinkTarget::Navigate function within the hyperlink target object 310.

```
IHlinkTarget::Navigate(DWORD grfHLNF, LPCWSTR szLocation)
{
    IHlinkFrame* phlFrame = NULL;
    // if szLocation is not visible show it
    // if this hyperlink target is an OLE Document Object, try
        to retrieve the hyperlink frame pointer from the
        IOleInPlaceFrame
    if (m_poleinplaceframe)
        m_poleinplaceframe->
            QueryInterface(IID_IHlinkFrame,
            (void**)&phlFrame);
    // notify the hlink frame and the browse context that the
        navigation is complete. Note: either phlFrame or
        m_phlbc may be NULL
    HlinkOnNavigate(phlFrame, NULL, grfHLNF, m_pmk,
        szLocation, szFriendlyName);
    m_fHide = FALSE;
    m_fHideFrame = FALSE;
}// IHlinkTarget::Navigate
```

At step 409, the hyperlink target then calls the IHlinkFrame::OnNavigate function of its hyperlink frame object 341. In the OnNavigate function at step 410, the hyperlink frame object 341 repositions its window 68 (FIG. 2) and updates the window's visibility. If the hyperlink target's hyperlink frame object is the same as that of the hyperlink container, the hyperlink frame object sets flags (as demonstrated in the example pseudo-code for the step 464 of FIG. 11 described below) to keep its window visible.

Otherwise, if the hyperlink frame objects 340–341 of the hyperlink container 330 and hyperlink target 310 are different, the hyperlink frame object 341 of the hyperlink target 310 positions its window 68 (FIG. 2) and hyperlink navigation toolbar 380 (FIG. 12) according to the position information in the browse context (i.e., over the position of the window of the hyperlink frame object 340 of the hyperlink container 330. Then, the window of the hyperlink frame object 341 of the hyperlink target 310 is made visible, while the window of the hyperlink frame object 340 of the hyperink container 330 is hidden. This creates the appearance of replacing the hyperlink container with the hyperlink target within a same window.

7.4 Full Hyperlink Navigation Process.

Figure 11:
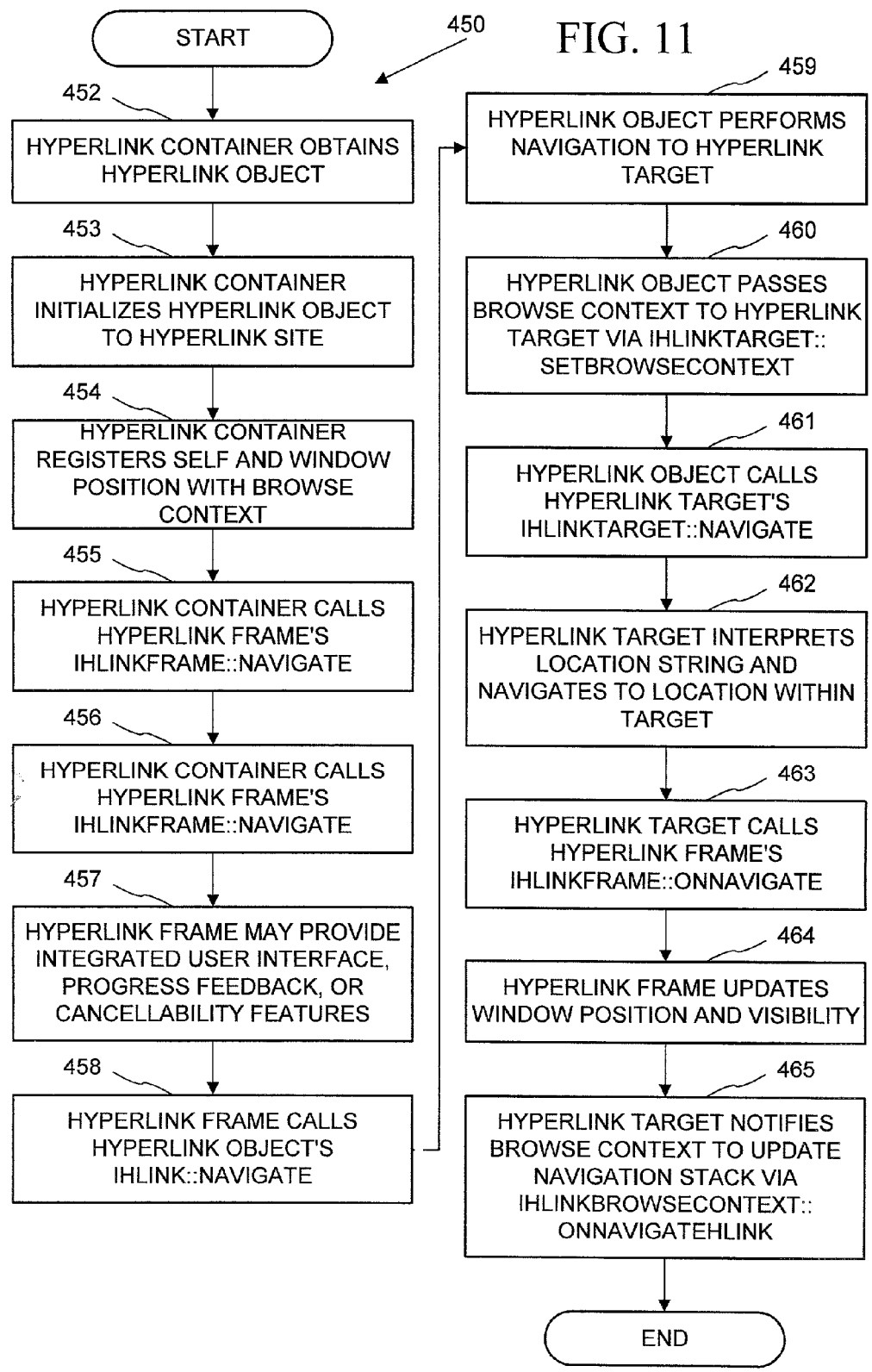
FIG. 11 is a flowchart of a full hyperlink navigation process performed in the hyperlink navigation architecture of FIG. 11.

FIG. 11 shows a process 450 for hyperlink navigation between a hyperlink container and a hyperlink target which integrate directly with the hyperlinking browse context object 350 (FIG. 9). This integration allows the hyperlink container and target to provide more complex features, such as cut, copy and paste operations and drag and drop operations.

At an initial step 452 before any navigation occurs, the hyperlink container 330 obtains a hyperlink object 320–321 which represents the hyperlink. The hyperlink container 330 either creates the hyperlink object 320–321 using the HlinkCreateFromData, HlinkCreateFromMoniker, or HlinkCreateFromString API functions (described below), or by loading a stored hyperlink object from its persistent data using the OleLoadFromStream API function (a well known OLE API function). At step 453, the hyperlink container 330 initializes the hyperlink object 320–321 using an IHlink:: SetHlinkSite function of the hyperlink object. In its call to IHlink::SetHlinkSite, the hyperlink container passes an IHlinkSite interface pointer of the hyperlink container's hyperlink site 334–335 and data specific to the hyperlink through a dwSiteData parameter of the function call. The hyperlink container 330 can use a same hyperlink site 334–335 to service multiple hyperlink objects 320–321.

When the user activates the hyperlink, the hyperlink container 330 at step 454 registers itself with the browse context object 350 to ensure that the hyperlink container is included in the navigation stack, so that the user can return to the hyperlink container with the "go back" command feature. The hyperlink container 330 also obtains the position of the window in which it is displayed from the hyperlink frame object 340 and the position of the hyperlink navigation toolbar 480 (FIG. 12) within the window, and registers this position information with the hyperlink browse context object 350. As in the simple hyperlinking process 400, the position information is used in appropriately positioning the window of the hyperlink target's frame when the hyperlink target is hosted within a different hyperlink frame object 341 so as to create the appearance of window reuse. The following pseudo-code is an example of the implementation of the step 454 in the hyperlink container.

```
// retrieve the hyperlink frame pointer
if (!m_fTriedToGetFrame && m_poleinplaceframe && m_phlframe
      == NULL) {
   m_fTriedToGetFrame = TRUE;
   m_poleinplaceframe->QueryInterface(IID_IHlinkFrame,
         (void**)&m_phlFrame);
   }
if (m_phlbc == NULL) {
   // get the browse context pointer
   if (m_phlFrame)
         m_phlFrame-> GetBrowseContext(&m_phlbc);
   else
         HlinkCreateBrowseContext(&m_phlbc);
   if (m_phlbc == NULL) return E_FAIL;
   // register with the browse context
   m_phlbc->Register(pmkThis, phls, &m_dwRegister);
   // because we want the user to be able to come back this
         object via GoBack functionality add
   // self to the navigation stack. This effectively tells the
         browse context that the current hyperlink container
   // referred to by pmkThis is a member (at the top) of the
         navigation stack
   m_phlbc->OnNavigateHlink(NULL, pmkThis, szLocation,
         szFriendlyName);
   }
if (m_phlframe == NULL) {
   HLBWINFO hlbwinfo;
   // initialize hlbwinfo with window locations and flags
   // register the browse window info in the browse context
         so it is later available to the hyperlink target and
   m_phlbc->SetBrowseWindowInfo(&hlbwinfo)
   // set the flag indicating that this window should be hidden
         after navigation. But this flag
   // is cleared in the IHlinkTarget::Navigate and
         IHlinkFrame::OnNavigate methods.
   m_fHide = TRUE;
   v_fHideAppFrame = TRUE; // only the MDI applications
         need this separate flag
   }
else {
   m_fHide = FALSE;
   v_fHideAppFrame = FALSE;
   }
hr = HlinkNavigate(pkl, m_phlframe, NULL, pbc /* could be NULL
      */, pibsc, m_phlbc);
if (hr == NOERROR) {
   if (m_fHide)
         // Hide this document
   if (m_vfHideAppFrame)
         // Hide/Minimize application's frame window
   }
```

The hyperlink container 330 next calls the IHlinkFrame::Navigate function of the hyperlink frame object 340 (e.g., the browser application 68 of FIG. 2) at step 455. The hyperlink frame object's IHlinkFrame::Navigate function may simply set some flags and defer to the hyperlink object's IHlink::Navigate function. However, the procedure of calling the IHlink::Navigate through the hyperlink frame object 340 also affords the hyperlink frame object the chance to provide an integrated user-interface, progress feedback, cancellation options, and other features as indicated at step 457. For displaying progress indication and cancellation user interface controls, the hyperlink frame object 340 can register an IBindStatusCallback interface of its own callback object at the step 457 with the browse context 358 so as to receive progress notification call backs during navigation. At step 458, the hyperlink frame object calls the hyperlink object's IHlink::Navigate function. The following pseudo-code is an example implementation of the IHlinkFrame::Navigate function in the hyperlink frame object 340.

```
IHlinkFrame::Navigate(DWORD grfHLNF, IBindCtx* pbc,
      IBindStatusCallback* pbsc, IHlink* phlDest)
{
   // This flag gets cleared in IHlinkFrame::OnNavigate().
         Thus if the Navigation within the same
   // frame window then we will get the right behavior as this
         flag gets cleared in the OnNavigate()
   // method.
   m_fHide = TRUE;
   // some frames need only the following function so that
         they can properly show and hide themselves.
   // others may hook themselves in to the
         IBindStatusCallback for progress notification
   hr = IHlink::Navigate(NULL, pbc, pbsc, phlDest);
   if (SUCCEEDED(hr) && m_fHide)
         // Hide the frame window
}// IHlinkFrame::Navigate
```

In the IHlink::Navigate function at step 459, the hyperlink object 320–321 navigates to the hyperlink target, such as by binding with the hyperlink target moniker. When navigation to the hyperlink target is complete, the hyperlink object 320–321 passes the hyperlink browse context 350 to the hyperlink target via the IHlinkTarget::SetBrowseContext function at step 460. The hyperlink object 320–321 then calls the hyperlink target's IHlinkTarget::Navigate function at step 461 to navigate to a specific location within the target. The following pseudo-code is an example implementation of the IHlink::Navigate function.

```
IHlink::Navigate(DWORD grfHLNF, IBindCtx* pbc,
      IBindStatusCallback* pbsc, IHlinkBrowseContext* phlbc)
{
   IHlinkTarget* phlTarget = NULL;
   IMoniker* pmkLeft = NULL;
   if (grfHLNF & HLNF_USEBROWSECONTEXTCLONE){
         grfHLNF &=
               ~HLNF_USEBROWSECONTEXTCLONE;
         phlbc->Clone(NULL, IID_IHlinkBrowseContext,
               &phlbc);
         }
   else {
         hr = m_phlSite->GetMoniker(m_dwSiteData,
               OLEGETMONIKER_ONLYIFTHERE,
               OLEWHICHMK_CONTAINER, &pmkLeft);
         if (FAILED(hr) || m_pmkTarget->IsEqual(pmkLeft)) {
               hr = m_phlsite->GetInterface(dwSiteData, 0,
                     IID_IHlinkTarget, (void**)&phlTarget);
               if (FAILED(hr))
                     phlbc->GetObject(m_pmkTarget,
                           &phlTarget);
         }  }
   if (phlTarget == NULL) {
```

-continued

```
    // Set the pbsc in the pbc to get asynch and
        notification binding behavior requested by
        caller
    m_pmkTarget->BindToObject(pmkLeft,
        IID_IHlinkTarget, &phlTarget);
    phlTarget->SetBrowseContext(phlbc);
    }
    phlTarget->Navigate(grfHLNF , m_szLocation);
}// IHlink::Navigate
```

As remarked above, the hyperlink container's hyperlink frame object 340 passes the hyperlink browse context object 350 to the hyperlink target 310 via the IHlinkTarget::SetBrowseContext function at the step 460. This allows the hyperlink target to access the navigation stack and the position information from the hyperlink browse context object. The following pseudo-code is an example implementation of the IHlinkTarget::SetBrowseContext function.

```
IHlinkTarget::SetBrowseContext(IHlinkBrowseContext* phlbc)
{
    if (m_phlbc != NULL) {
        m_phlbc->Revoke(m_dwRegister);
        m_phlbc->Release();
    }
    m_phlbc = phlbc;
    if (m_phlbc != NULL) {
        m_phlbc->AddRef();
        m_phlbc->Register(0, (IUnknown*)this, m_pmk,
            &m_dwRegister);
    }
    return S_OK;
}// CHlinkTarget::SetBrowseContext
```

At step 462 in the IHlinkTarget::Navigate function, the hyperlink target navigates to the specific location within the target indicated by the hyperlink (if any). Typically, this involves the hyperlink object interpreting the location string of the hyperlink and completing hyperlink navigation accordingly. The following pseudo-code is an example implementation of the IHlinkTarget::Navigate function within the hyperlink target object 310.

```
IHlinkTarget::Navigate(DWORD grfHLNF , LPCWSTR szLocation)
{
    IHlinkFrame* phlFrame = NULL;
    // if the object is not visible, activate it and show it. jump
        to the location indicated by szLocation
    // if this hyperlink target is an OLE Document Object, try
        to retrieve the hyperlink frame pointer from the
        IOleInPlaceFrame
    if (m_poleinplaceframe)
        m_poleinplaceframe->
            QueryInterface(IID_IHlinkFrame,
            (void**)&phlFrame);
    // notify the hlink frame and the browse context that the
        navigation is complete. Note: either phlFrame or
        m_phlbc may be NULL
    HlinkOnNavigate(phlFrame, m_phlbc, grfHLNF, m_pmk,
        szLocation, szFriendlyName);
    if (phlframe == NULL && !(grfHLNF &
        HLNF_INTERNALJUMP)) {
        HLBWINFO hlbwi;
        phlbc->GetBrowseWindowInfo(&hlbwi);
        // adjust the document and frame windows according
            to the dimensions in HLBWI
    }
    m_fHide = FALSE;
```
```
    m_fHideFrame = FALSE;
}// IHlinkTarget::Navigate
```

At step 463, the hyperlink target then calls the IHlinkFrame::OnNavigate function of its hyperlink frame object 341. In the OnNavigate function at step 464, the hyperlink frame object 341 repositions its window 68 (FIG. 2) and updates the window's visibility. If the hyperlink target's hyperlink frame object is the same as that of the hyperlink container, the hyperlink frame object sets an m-fHide flag to ensure that the frame remains visible. The following pseudo-code is an example implementation of the IHlinkFrame::OnNavigate function.

```
IHlinkFrame::OnNavigate(DWORD grfHLNF)
{
    if (!(grfHLNF & HLNF_INTERNALJUMP)) {
        HLBWINFO hlbwi;
        m_phlbc->GetBrowseWindowInfo(&hlbwi);
        // Adjust this document/frame windows according to
            the dimensions in hlbwi
    }
    m_fHide = FALSE;
}// IHlinkFrame::OnNavigate
```

Finally, at step 465, the hyperlink browse context object 350 receives notification of a successful navigation from the hyperlink target (within the IHlinkTarget::Navigate function) with a call to the hyperlink browse context object's IHlinkBrowseContext::OnNavigateHlink function. This allows the hyperlink browse context object to update the navigation stack. The following pseudo-code shows an example implementation of the IHlinkBrowseContext::OnNavigateHlink function.

```
IHlinkBrowseContext::OnNavigateHlink(DWORD grfHLNF,
    IMoniker* pmkTarget, LPCWSTR szLocation, LPCWSTR
    szFriendlyName)
{
    // if CreateNoHistory or Navigating To StackItem, return
        immediately
    // unless NavigatingBack or NavigatingForward is also set
    if (grfHLNF & (HLNF_CREATENOHISTORY |
        HLNF_NAVIGATINGTOSTACKITEM)) {
        if (!(grfHLNF & (HLNF_NAVIGATINGBACK |
            HLNF_NAVIGATINGFORWARD)))
            return NOERROR;
    }
    if (grfHLNF & HLNF_NAVIGATINGBACK)
        --m_iCurrent;
    else if (grfHLNF & HLNF_NAVIGATINGFORWARD)
        ++m_iCurrent;
    else {
        // Add this hyperlink to the navigation stack at
            m_iCurrent+1, remove all items greater than
            m_iCurrent+1,
        ++m_iCurrent;
    }
}// IHlinkBrowseContext::OnNavigateHlink
```

7.5 Hyperlinking Interfaces.

The hyperlink architecture 300 integrates the various components involved in hyperlink navigation with hyperlink interfaces. The hyperlink interfaces of the illustrated hyperlink architecture 300 are defined as follows:

```
typedef enum tagHLNF {
    HLNF_INTERNALJUMP,
    HLNF_NAVIGATINGBACK,
    HLNF_NAVIGATINGFORWARD,
    HLNF_USEBROWSECONTEXTCLONE,
    HLNF_OFFSETWINDOWORG,
    HLNF_OPENINNEWWINDOW,
    HLNF_CREATENOHISTORY,
    HLNF_NAVIGATINGTOSTACKITEM,
}HLNF;
typedef enum {
    HLINKWHICHMK_CONTAINER,
    HLINKWHICHMK_BASE
}HLINKWHICHMK;
interface IHlinkSite : IUnknown {
    HRESULT   GetMoniker([in] DWORD dwSiteData, [in] DWORD
        dwAssign, [in] DWORD dwWhich, [out] IMoniker** ppmk);
    HRESULT   GetInterface( [in] DWORD dwSiteData, [in] DWORD
        dwReserved, [in] REFIID riid, [out, iid_is(riid)] IUnknown**
        ppv);
    HRESULT   OnNavigationComplete( [in] DWORD dwSiteData,
        [in] HRESULT  hrStatus, [in] LPCWSTR pszStatus);
};
typedef enum {
    HLINKGETREF_DEFAULT,
    HLINKGETREF_ABSOLUTE,
    HLINKGETREF_RELATIVE
}HLINKGETREF;
typedef enum {
    HLFNAMEF_DEFAULT,
    HLFNAMEF_TRYCACHE,
    HLFNAMEF_TRYPRETTYTARGET,
    HLFNAMEF_TRYFULLTARGET,
    HLFNAMEF_TRYWIN95SHORTCUT
}HLFNAMEF;
typedef enum {
    HLINKMISC_ABSOLUTE,
    HLINKMISC_RELATIVE
}HLINKMISC;
interface IHlink : IUnknown {
    HRESULT   SetHlinkSite([in] IHlinkSite* phlSite, [in] DWORD
        dwSiteData);
    HRESULT   GetHlinkSite([out] IHlinkSite** pphlSite, [out]
        DWORD* pdwSiteData);
    HRESULT   GetMonikerReference([in] DWORD dwWhichRef,
        [out] IMoniker** ppmk, [in, out, unique] LPWSTR*
        pszLocation);
    HRESULT   GetStringReference([in] DWORD dwWhichRef, [out]
        LPWSTR* pszTarget, [out] LPWSTR* pszLocation);
    HRESULT   GetFriendlyName([in] DWORD grfHLFNAMEF, [out]
        LPWSTR* pszFriendlyName);
    HRESULT   SetFriendlyName([in] LPCWSTR szFriendlyName);
    HRESULT   GetTargetFrameName([out] LPWSTR*
        pszTargetFrameName);
    HRESULT   SetTargetFrameName([in] LPCWSTR
        szTargetFrameName);
    HRESULT   GetAdditionalParams([out] LPWSTR*
        pszAdditionalParams);
    HRESULT   SetAdditionalParams([in] LPCWSTR
        szAdditionalParams);
    HRESULT   Navigate( [in] DWORD grfHLNF, [in] IBindCtx* pbc,
        [in] IBindStatusCallback* pbsc, [in] IHlinkBrowseContext*
        phlbc);
    HRESULT   GetMiscStatus([out] DWORD *pdwStatus);
};
interface IHlinkTarget : IUnknown {
    HRESULT   SetBrowseContext([in, unique] IHlinkBrowseContext*
        phlbc);
    HRESULT   GetBrowseContext([out] IHlinkBrowseContext**
        pphlbc);
    HRESULT   Navigate([in] DWORD grfHLNF, [in, unique]
        LPCWSTR szJumpLocation);
    HRESULT   GetMoniker([in,unique] LPCWSTR szLocation, [in]
        DWORD dwAssign, [out] IMoniker** ppmkLocation);
    HRESULT   GetFriendlyName([in, unique] LPCWSTR szLocation,
        [out] LPWSTR* pszFriendlyName);
};
interface IHlinkFrame : IUnknown {
    HRESULT   SetBrowseContext([in] IHlinkBrowseContext* phlbc);
```
-continued
```
    HRESULT   GetBrowseContext([out] IHlinkBrowseContext**
        pphlbc);
    HRESULT   Navigate([in] DWORD grfHLNF, [in] IBindCtx* pbc,
        [in] IBindStatusCallback* pbsc, [in] IHlink* phlNavigate);
    HRESULT   OnNavigate([in] DWORD grfHLNF);
};
typedef struct tagHLITEM {
    ULONG        uHLID;
    LPWSTR       szFriendlyName;
}HLITEM;
typedef Enum<HLITEM*> IEnumHLITEM;
typedef enum tagHLBWIF {
    HLBWIF_HASFRAMEWNDINFO,
    HLBWIF_HASDOCWNDINFO  ,
    HLBWIF_FRAMEWNDMAXIMIZED,
    HLBWIF_DOCWNDMAXIMIZED
}HLBWIF;
typedef struct tagHLBWINFO {
    ULONG        cbSize;
    DWORD        grfHLBWIF;
    RECTL        rcFramePos;
    RECTL        rcDocPos;
}HLBWINFO;
typedef enum tagHLID {
    HLID_PREVIOUS,
    HLID_NEXT,
    HLID_CURRENT,
    HLID_STACKBOTTOM,
    HLID_STACKTOP
}HLID;
typedef enum tagHLQF {
    HLQF_ISVALID,
    HLQF_ISCURRENT
}HLQF;
interface IHlinkBrowseContext : IUnknown {
    HRESULT   Register([in] DWORD dwReserved, [in, unique]
        IUnknown* punk, [in, unique] IMoniker* pmk, [out]
        DWORD* pdwRegister);
    HRESULT   GetObject([in, unique] IMoniker* pmk, [out]
        IUnknown** ppunk);
    HRESULT   Revoke([in] DWORD dwRegister);
    HRESULT   SetBrowseWindowInfo([in, unique] HLBWINFO*
        phlbwi);
    HRESULT   GetBrowseWindowInfo([out] HLBWINFO* phlbwi);
    HRESULT   EnumNavigationStack([out] IEnumHLITEM**
        ppenumhlitem);
    HRESULT   QueryHlink([in] DWORD grfHLQF, [in] ULONG
        uHLID);
    HRESULT   GetHlink([in] ULONG uHLID, [out] IHlink** pphl);
    HRESULT   SetCurrentHlink([in] ULONG uHLID);
    HRESULT   OnNavigateHlink([in] DWORD grfHLNF, [in]
        IMoniker* pmkTarget, [in] LPCWSTR szLocation, [in]
        LPCWSTR szFriendlyName);
    HRESULT   Clone([in] IUnknown* punkOuter, [in] REFIID riid,
        [out, iid_is(riid)] IUnknown** ppv);
    HRESULT   Close([in] DWORD dwReserved);
};
// CLSID_StdHlink: {79eac9d0-baf9-11ce-8c82-00aa004ba90b}
DEFINE_GUID(CLSID_StdHlink, 0x79eac9d0, 0xbaf9, 0x11ce, 0x8c,
    0x82, 0x00, 0xaa, 0x00, 0x4b, 0xa9, 0x0b);
// CLSID_StdHlinkBrowseContext: {79eac9d1-baf9-11ce-8c82-
    00aa004ba90b}
DEFINE_GUID(CLSID_StdHlinkBrowseContext, 0x79eac9d1, 0xbaf9,
    0x11ce, 0x8c, 0x82, 0x00, 0xaa, 0x00, 0x4b, 0xa9, 0x0b);
#define CFSTR_HYPERLINK       TEXT("HyperLink")
#define CF_HYPERLINK
    RegisterClipboardFormat(CFSTR_HYPERLINK)
HRESULT   HlinkCreateBrowseContext([in] IUnknown* punkOuter,
    [in] REFIID riid, [out, iid_is(riid)] void** ppv);
HRESULT   HlinkQueryCreateFromData([in] IDataObject* pdatobj);
HRESULT   HlinkCreateFromData([in] IDataObject* pdatobj, [in]
    IHlinkSite* phlSite, [in] DWORD dwSiteData, [in] IUnknown*
    punkOuter, [in] REFIID riid, [out, iid_is(riid)] void** ppv);
HRESULT   HlinkCreateFromMoniker[in] IMoniker* pmkTarget,
    [in] LPCWSTR szLocation, [in] LPCWSTR szFriendlyName,
    [in] IHlinkSite* phlSite, [in] DWORD dwSiteData,
    [in] IUnknown* punkOuter, [in] REFIID riid,
    [out, iid_is(riid)] void** ppv);
HRESULT   HlinkCreateFromString([in] LPCWSTR szTarget, [in]
```

-continued

```
    LPCWSTR szLocation, [in] LPCWSTR szFriendlyName, [in]
    IHlinkSite* phlSite, [in] DWORD dwSiteData, [in] IUnknown*
    punkOuter, [in] REFIID riid, [out, iid_is(riid)] void** ppv);
typedef enum {
    HLSR_HOME,
    HLSR_SEARCHPAGE,
    HLSR_HISTORYFOLDER
    }HLSR;
HRESULT  HlinkGetSpecialReference([in] DWORD dwReference,
    [out] LPWSTR** pszReference);
HRESULT  HlinkSetSpecialReference([in] DWORD dwReference, [in]
    LPCWSTR szReference)
HRESULT  HlinkNavigateToStringReference([in] LPCWSTR
    szTarget, [in] LPCWSTR szLocation, [in] IHlinkSite* phlSite, [in]
    DWORD dwSiteData, [in] IHlinkFrame* phlframe, [in] DWORD
    grfHLNF, [in] IBindCtx* pbc, [in] IBindStatusCallback* pbsc, [in]
    IHlinkBrowseContext* phlbc);
HRESULT  HlinkNavigate ([in] IHlink *phl, IHlinkFrame* phlFrame,
    [in] DWORD grfHLNF, [in] IBindCtx* pbc,
    [in] IBindStatusCallback* pbsc,
```

-continued

```
    [in] IHlinkBrowseContext* phlbc);
HRESULT  HlinkOnNavigate([in] IHlinkFrame* phlframe, [in]
    IHlinkBrowseContext* phlbc, [in] DWORD grfHLNF,
    [in] IMoniker* pmkTarget,
    [in] LPCWSTR szLocation, [in] LPCWSTR
    szFriendlyName);
```

7.6 Hyperlinking Architecture Data Structures.

7.6.1 The HLNF Enumeration. The HLNF enumeration defines values that are used to indicate how hyperlink navigation is to proceed, and also convey contextual information about the navigation from each of the objects in the architecture 300 to the others. The values of the HLNF enumeration in the illustrated architecture 300 are shown in the following table.

TABLE 39

HLNF Enumeration Values.

| Value | Description |
| --- | --- |
| HLNF_INTERNALJUMP | The navigation is an internal jump within the current hyperlink target. The system-provided Hyperlink object will add this flag to the grfHLNF passed to its IHlink::Navigate prior to calling IHlinkTarget::Navigate when it determines that its relative moniker is NULL. Sending this flag on to the hyperlink target allows the target to exclude any expensive operations and avoid spurious repainting during IHlinkTarget::Navigate. |
| HLNF_NAVIGATINGBACK | The navigation is occurring due to the Go Back command, in which case no history should be created in the browse context, and the current position in the navigation stack should be moved back one element. Hyperlink frames and hyperlink containers send this flag to IHlink::Navigate for their Go Back command. |
| HLNF_NAVIGATINGFORWARD | The navigation is occurring due to the Go Forward command, in which case no history should be created in the browse context, and the current position in the navigation stack should be moved forward one element. Hyperlink frames and hyperlink containers send this flag to IHlink::Navigate for their Go Forward command. |
| HLNF_USEBROWSECONTEXTCLONE | When called in IHlink::Navigate, the passed in IHlinkBrowseContext should be immediately cloned (via IHlinkBrowseContext::Clone) and used for all subsequent browse context calls and parameters to other methods. |
| HLNF_OFFSETWINDOWORG | Indicates that the hyperlink target should offset its frame-and/or document-level window(s) from the position returned in the HLBWINFO structure by IHlinkBrowseContext::GetBrowseWindowContext during IHlinkTarget::Navigate. This flag is often passed in conjunction with |

TABLE 39-continued

HLNF Enumeration Values.

| Value | Description |
|---|---|
| | HLNF_USEBROWSECONTEXTCLONE to implement an Open in New Window command. |
| HLNF_OPENINNEWWINDOW | An abbreviation for two commonly coincident options: HLNF_USEBROWSECONTEXTCLONE and HLNF_OFFSETWINDOWORG. |
| HLNF_CREATENOHISTORY | Indicates that the browse context should not during IHlinkBrowseContext::OnNavigateHlink add this hyperlink to the navigation stack. |
| HLNF_NAVIGATINGTOSTACKITEM | Indicates that the browse context should not during IHlinkBrowseContext::OnNavigateHlink add this hyperlink to the navigation stack, and further that it should update its current position to reflect that this hyperlink is the current hyperlink. This flag is used when, for example, the user selects a particular hyperlink from the navigation stack - the user should navigate to the location, but the jump should not be recorded in the navigation stack, and the availability of the Go Forward and Go Back commands should be reevaluated. |

7.6.2 The HLINKWHICHMK Enumeration. The HLINKWHICHMK enumeration defines values which are passed to an IHlinkSite::GetMoniker function (described below) to specify whether the function call is requesting the moniker for the container document or a base moniker specific to the site. The values of the HLINKWHICHMK enumeration in the illustrated architecture 300 are shown in the following table.

TABLE 40

HLINKWHICHMK Enumeration Values.

| Value | Description |
|---|---|
| HLINKWHICHMK_ CONTAINER | Used to specify that the hyperlink wishes to retrieve the moniker for the hyperlink container corresponding to a particular hyperlink site. |
| HLINKWHICHMK_ BASE | Used to specify that the hyperlink wishes to request the base moniker corresponding to the particular hyperlink site. (these may be different, for example, if a <BASE> tag is used in HTML) |

7.6.3 The HLINKGETREF Enumeration. The HLINKGETREF enumeration defines values that are passed to an IHlink::GetMonikerReference and IHlink::GetStringReference functions (described below) to specify whether the function call is requesting the absolute reference for the hyperlink target. The values of the HLINKGETREF enumeration in the illustrated architecture 300 are shown in the following table.

TABLE 41

HLINKGETREF Enumeration Values

| Member | Description |
|---|---|
| HLINKGETREF_DEFAULT | Used to specify that the client of the hyperlink wishes to retrieve the default reference for hyperlink target. This depends on whether the hyperlink was initialized as a relative or an absolute reference. |
| HLINKGETREF_ABSOLUTE | Used to specify that the client of the hyperlink wishes to retrieve the absolute reference for hyperlink target. |
| HLINKGETREF_RELATIVE | Used to specify that the client of the hyperlink wishes to retrieve the relative reference for hyperlink target. |

7.6.4 The HLFNAMEF Enumeration. The HLFNAMEF enumeration defines values that are passed to an IHlink::GetFriendlyName function (described below) to specify which friendly name the function call is requesting. The values of the HLFNAMEF enumeration in the illustrated architecture 300 are shown in the following table.

TABLE 42

HLFNAMEF Enumeration Values.

| Member | Description |
|---|---|
| HLFNAMEF_TRYCACHE | Requests the friendly name that is cached in the Hlink object. |
| HLFNAMEF_TRYFULLTARGET | Requests the full display name of the hyperlink target. |
| HLFNAMEF_TRYPRETTYTARGET | Requests a beautified version of the display name of the hlink target. |

TABLE 42-continued

HLFNAMEF Enumeration Values.

| Member | Description |
| --- | --- |
| HLFNAMEF_TRYWIN95SHORTCUT | Requests a simplified version of the full display name of the hyperlink target (i.e. after stripping the path and the extension). |
| HLFNAMEF_DEFAULT | Requests the cached friendly name, else the simplified display name. |

7.6.5 The HLINKMISC Enumeration. The HLINKMISC enumeration defines values that are returned from an IHlink::GetMiscStatus function (described below) specifying whether the hyperlink object is a relative or an absolute hyperlink. The values of the HLINKMISC enumeration are shown in the following table.

TABLE 43

HLINKMISC Enumeration Values

| Member | Description |
| --- | --- |
| HLINKMISC_ABSOLUTE | The given hyperlink object contains an absolute reference to the hyperlink target. |
| HLINKMSIC_RELATIVE | The given hyperlink object contains a relative reference to the hyperlink target. |

7.6.6 The HLITEM Structure. This structure is returned from an IEnumHLITEM::Next function (described below) based on enumerators returned from an IHlinkBrowseContext::EnumNavigationStack function (described below). The values which are contained in the illustrated HLITEM structure are shown in the following table.

TABLE 44

HLITEM Structure Values.

| Value | Type | Description |
| --- | --- | --- |
| uHLID | ULONG | Identifies the hyperlink. Standard enumerators never return one of the logical HLID constants in this field, always an identifier. |
| szFriendlyName | LPWSTR | Friendly name of the hyperlink. Appropriate for display in the user interface. |

7.6.7 The HLBWIF Enumeration. The HLBWIF enumeration defines flags that are passed as part of an HLBWINFO structure (described below) which is associated with the hyperlink browse context 350. The HLBWINFO structure is retrieved from the hyperlink browse context object 350 using an IHlinkBrowseContext::GetBrowseWindowContext function (described below), and put into the hyperlink browse context object using an IHlinkBrowseContext::SetBrowseWindowContext function (described below). The values of the HLBWIF enumeration in the illustrated architecture 300 are shown in the following table.

TABLE 45

HLBWIF Enumeration Values

| Value | Description |
| --- | --- |
| HLBWIF_HASFRAMEWNDINFO | Indicates that this browse context has available frame-level window positioning information. |
| HLBWIF_HASDOCWNDINFO | Indicates that this browse context has available document-level window positioning information. |
| HLBWIF_FRAMEWNDMAXIMIZED | Only useful in combination with HLBWIF_HASFRAMEWNDINFO. Indicates that frame-level windows of the browse context should appear maximized. |
| HLBWIF_DOCWNDMAXIMIZED | Only useful in combination with HLBWIF_HASDOCWNDINFO. Indicates that document-level windows of the browse context should appear maximized. |

7.6.8 The HLBWINFO Structure. This data structure in the hyperlink browse context object 350 contains information relating to the locations and sizes of frame- and document-level windows of the browse context. The HLBWINFO structure is retrieved from the hyperlink browse context object 350 using an IHlinkBrowseContext::GetBrowseWindowContext function (described below), and put into the browse context using an IHlinkBrowseContext::SetBrowseWindowContext function (also described below). In the simple hyperlinking process 400 (FIG. 10) and the full hyperlinking process 450 (FIG. 11) described above, the hyperlink target 310 retrieves the HLBWINFO structure within the IHlinkTarget::Navigate function in order to reposition the hyperlink target's user interface properly and ensure as seamless a transition as possible to the hyperlink target. The values held in the HLBWINFO structure in the illustrated architecture 300 are shown in the following table.

TABLE 46

HLBWINFO Structure.

| Value | Type | Description |
| --- | --- | --- |
| cbSize | ULONG | Total size of this structure in bytes. |
| grfHLBWIF | DWORD | Values taken from the HLBWIF enumeration. |
| rcFramePos | RECTL | If grfHLBWIF & HLBWIF_HASFRAMEWNDINFO, contains the rectangle in screen coordinates of |

TABLE 46-continued

HLBWINFO Structure.

| Value | Type | Description |
|---|---|---|
| | | current frame-level windows within the browse context. When grfHLBWIF & HLBWIF_FRAMEWNDMAXIMIZED, frame-level windows are currently being displayed maximized. In this case rcFramePos is the "normal" size of frame-level windows, i.e. the rectangle to use for any frame-level window when it is non-maximized. |
| rcDocPos | RECTL | If grfHLBWIF & HLBWIF_HASDOCWNDINFO, contains the rectangle in screen coordinates of current document-level windows within the browse context. When grfHLBWIF & HLBWIF_DOCWNDMAXIMIZED, document-level windows are currently being displayed maximized. In this case rcDocPos is the "normal" size of document-level windows, i.e. the rectangle to use for any document-level window when it is non-maximized. |

7.6.9 The HLID Constants. For convenience and performance, individual hyperlink objects 320–321 are identified in the navigation stack which is maintained in the illustrated browse context 350 (and in a history/favorites list feature) using a hyperlink identifier (referred to herein as an HLID), rather than as an IHlink interface pointer. This prevents unnecessary passing of interface pointers across process boundaries in common user-interface scenarios, such as building a drop-down menu or scrollable list of the history, or when testing the current location in the navigation stack to enable "Go Back" and "Go Forward" features. The following table shows HLID values that are reserved in the illustrated architecture 300 to identify logical positions within a navigation stack.

TABLE 47

HLID Constants.

| Value | Description. |
|---|---|
| HLID_PREVIOUS | Indicates the hyperlink prior to the current one. If the current hyperlink is the first or only hyperlink in the navigation stack, or if there are no hyperlinks in the navigation stack, there is no previous hyperlink, and methods such as IHlinkBrowseContext::GetHlink will return NULL and E_FAIL when passed this value. |
| HLID_NEXT | Indicates the hyperlink after the current one. If the current hyperlink is the last or only hyperlink in the navigation stack, or if there are no hyperlinks in the navigation stack, there is no next hyperlink, and methods such as IHlinkBrowseContext::GetHlink will return NULL and E_FAIL when passed this value. |
| HLID_CURRENT | Indicates the current hyperlink. A browsing tool might offer a command to reload the current page, or to re-center the user interface around the beginning portion of the current hyperlink destination, or to restart animation, sound, or other activity by re-navigating to the current hyperlink. |
| HLID_STACKBOTTOM | Indicates the very first hyperlink in the navigation stack. If there are no hyperlinks in the navigation stack, there is no stack-bottom hyperlink, and |

TABLE 47-continued

HLID Constants.

| Value | Description. |
|---|---|
| | methods such as IHlinkBrowseContext::GetHlink will return NULL and E_FAIL when passed this value. |
| HLID_STACKTOP | Indicates the very last hyperlink in the navigation stack. If there are no hyperlinks in the navigation stack, there is no stack-top hyperlink, and methods such as IHlinkBrowseContext::GetHlink will return NULL and E_FAIL when passed this value. |

10 7.6.10 The HLQF Enumeration. The HLQF enumeration defines values that are passed to an IHlinkBrowseContext::QueryHlink function (described below) to allow the caller to determine the state of a particular hyperlink. The values of the HLQF enumeration in the illustrated architecture 300 are shown in the following table.

TABLE 48

HLQF Enumeration Constants.

| Value | Description |
|---|---|
| HLQF_ISVALID | Used to test the validity of a particular hyperlink. The uHLID parameter may specify either a specific hyperlink within the navigation stack or a relative hyperlink, such as HLID_NEXT or HLID_PREVIOUS. |
| HLQF_ISCURRENT | Used to test if the specific hyperlink (identified by the uHLID parameter) is the user's current position within the navigation stack. |

7.6.11 The CF HYPERLINK Clipboard Format. The illustrated hyperlink objects 320–321 support the IPersistStream interface, and can be stored as a serialized data stream (i.e., in the well known OLE IStream object) having a CF_HYPERLINK data format using the OleSaveToStreamEx function (a well known OLE function). For OLE Uniform Data Transfer in an object supporting the well known OLE IDataObject interface, the CF_HYPERLINK format may appear in either TYMED_ISTREAM or TYMED_HGLOBAL mediums.

7.6.12 The HLSR Enumeration. The HLSR enumeration defines values that are passed to an HlinkGetSpecialReference and an HlinkSetSpecialReference API functions (described below) to specify which value to set or get. The values of the HLSR Enumeration in the illustrated architecture are shown in the following table.

TABLE 49

HLSR Enumeration Values.

| Value | Description |
|---|---|
| HLSR_HOME | Specifies the hyperlink reference to the global user "home" page. |
| HLSR_SEARCHPAGE | Specifies the hyperlink reference to the global user "search page". |
| HLSR_HISTORYFOLDER | Specifies the reference to the global user "history folder" page. |

7.7 Hyperlinking Architecture API Functions.

7.7.1 The HlinkCreateBrowseContext API Function. This API function creates an empty, default instance of the system's hyperlink browse context object 350, and performs the equivalent of the function call, "CoCreateInstance (CLSID_StdHlinkBrowseContext, punkOuter, CLSCTX_SERVER, riid, ppv)." The parameters and return values of the function in the illustrated architecture 300 are shown in the following table.

TABLE 50

HlinkCreateBrowseContext API Function Parameters and Return Values.

| Argument | Type | Description |
|---|---|---|
| punkOuter | IUnknown* | Controlling IUnknown for the new browse context. Typically NULL, in which case the new browse context is not aggregated. |
| fcriid | REFIID | Identifies the interface to return on the new browse context. Typically IID_IHlinkBrowseContext, although it must be IID_IUnknown when punkOuter is non-NULL so that the aggregator can retrieve the new browse context's inner IUnknown for future delegation of QueryInterface. See the COM aggregation documentation for details. |
| ppv | void** | Location to return the riid interface. |
| Returns | S_OK | Success. |
| | E_INVALIDARG | One or more arguments are invalid. |

7.7.2 The HlinkQueryCreateFromData API Function. This function determines whether a hyperlink object can be created from a given IDataObject. In the illustrated hyperlink architecture 300, a hyperlink object can be created from a data storage object with the IDataObject interface if either, (1) the object offers the CF_HYPERLINK data format on either TYMED_ISTREAM or TYMED_HGLOBAL storage mediums; or (2) the object offers data in a Windows® 95 shortcut format. The parameters and return values of the HlinkQueryCreateFromData API function in the illustrated architecture 300 are shown in the following table.

TABLE 51

HlinkQueryCreateFromData API Function Parameters and Return Values

| Argument | Type | Description |
|---|---|---|
| pdatobj | IDataObject* | The source data object to query about the availability of hyperlink formats. |
| Returns | S_OK | Yes, a hyperlink can be created from the data. |
| | S_FALSE | No, a hyperlink can not be created from the data. |
| | E_INVALIDARG | One or more arguments are invalid. |

7.7.3 The HlinkCreateFromData API Function.

This API function creates a hyperlink object (e.g., the objects 320–321) from serialized data of a hyperlink object stored in a storage object having the IDataObject interface. Typically, the IDataObject storage object originates from a data transfer operation, such as a copy-paste transfer operation using the clipboard, or a drag-and-drop operation. In the clipboard transfer case, the transfer's destination application retrieves an interface pointer of the storage object's IDataObject interface via the well known OleGetClipboard function when processing a paste command. During a drag-and-drop transfer, an interface pointer of the storage object's IDataObject interface is passed in through the well known IDropTarget::Drop function to a destination application object supporting the well known OLE IDropTarget interface which was registered (using the well known RegisterDragDrop API function) to the destination application's window over which the mouse was released during the drag operation.

Once the destination application obtains the IDataObject interface pointer, the application enumerates available formats to determine how the new data is to merge with existing data. Typically, the destination application enumerates formats in order of highest-fidelity formats (such as OLE embedding or link objects and their own native data formats), medium-fidelity transfer formats (such as CF_RTF, CF_METAFILEPICT, CF_DIB, and so on), and finally low-fidelity transfer formats (such as CF_TEXT). The actual enumeration order depends on the context of the paste or drop operation and on the application itself and its user interaction model.

The following sample pseudo-code would typically be inserted at some point in function implementing paste or drop operations to allow for pasting and dropping of hyperlinks:

```
if (HlinkQueryCreateFromData(pdatobj) == S_OK) {
    // create a hyperlink site and other hyperlink-specific
        information as needed
    hr = HlinkCreateFromData(pdatobj, &hlSiteNew,
        dwSiteData, NULL, IID_IHlink, (void**)&hlNew);
}
```

The HlinkCreateFromData API function's parameters and return values in the illustrated architecture 300 are shown in the following table.

TABLE 52

HlinkCreateFromData API Function Parameters and Return Values.

| Argument | Type | Description |
|---|---|---|
| pdatobj | IDataObject* | The source data to create the hyperlink from. |
| phlSite | IHlinkSite* | The site for the new hyperlink object. |
| dwSiteData | DWORD | Additional site data for the new hyperlink object. |
| punkOuter | IUnknown* | Controlling IUnknown for the new hyperlink object. Typically NULL, in which case the new hyperlink is not aggregated. |
| riid | REFIID | Identifies the interface to return on the new hyperlink object. Typically IID_IHlink, although it must be IID_IUnknown when punkOuter is non-NULL so that the aggregator can retrieve the new hyperlink's inner IUnknown for future delegation of QueryInterface. See the COM aggregation documentation for details. |
| ppv | void** | Location to return the riid interface. |
| Returns | S_OK | Success. |
| | E_NOINTERFACE | The object did not support the riid interface. |
| | E_INVALIDARG | One or more arguments are invalid. |

7.7.4 The HlinkCreateFromMoniker API Function.

This API function creates a hyperlink object (e.g., hyperlink objects 320–321) from a moniker, a location string, and a friendly name. Typically, the function is used by the hyperlink container 330 as part of a user interface feature with which a user creates a new hyperlink based on an existing hyperlink, or edits an existing hyperlink. The following example demonstrates creating a new hyperlink phlNew from an existing hyperlink, phl, using the HlinkCreateFromMoniker API function by changing only the location within the hyperlink target.

```
phl->GetMonikerReference(&pmk, &szLocation);
phl->GetFriendlyName(&szFriendlyName);
// present UI allowing the user to change the destination of the
    hyperlink within the same hyperlink target
// show them szLocation, allow them to change it to
    szLocationNew, same for szFriendlyName
HlinkCreateFromMoniker(pmk, szLocationNew,
    szFriendlyNameNew, &hlSite, dwSiteData, NULL,
    IID_IHlink, &phlNew);
```

The parameters and return values of the HlinkCreateFromMoniker API function in the illustrated architecture 300 are shown in the following table.

TABLE 53

HlinkCreaterFromMoniker API Function Parameters and Return Values.

| Argument | Type | Description |
|---|---|---|
| pmkTarget | IMoniker* | The moniker to the hyperlink target for the new hyperlink. May not be NULL. |
| szLocation | LPCWSTR | The string representing the location within the hyperlink target for the new hyperlink. May not be NULL. |
| szFriendlyName | LPCWSTR | The string to use as the friendly name for the hyperlink. |
| phlSite | IHlinkSite* | The site for the new hyperlink object. |
| dwSiteData | DWORD | Additional site data for the new hyperlink object. |
| punkOuter | IUnknown* | Controlling IUnknown for the new hyperlink. Typically NULL, in which case the new hyperlink is not aggregated. |
| riid | REFIID | Identifies the interface to return on the new hyperlink. Typically IID_IHlink, although it must be IID_IUnknown when punkOuter is non-NULL so that the |

TABLE 53-continued

HlinkCreaterFromMoniker API Function Parameters and Return Values.

| Argument | Type | Description |
|---|---|---|
| | | aggregator can retrieve the new browse context's inner IUnknown for future delegation of QueryInterface. |
| ppv | void** | Location to return the riid interface. |
| Returns | S_OK | Success. |
| | E_INVALIDARG | One or more arguments are invalid. |

7.7.5 The HlinkCreateFromString API Function. This function creates a hyperlink object from text strings representing the hyperlink target, the location within the target, and a friendly name. Typically, the hyperlink container 330 uses this API function as part of a user-interface feature for creating new hyperlinks, where the user fills in a form or dialog of items, e.g., text strings for a target, location, friendly name, from which the hyperlink object is constructed. The following table shows the parameters and return values of the HlinkCreateFromString API in the illustrated architecture 300.

TABLE 54

HlinkCreateFromString API Function Parameters and

| Argument | Type | Description |
|---|---|---|
| szTarget | LPCWSTR | String which helps identify the hyperlink target. This string is resolved into a moniker via MkParseDisplayNameEx. |
| szLocation | LPCWSTR | The string representing the location within the hyperlink target for the new hyperlink. |
| szFriendlyName | LPCWSTR | The string to use as the friendly name for the hyperlink. |
| phlSite | IHlinkSite* | The site for the new hyperlink object. |
| dwSiteData | DWORD | Additional site data for the new hyperlink object. |
| punkOuter | IUnknown* | Controlling IUnknown for the new hyperlink. Typically NULL, in which case the new hyperlink is not aggregated. |
| riid | REFIID | Identifies the interface to return on the new hyperlink. Typically IID_IHlink, although it must be IID_IUnknown when punkOuter is non-NULL so that the aggregator can retrieve the new browse context's inner IUnknown for future delegation of QueryInterface. |
| ppv | void** | Location to return the riid interface. |
| Returns | S_OK | Success. |
| | E_INVALIDARG | One or more arguments are invalid. |

7.7.6 The HlinkGetSpecialReference API Function. For a given value from the HLSR enumeration, this API function returns the current user's default global home, search, or history page for browsing as a string. As an example, the browser application illustrated in FIG. 2 can use this API to retrieve a string that represents a user's home page to which the browser application navigates on launch or when executing a Go Home command. For navigating to the page, the browser application converts the string returned from the HlinkGetSpecialReference API function to a hyperlink object via the HlinkCreateFromString API function. The following table shows the parameters and return values of the HlinkGetSpecialReference API function in the illustrated hyperlinking architecture 300.

TABLE 55

HlinkGetSpecialReference API Function Parameters and Return Values.

| Argument | Type | Description |
|---|---|---|
| dwReference | DWORD | A value taken from the HLSR enumeration. |
| pszReference | LPWSTR* | Location to return the string to the global default page. May not be NULL. |
| Returns | S_OK | Success. |
| | E_INVALIDARG | The arguments are invalid. |

7.7.7 The HlinkSetSpecialReference API Function. For a given value from the HLSR enumeration, this API function sets the current user's default global home, search, or history page for browsing. For example, the browser application of FIG. 2 uses this API function to implement a Set Home command, with which the user sets the currently visible navigation point as his or her home page.

TABLE 56

The HlinkSetSpecialReference API Function Parameters and Return Values.

| Argument | Type | Description |
|---|---|---|
| dwReference | DWORD | A value taken from the HLSR enumeration. |
| szReference | LPCWSTR | The string to set to the global default page. |
| Returns | S_OK | Success. |
| | E_INVALIDARG | The arguments are invalid. |

7.7.8 The HlinkNavigateToStringReference API Function. This API function encapsulates the following common sequence of calls:

```
// create hyperlink site, IBindStatusCallback, gather bind context,
    and browse context
HlinkCreateFromString(szTarget, szLocation, szFriendlyName,
    &hlSite, dwSiteData, NULL, IID_IHlink, (void**)&phl);
HlinkNavigate(phl, phlFrame, grfHLNF, pbc, pbsc, phlbc);
phl->Release();
```

The following table shows the parameters and return values of the HlinkNavigateToStringReference API function in the illustrated architecture 300.

TABLE 57

HlinkNavigateToStringReference API Function Parameters and Return Values.

| Argument | Type | Description |
|---|---|---|
| szTarget | LPCWSTR | String which helps identify the hyperlink target. This string is resolved into a moniker for underlying binding operations via MkParseDisplayNameEx. |
| szLocation | LPCWSTR | The string representing the location within the hyperlink target for the new hyperlink. |
| phlSite | IHlinkSite* | The site for the new hyperlink object. (optional, in which case szTarget must be an absolute reference) |
| dwSiteData | DWORD | Additional site data for the new hyperlink object. |
| phlFrame | IHlinkFrame* | The hyperlink frame of the hyperlink container. May be NULL if the hyperlink container does not have a hyperlink frame. |

TABLE 57-continued

HlinkNavigateToStringReference API Function Parameters and Return Values.

| Argument | Type | Description |
|---|---|---|
| grfHLNF | DWORD | Values taken from the HLNF enumeration. |
| pbc | IBindCtx* | The bind context to use for any moniker binding performed during the navigation. May not be NULL. |
| pbsc | IBindStatus Callback* | The bind-status-callback to use for any asynchronous moniker binding performed during the navigation. May be NULL, in which case the caller is not interested in progress notification, cancellation, pausing, or low-level binding information. |
| phlbc | IHlinkBrows eContext* | The browse context to use for this navigation. The browse context includes history information in which this navigation is logged, if !(grfHLNF & HLNF_CREATENOHISTORY). |
| Returns | S_OK | Success. |
|  | E_INVALI DARG | One or more arguments are invalid. |

7.7.9 The HlinkNavigate API Function. This API function performs hyperlink navigates on a given hyperlink object and an optional hyperlink frame object. The function encapsulates the following sequence of calls:

```
if (phlFrame)
    phlFrame->Navigate(grfHLNF, pbc, pbsc, phl);
else if (phl)
    phl->Navigate(grfHLNF, pbc, pbsc, phlbc);
```

The following table shows the parameters and return values of the HlinkNavigate API function in the illustrated architecture 300.

TABLE 58

HlinkNavigate API Function Parameters and Return Values.

| Argument | Type | Description |
|---|---|---|
| phl | Ihlink* | The hyperlink object to be navigated. |
| phlFrame | IHlinkFrame* | The hyperlink frame of the hyperlink container. May be NULL if the hyperlink container does not have a hyperlink frame. |
| grfHLNF | DWORD | Values taken from the HLNF enumeration. |
| pbc | IBindCtx* | The bind context to use for any moniker binding performed during the navigation. May not be NULL. |
| pbsc | IBindStatusC allback* | The bind-status-callback to use for any asynchronous moniker binding performed during the navigation. May be NULL, in which case the caller is not interested in progress notification, cancellation, pausing, or low-level binding information. |
| phlbc | IHlinkBrowse Context* | The browse context to use for this navigation. The browse context includes history information in which this navigation is logged, if !(grfHLNF & HLNF_CREATENOHISTORY). |
| Returns | S_OK | Success. |
|  | E_INVALIDA RG | One or more arguments are invalid. |

7.7.10 The HlinkOnNavigate API Function. This API function encapsulates a sequence of steps performed in the IHlinkTarget::Navigate function (described below) of the hyperlink target object 310, namely calls to the IHlinkBrowseContext::OnNavigateHlink and IHlinkFrame::OnNavigate functions if the hyperlink target has a hyperlink frame such as the following:

```
phlbc->OnNavigateHlink(grfHLNF, pmkTarget, szLocation,
    szFriendlyName);
if (phlframe) phlframe->OnNavigate(grfHLNF);
```

The following table shows the parameters and return values of the HlinkOnNavigate API function in the illustrated hyperlinking architecture 300.

TABLE 59

HlinkOnNavigate API Function Parameters and Return Values.

| Argument | Type | Description |
|---|---|---|
| phlFrame | IHlinkFrame* | The hyperlink frame of the hyperlink container. May be NULL if the hyperlink container does not have a hyperlink frame. |
| phlbc | IHlinkBrowseCo ntext* | The browse context being used for this navigation. The browse context includes this navigation in its history information during IHlinkBrowseContext::OnNavigateHlin k if !(grfHLNF & HLNF_CREATENOHISTORY). |
| grfHLNF | DWORD | Values taken from the HLNF enumeration. |
| pmkTarget | IMoniker* | The moniker of the hyperlink target. May not be NULL. |
| szLocation | LPCWSTR | The string representing the location within the hyperlink target for the new hyperlink. May not be NULL. |
| szFriendly Name | LPCWSTR | The friendly name of the hyperlink. |
| Returns | S_OK | Success. |
|  | E_INVALIDARG | One or more arguments are invalid. |

7.8 The IHlinkSite Interface.

The IHlinkSite interface 338 of the hyperlink site objects 334–335 exposes member functions which allow the hyperlink objects 320–321 to evaluate a hyperlink target moniker relative to the hyperlink container 330. For example, the hyperlink object uses the IHlinkSite interface functions to evaluate a relative hyperlink target moniker that references a relative URL, such as "embeddedImage.gif," in relation to a base URL of the hyperlink container, such as "http://www.website.com/," so as to form the full URL of the hyperlink target ("http://www.website.com/embeddedImage.gif"). The member functions of the IHlinkSite interface 338 in the illustrated architecture 300 are detailed below.

7.8.1 The IHlinkSite::GetMoniker Function. This member function of the IHlinkSite interface 338 returns the moniker of the hyperlink container 330 for the hyperlink site 334–335. In the IHlink::Navigate function (described below), the hyperlink objects 320–321 call the IHlinkSite::GetMoniker function on the hyperlink site object 334–335 to retrieve a relative moniker designating the hyperlink container 330. The hyperlink objects use this moniker to determine if the hyperlink navigation is internal (i.e., to another location within the same hyperlink container 330,such as shown in FIG. 9 for the hyperlink object 320), or externally to another hyperlink target 310 (as shown in FIG. 9 for the hyperlink object 321). The following table shows the parameters and return values of the IHlinkSite::GetMoniker function in the illustrated architecture 300.

TABLE 60

IHlinkSite::GetMoniker Function Parameters and Return Values.

| Argument | Type | Description |
|---|---|---|
| dwSiteData | OWORD | Identifies the hyperlink to the hyperlink site. The hyperlink site initializes the hyperlink with this value as part of IHlink::SetHlinkSite. |
| dwAssign | DWORD | A value from the OLEGETMONIKER enumeration. Typically OLEGETMONIKER_ONLYIETHER E, indicating that the function should not force a moniker to be created if one does not already exist, or OLEGETMONIKER_FORCEASSIGN, indicating that the function should create a moniker if one does not exist. |
| dwWhich | DWORD | A value from the OLEWHICHMK enumeration. Typically OLEWHICHMK_CONTAINER, indicating that the site should return the moniker of the hyperlink container. |
| ppmk | IMoniker[] | Location to return the IMoniker interface of the specific moniker. |
| Returns | S_OK | Success. |
|  | E_INVALIDARG | One or more arguments are invalid. |

7.8.2 The IHlinkSite::GetInterface Function. This function retrieves an interface on the hyperlink container 330 (which is usually the document that contains the hyperlink site 334–335). Typically the IHlinkSite::GetInterface function is called by the hyperlink object 320–321 after calling the IHlinkSite::GetMoniker function and determining that there is no relative moniker as part of the hyperlink object's IHlink::Navigate function. The hyperlink object then calls the IHlinkSite::GetInterface function (with the riid parameter set to IID_IHlinkTarget) to retrieve an interface pointer of the IHlinkTarget interface 312 on the hyperlink container 330 so that the hyperlink object can directly call the hyperlink container's IHlinkTarget::Navigate function (described below), and thereby avoiding the typical moniker binding process. Accordingly, the IHlinkSite::GetInterface function behaves similarly to the QueryInterface function (a well known OLE function), except that the GetInterface function may choose which interface to return based on the dwSiteData parameter. Further, the interface returned from the function is not necessarily implemented on the same object that exposes IHlinkSite. The following table shows the parameters and return values of the IHlinkSite::GetInterface function.

TABLE 61

IHlinkSite::GetInterface Function Parameters and Return Values.

| Argument | Type | Description |
|---|---|---|
| dwSiteData | DWORD | Identifies the hyperlink to the hyperlink site. The hyperlink site initializes the hyperlink with this value as part of IHlink::SetHlinkSite. |
| dwReserved | DWORD | Reserved for future use. Must be zero. |
| riid | REFIID | Identifies the interface to return. |
| ppv | void** | Location to return the riid interface. |
| Returns | S_OK | Success. |
|  | E_NOINTERFACE | The desired interface is not available. |
|  | E_INVALIDARG | One or more arguments are invalid. |

7.8.3 The IHlinkSite::OnNavigationComplete Function. The hyperlink object 320–321 calls this method on the hyperlink site 334–335 to notify the hyperlink site that hyperlink navigation has been completed. The following table shows the parameters and return values of the IHlinkSite::OnNavigationComplete function in the illustrated architecture 300.

TABLE 62

IHlinkSite::OnNavigationComplete Function Parameters and Return Values.

| Argument | Type | Description |
|---|---|---|
| dwSiteData | DWORD | Identifies the hyperlink to the hyperlink site. The hyperlink site initializes the hyperlink with this value as part of IHlink::SetHlinkSite. |
| hrStatus | HRESULT | Result of the hyperlink navigation. Either S_OK for success or E_ABORT or E_FAIL. |
| pszStatus | LPCWSTR | A string describing the failure that occurred. |
| Returns | S_OK | Success. |
|  | E_INVALIDARG | One or more arguments are invalid. |

7.9 The IHlink Interface.

The hyperlink objects 320–321 in the hyperlinking architecture 300 support the IHlink interface which exposes member functions so as to allow the container 330 to set or retrieve the hyperlink object's hyperlink site, hyperlink target moniker, location string, and friendly name, as well as to initiate hyperlink navigation. These member functions are described below.

7.9.1 The IHlink::SetHlinkSite Function. The hyperlink container 330 calls this function on the IHlink interface of the hyperlink objects 320–321 to set the hyperlink site and associated site data on the hyperlink object. The hyperlink container 330 typically constructs the hyperlink site 334–335 first and then passes it through this function to a newly constructed hyperlink object. The hyperlink object 320–321 uses the hyperlink site 334–335 in order to navigate properly (i.e., relative to the hyperlink container 330) when IHlink::Navigate is called. The HlinkCreateFromData, HlinkCreateFromMoniker, and HlinkCreateFromString API functions also encapsulate calls to this function. The following table shows the parameters and return values of the IHlink::SetHlinkSite function in the illustrated architecture 300.

TABLE 63

IHlink::SetHlinkSite Function Parameters and Return Values.

| Argument | Type | Description |
|---|---|---|
| phlSite | IHlinkSite* | The new hyperlink site for this hyperlink. |
| dwSiteData | DWORD | Further site data to be kept on behalf of the site. |
| Returns | S_OK | Success. |
| | E_INVALIDARG | One or more arguments are invalid. |

7.9.2 The IHlink::GetHlinkSite Function. This function returns the hyperlink site and associated site data from the hyperlink object 320–321. The following table shows the parameters and return values of the IHlink::GetHlinkSite function in the illustrated architecture 300.

TABLE 64

IHlink::GetHlinkSite Function Parameters and Return Values.

| Argument | Type | Description |
|---|---|---|
| pphlSite | IHlinkSite** | Location to return the IHlinkSite interface. May not be NULL. |
| pdwSiteData | DWORD* | Location to return the site data. May not be NULL. |
| Returns | S_OK | Success. |
| | E_INVALIDARG | One or more arguments are invalid. |

7.9.3 The IHlink::GetMonikerReference Function. This function returns the hyperlink target moniker and location string of the hyperlink object 320-321. The hyperlink container 330 or other caller of this function can use the hyperlink target moniker to bind to the hyperlink object's hyperlink target via the function call, "IMoniker::BindToObject( . . . , IID_IHlinkTarget, . . . )." The hyperlink container 330 or other caller of this function can pass the location string to the hyperlink target via the IHlinkTarget::Navigate function (described below) to navigate to the proper destination within the target. The hyperlink container 330 also can use the location string to retrieve the current friendly name of the location within the target via the IHlinkTarget::GetFriendlyName function (described below). The following table shows the parameters and return values of the IHlink::GetMonikerReference function in the illustrated architecture 300.

TABLE 65

IHlink::GetMonikerReference Function Parameters and Return Values.

| Argument | Type | Description |
|---|---|---|
| dwWhichRef | DWORD | Value from the HLINKGETREF enumeration specifying whether to get the absolute or relative reference to the hyperlink target. |
| ppmk | IMoniker** | Location to return the moniker to the hyperlink target of the hyperlink reference, if any. May be NULL, in which case the caller is not interested in the moniker to the hyperlink target. |

TABLE 65-continued

IHlink::GetMonikerReference Function Parameters and Return Values.

| Argument | Type | Description |
|---|---|---|
| pszLocation | LPWSTR* | Location to return the location portion of the hyperlink reference, if any. May be NULL, in which case the caller is not interested in the location portion of the hyperlink reference. |
| Returns | S_OK | Success. |
| | E_INVALIDARG | One or more arguments are invalid. |

7.9.4 The IHlink::GetStringReference Function. This function retrieves strings from the hyperlink object 320–321 that identify the hyperlink target and the location within the hyperlink target. The implementation of this function in the illustrated hyperlink objects 320–321 retrieves the pszTarget string by calling the IMoniker::GetDisplayName function (described above) on the hyperlink target moniker in the hyperlink object 320–321. The following table shows the parameters and return values of the IHlink::GetStringReference function in the illustrated architecture 300.

TABLE 66

IHlink::GetStringReference Function Parameters and Return Values.

| Argument | Type | Description |
|---|---|---|
| dwWhichRef | DWORD | Value from the HLINKGETREF enumeration specifying whether to get the absolute or relative reference to the hyperlink target. |
| pszTarget | LPWSTR* | Location to return a string that helps identify the hyperlink target of the hyperlink reference. May be NULL, in which case the caller is not interested in the target string of the hyperlink reference. |
| pszLocation | LPWSTR* | Location to return the location portion of the hyperlink reference. May be NULL, in which case the caller is not interested in the location portion of the hyperlink reference. |
| Returns | S_OK | Success. |
| | E_INVALIDARG | One or more arguments are invalid. |

7.9.5 The IHlink::GetFriendlyName Function. This function retrieves the friendly name of the hyperlink object 320–321. The illustrated hyperlink objects 320–321 cache their friendly name, so the hyperlink object's friendly name may not necessarily correspond to the friendly name of the hyperlink target (which the hyperlink target returns via the IHlinkTarget::GetFriendlyName function, described below). The illustrated hyperlink objects 320–321 update the friendly name as part of the IHlink::Navigate function (described below). The hyperlink container 330 typically calls the IHlink::GetFriendlyName function to obtain the friendly names of the hyperlink objects for use in representing the hyperlinks within the hyperlink container's user interface. The following table shows the parameters and return values of the IHlink::GetFriendlyName function in the illustrated architecture 300.

TABLE 67

IHlink::GetFriendlyName Function Parameters and Return Values.

| Argument | Type | Description |
| --- | --- | --- |
| grfHLFNAMEF | DWORD | |
| pszFriendlyName | LPWSTR* | Location to return the friendly name of the hyperlink reference. May not be NULL. |
| Returns | S_OK | Success. |
| | E_INVALIDARG | One or more arguments are invalid. |

7.9.6 The IHlink::SetFriendlyName Function. This function sets the friendly name of the hyperlink object 320–321. The following table shows the parameters and return values of the IHlink::SetFriendlyName function in the illustrated architecture 300.

TABLE 68

IHlink::SetFriendlyName Function Parameters and Return Values.

| Argument | Type | Description |
| --- | --- | --- |
| pszFriendlyName | LPCWSTR | The friendly name of the hyperlink reference. |
| Returns | S_OK | Success. |
| | E_INVALIDARG | One or more arguments are invalid. |

7.9.7 The IHlink::GetTargetFrameName Function. This function retrieves the name of the hyperlink frame 340–341 for the hyperlink object's hyperlink target. The following table shows the parameters and return values of the IHlink::GetTargetFrameName function in the illustrated architecture 300.

TABLE 69

IHlink::GetTargetFrameName Function Parameters and Return Values.

| Argument | Type | Description |
| --- | --- | --- |
| pszTargetFrameName | LPWSTR* | Location to return the target frame name. May not be NULL. |
| Returns | S_OK | Success. |
| | E_INVALIDARG | One or more arguments are invalid. |

7.9.8 The IHlink::SetTargetFrameName Function. This funtion sets the target frame name for the hyperlink object 320–321. In the illustrated architecture 300, the target frame name is a text string that names the target frame 340–341 in which the hyperlink navigation is to occur, as an HTML frame-set. The following table shows the parameters and return values of the illustrated IHlink::SetTargetFrameName function.

TABLE 70

IHlink::SetTargetFrameName Function Parameters and Return Values.

| Argument | Type | Description |
| --- | --- | --- |
| pszTargetFrameName | LPCWSTR | The target frame name for the hyperlink. |
| Returns | S_OK | Success. |
| | E_INVALIDARG | One or more arguments are invalid. |

7.9.9 The IHlink::GetAdditionalParams Function. This function retrieves additional properties of the hyperlink object 320–321. The illustrated hyperlink objects 320–321 represent these properties as a parameter string having an extensible format as follows:

<$ID_1$="$value_1$"><$ID_2$="$value_2$"> . . . <$Id_n$="$value_n$">

The parameters saved in this string are interpreted mainly by the hyperlink frame 340–341. The following table shows the parameters and return values of the IHlink::GetAdditionalParams function in the illustrated architecture 300.

TABLE 71

IHlink::GetAdditionalParams Function Parameters and Return Values.

| Argument | Type | Description |
| --- | --- | --- |
| pszAdditionalParams | LPWSTR* | Location to return the additional parameters of the hyperlink. May not be NULL. |
| Returns | S_OK | Success. |
| | E_INVALIDARG | One or more arguments are invalid. |

7.9.10 The IHlink::SetAdditionalParams Function. This function sets the additional parameters string of the hyperlink objects 320–321. The following table shows the parameters and return values of the IHlink::SetAdditionalParams function in the illustrated architecture 300.

TABLE 72

IHlink::SetAdditionalParams Function Parameters and Return Values.

| Argument | Type | Description |
| --- | --- | --- |
| pszAdditionalParams | LPCWSTR | The additional parameters for the hyperlink |
| Returns | S_OK | Success. |
| | E_INVALIDARG | One or more arguments are invalid |

7.9.11 The IHlink::Navigate Function. The hyperlink container call this funtion to initiate hyperlink navigation by the hyperlink object 320–321 as described above. The following table shows the parameters and return values of the IHlink::Navigate function in the illustrated architecture 300.

TABLE 73

IHlink::Navigate Function Parameters and Return Values.

| Argument | Type | Description |
| --- | --- | --- |
| grfNLF | DWORD | Values taken from the HLNF enumeration. |
| pbc | IBindCtx* | The bind context to use for any moniker binding performed during the navigation. May not be NULL. |

TABLE 73-continued

IHlink::Navigate Function Parameters and Return Values.

| Argument | Type | Description |
|---|---|---|
| pbsc | IBindStatusCallback* | The bind-status-callback to use for any asynchronous moniker binding performed during the navigation. May be NULL, in which case the caller is not interested in progress notification, cancellation, pausing, or low-level binding information. |
| phlbc | IHlinkBrowseContext* | The browse context to use for this navigation. May not be NULL. As part of navigation, this browse context's navigation stack may be updated (depending on grfHLNF) and its cache of hyperlink targets will be consulted for matching hyperlink targets. |
| Returns | S_OK HLINK_S_NAVIGATED TOLEAFNODE | Success. |
| | E_INVALIDARG | One or more arguments are invalid. |

7.9.12 The IHlink::GetMiscStatus Function. The hyperlink container 330 (or other caller) calls this function to query whether the hyperlink represented by the hyperlink object 320–321 is an absolute or a relative hyperlink. The following table shows the parameters and return values of the IHlink:.GetMiscStatus function in the illustrated architecture 300.

TABLE 74

IHlink::GetMiscStatus Function Parameter and Return Values.

| Argument | Type | Description |
|---|---|---|
| pdwStatus | DWORD* | Location to return a value from the HLINKMISC enumeration. May not be NULL. |
| Returns | S_OK | Success. |
| | E_INVALIDARG | One or more arguments are invalid. |

7.10 The IHlinkTarget Interface.

Hyperlink targets 310, 330 implement the IHlinkTarget interface 312 to allow navigation to locations within the hyperlink targets. The following hyperlink target class definition shows the implementation of the illustrated hyperlink targets 310, 330 which maintains values to track the current hyperlinking browse context 350.

```
class CHlinkTarget : public IHlinkTarget {
    // prototypes for IHlinkTarget and IUnknown
        implementation
    IHlinkBrowseContext*    m_phlbc;
    IHlinkFrame*            m_phlframe;
    IMoniker*               m_pmk;
    DWORD                   m_dwRegister;
    BOOL                    m_fHide;
    BOOL                    m_fHideFrame;
};
```

7.10.1 The IHlinkTarget::SetBrowseContext Function. This function establishes the current hyperlink browse context 350 for the hyperlink target 310, 330. The illustrated hyperlink targets 310, 330 track only one browse context at a time, and release any references to prior browse contexts when a new hyperlink browse context is established via this function (as shown in the example pseudo-code for step 460 of FIG. 11). In this function, the hyperlink targets also register themselves with the established browse context 350. Later, during hyperlink navigation, the hyperlink target notifies the established hyperlink browse context 350 of a navigation event in the IHlinkTarget::Navigate function (described below) by calling the IHlinkBrowseContext:: OnNavigateHlink function (described below) on the browse context. Hyperlink targets which utilize the simple hyperlink navigation process 400 shown in FIG. 10 can implement this function as a stub function which returns the value, E_NOTIMPL, when called. The following table shows the parameters and return values of the IHlinkTarget::SetBrowseContext function in the illustrated architecture 300.

TABLE 75

IHlinkTarget: SetBrowseContext Function Parameters and Return Values.

| Argument | Type | Description |
|---|---|---|
| phlbc | IHlinkBrowseContext* | The browse context to set for the hyperlink target. |
| Returns | S_OK | Success. |
| | E_NOTIMPL | This hyperlink target does not integrate with browse contexts. |
| | E_INVALIDARG | One or more arguments are invalid |

7.10.2 The IHlinkTarget::GetBrowseContext Function. This function retrieves the currently established browse context 350 of the hyperlink target 310, 330. The following pseudo-code example demonstrates the implementation of this method by the illustrated hyperlink target 310 holding a reference to its browse context:

```
CHlinkTarget::GetBrowseContext(IHlinkBrowseContext** pphlbc)
{
    *pphlbc = m_phlbc;
    if (m_phlbc)
        m_phlbc->AddRef();
    return S_OK;
}// CHlinkTarget::GetBrowseContext
```

Hyperlink targets which utilize only the simple hyperlink navigation process 400 shown in FIG. 10 can implement this function as a stub function which returns the value, E_NOTIMPL, when called. The following table shows the parameter and return values of the IHlinkTarget::GetBrowseContext function in the illustrated architecture 300.

TABLE 76

IHlinkTarget::GetBrowseContext Function Parameter and Return Values.

| Argument | Type | Description |
|---|---|---|
| pphlbc | IHlinkBrowseContext* | Location to return the IHlinkBrowseContext interface of the current browse context. |
| Returns | S_OK | Success. |
| | E_NOTIMPL | This hyperlink target does not integrate with browse contexts. |
| | E_INVALIDARG | The pphlbc argument is invalid |

7.10.3 The IHlinkTarget::Navigate Function.

As described above, the hyperlink object 320–321 calls this function during the hyperlink navigation process 450 of FIG. 11 to cause the hyperlink target to navigate to a specified location (i.e., the location designated by the location string of the hyperlink target). If the specified location (i.e., the szLocation parameter) is not visible, the function navigates to and shows that location within the hyperlink target (as in the example pseudo-code shown above for the step 462 of FIG. 11).

Hyperlink targets which utilize only the simple hyperlink navigation process 400 shown in FIG. 10 implement this function, but do not utilize the browse context for window position information. The following table shows the parameter and return values of the IHlinkTarget::Navigate function in the illustrated architecture 300.

TABLE 77

IHlinkTarget::Navigate Function Parameters and Return Values.

| Argument | Type | Description |
|---|---|---|
| grfHLNF | DWORD | Values taken from the HLNF enumeration. |
| szLocation | LPCWSTR | Location within the hyperlink target to navigate to. |
| Returns | S_OK | Success. |
|  | E_INVALIDARG | One or more arguments are invalid. |

7.10.4 The IHlinkTarget::GetMoniker Function.

This function returns a moniker which references the hyperlink target 310, 330 for a given location within the hyperlink target specified by an input parameter, szLocation. The following pseudo-code example shows the implementation of the IHlinkTarget::GetMoniker function in the illustrated hyperlink target 310.

```
CHlinkTarget::GetMoniker(LPCWSTR szLocation, DWORD
    dwAssign, IMoniker** ppmk)
{
    // possibly create moniker dynamically according to
        dwAssign, simple targets will keep one on hand
    *ppmk = m_pmk;
    if(m_pmk)
        m_pmk->AddRef();
    return S_OK;
}// CHlinkTarget::GetMoniker
```

The following table shows the parameters and return values of the IHlinkTarget::GetMoniker function in the illustrated architecture 300.

TABLE 78

IHlinkTarget::GetMoniker Function Parameters and Return Values.

| Argument | Type | Description |
|---|---|---|
| szLocation | LPCWSTR | Identifies the hyperlink destination within this target. |
| dwAssign | DWORD | A value from the OLEGETMONIKER enumeration. Must be either OLEGETMONIKER_ONLYIFTHERE, indicating that the function should not force a moniker to be created if one does not already exist, or OLEGETMONIKER_FORCEASSIGN, indicating that the function should create a moniker if one does not exist. |
| ppmk | IMoniker** | Location to return an IMoniker interface. |
| Returns | S_OK | Success. |
|  | E_FAIL | A moniker does not exist for this hyperlink target and OLEGETMONIKER_ONLYIFTHERE was specified for dwAssign. |
|  | E_INVALIDARG | One or more arguments are invalid. |
|  | others | From moniker creation APIs such as CreateFileMoniker, MkParseDisplayName, etc. |

7.10.5 The IHlinkTarget::GetFriendlyName Function.

This function returns a friendly name for the location within the hyperlink target specified by the input parameter, szLocation. The following table shows the parameters and return values of the IHlinkTarget::GetFriendlyName function in the illustrated architecture 300.

TABLE 79

IHlinkTarget::GetFriendlyName Function Parameters and Return Values.

| Argument | Type | Description |
|---|---|---|
| szLocation | LPCWSTR | Identifies the hyperlink destination within this target. |
| pszFriendlyName | LPWSTR* | Location to return the friendly name. This string must be allocated using CoTaskMemAlloc. It is the caller's responsibility to free this string using CoTaskMemFree. |
| Returns | S_OK | Success. |
|  | E_OUTOFMEMORY | Insufficient memory to return the friendly name. |
|  | E_INVALIDARG | One or more arguments are invalid. |

7.11 The IHlinkFrame Interface.

The hyperlink frames 340–341 expose functions through the IHlinkFrame interface 342 to integrate with the hyperlink browse context 350. This integration allows the hyperlink frame 341 which hosts the hyperlink target 310 to properly position its window to create the appearance of window reuse when navigating to the hyperlink target. Hyperlink frames which utilize only the simple hyperlink navigation process shown in FIG. 10 need not integrate with the hyperlink browse context 350.

7.11.1 The IHlinkFrame::SetBrowseContext Function.

This function sets the hyperlink browse context 350 of the hyperlink frame 340–341. Hyperlink frames which utilize only the simple hyperlink navigation process 400 shown in FIG. 10 can implement this function as a stub function which returns the value E_NOTIMPL, when called. The following table shows the parameter and return values of the IHlinkFrame::SetBrowseContext function in the illustrated architecture 300.

TABLE 80

IHlinkFrame::SetBrowseContext Function Parameters and Return Values.

| Argument | Type | Description |
|---|---|---|
| phlbc | IHlinkBrowseContext* | The browse context to set for the hyperlink frame. |
| Returns | S_OK | Success. |
|  | E_NOTIMPL | This hyperlink target does not integrate with browse contexts. |
|  | E_INVALIDARG | The phlbc argument is invalid. |

7.11.2 The IHlinkFrame::GetBrowseContext Function. This function returns the browse context of the hyperlink frame 340–341. Hyperlink frames which utilize only the simple hyperlink navigation process 400 shown in FIG. 10 can implement this function as a stub function which returns the value, E_NOTIMPL, when called. The following table shows the parameter and return values of the IHlinkFrame::GetBrowseContext function in the illustrated architecture 300.

TABLE 81

IHlinkFrame::GetBrowseContext Function Parameters and Return Values.

| Argument | Type | Description |
|---|---|---|
| pphlbc | IHlinkBrowseContext** | Location to return the browse context of the hyperlink frame. |
| Returns | S_OK | Success. |
|  | E_NOTIMPL | This hyperlink target does not integrate with browse contexts. |
|  | E_INVALIDARG | The pphlbc argument is invalid. |

7.11.3 The IHlinkFrame::Navigate Function. This function initiates hyperlink navigation by a hyperlink object specified by its phylNavigate parameter. As described above for the simple hyperlink navigation process 400 of FIG. 10 and the full hyperlink navigation process of FIG. 11, the IHlinkFrame::Navigate function is typically called by the hyperlink object 320–321 in the hyperlink object's IHlink::Navigate function to allow the hyperlink frame to interpose itself in the hyperlink navigation process. The following table shows the parameters and return values of the IHlinkFrame::Navigate function in the illustrated architecture.

TABLE 82

IHlinkFrame::Navigate Function Parameters and Return Values.

| Argument | Type | Description |
|---|---|---|
| grfHLNF | DWORD | Values taken from the HLNF enumeration. |
| pbc | IBindCtx* | The bind context to use for any moniker binding performed during the navigation. May not be NULL. |
| pbsc | IBindStatusCallback* | The bind-status-callback to use for any asynchronous moniker binding performed during the navigation. May be NULL, in which case the caller is not interested in progress notification, cancellation, pausing, or low-level binding information. |

TABLE 82-continued

IHlinkFrame::Navigate Function Parameters and Return Values.

| Argument | Type | Description |
|---|---|---|
| phlNavigate | IHlink* | The hyperlink to navigate to. |
| Returns | S_OK | Success. |
|  | E_INVALIDARG | One or more arguments are invalid. |
|  | others | From IHLink::Navigate. |

7.11.4 The IHlinkFrame::OnNavigate Function. The hyperlink target 310 calls this function Qn its hyperlink frame 341 during the IHlinkTarget::Navigate function (described above), usually via the HlinkOnNavigate API Function (described above), to notify the hyperlink frame that a hyperlink has been navigated. This allows the hyperlink frame to update user interface elements associated with navigation. The following table shows the parameters and return values of the IHlinkFrame::OnNavigate function in the illustrated architecture 300.

TABLE 83

IHlinkFrame::OnNavigate Function Parameters and Return Values.

| Argument | Type | Description |
|---|---|---|
| grfHLNF | DWORD | Values taken from the HLNF enumeration. |
| Returns | S_OK | Success. |
|  | E_INVALIDARG | One or more arguments are invalid. |

7.12 The IHlinkBrowseContext Interface.

The hyperlink browse context 350 exposes functions through the IHlinkBrowseContext interface which allow objects that integrate with the browse context (e.g., the hyperlink objects, hyperlink containers, hyperlink targets, and hyperlink frames) to register and retrieve information relating to hyperlink navigation. This allows the browse context 350 to maintain the navigation stack, which is utilized for "go back" and "go forward" commands. These functions also provide for exchanging window position information (including hyperlink navigation toolbar position) between the hyperlink frame 340 of the hyperlink container 330 and the hyperlink frame 341 of the hyperlink target 310 to create the appearance of window reuse.

7.12.1 The IHlinkBrowseContext::Register Function. This function registers a calling object (e.g., the hyperlink target 310) with the browse context 350. The browse context 350 maintains a table of moniker-object bindings (the running objects table 358 of FIG. 9) to facilitate reuse of hyperlink targets during navigation. When navigating to a hyperlink target, the hyperlink object 320–321 consults this table (via an IHlinkBrowseContext::GetObject function described below) to check whether the hyperlink target 310 is already registered as running, and thus avoid launching a new instance of the hyperlink target application and reloading the already running hyperlink target.

In the illustrated architecture 300, each hyperlink target 310 is required to register in the browse context 350 using the IHlinkBrowseContext::Register function when their IHlinkTarget::SetBrowseContext function is called. The hyperlink target 310 keeps the value returned through the output parameter, *pdwRegister, for use in revoking the registration. The hyperlink target unregisters from the browse context 350 (by calling an IHlinkBrowseContext::

Revoke function described below) on shutdown or if their established browse context changes (from a call to the IHlinkTarget::SetBrowseContext function described above).

The following table shows the parameters and return values of the IHlinkBrowseContext::Register function in the illustrated architecture 300.

TABLE 84

IHlinkBrowseContext::Register Function Parameters and Return Values.

| Argument | Type | Description |
|---|---|---|
| dwReserved | DWORD | Reserved for future use. Must be zero. |
| punk | IUnknown * | The object being registered. |
| pmk | IMoniker* | Moniker that identifies the object being registered. |
| pdwRegister | DWORD* | Location to return a value identifying the registration which can be used to subsequently revoke the registration. |
| Returns | S_OK | Success. |
| | MK_S_MONIKERAL READYREGISTERED | Indicates that the object was successfully registered but that another object (possibly the same object) has already been registered with the same moniker in this browse context. |
| | E_OUTOFMEMORY | There was insufficient memory to register the object with the browse context. |
| | E_INVALIDARG | One or more arguments are invalid. |

7.12.2 The IHlinkBrowseContext::GetObject Function. This function retrieves an object previously registered in the browse context under the name specified by a parameter, pmk. The following table shows the parameters and return values of the IHlinkBrowseContext::GetObject function in the illustrated architecture 300.

TABLE 85

IHlinkBowseContext::GetObject Function Parameters and Return Values.

| Argument | Type | Description |
|---|---|---|
| pmk | IMoniker* | Identifies the object being retrieved. |
| ppunk | IUnknown** | Location to return the IUnknown interface of the object being retrieved. |
| Returns | S_OK | Success. |
| | S_FALSE | There was no object registered under pink in the browse context. |
| | E_INVALIDARG | One or more arguments are invalid. |

7.12.3 The IHlinkBrowseContext::Revoke Function. This function revokes a registration of an object with this browse context previously made using the IHlinkBrowseContext:: Register function described above. The following table shows the parameters and return values of the IHlinkBrowseContext::Revoke function in the illustrated architecture 300.

TABLE 86

IHlinkBrowseContext::Revoke Function Parameters and Return Values.

| Argument | Type | Description |
|---|---|---|
| dwRegister | DWORD | A value returned by a previous call to IHlinkBrowseContext::Register which identifies the object registration to be revoked. |
| Returns | S_OK | Success. |
| | E_INVALIDARG | The dwRegister argument is invalid. |

7.12.4 The IHlinkBrowseContext::SetBrowseWindowInfo Function. This function establishes the HLBWINFO structure (described above) of the browse context 350. The HLBWINFO structure contains information about the position and properties of the document- and frame-level windows of other hyperlink frames and documents which use the browse context 350. The hyperlink targets and containers 310, 330 call this function whenever their document-level (and optionally their frame-level) user interface is resized. This occurs under the Windows® operating system for example, if the user moves their document window, tiles several frame-level applications, or moves the task-bar and causes their windows to receive WM_SIZE, WM_MOVE, or WM_WINDOWPOSCHANGED messages (which are well known window messages in the Windows® operating system). The following table shows the parameters and return values of the IHlinkBrowseContext::SetBrowseWindowInfo function in the illustrated architecture 300.

TABLE 87

IHlinkBrowseContext::SetBrowseWindowInfo Function Parameters and Return Values.

| Argument | Type | Description |
|---|---|---|
| phlbwi | HLBWINFO* | Points to the new HLBWINFO structure for this browse context. |
| Returns | S_OK | Success. |
| | E_INVALIDARG | The phlbwi argument is invalid. |

7.12.5 The IHlinkBrowseContext::GetBrowseWindowInfo Function. This function retrieves the HLBWINFO structure (described above) currently associated with the browse context 350. The following table shows the parameters and return values of the IHlinkBrowseContext::GetBrowseWindowInfo function in the illustrated architecture 300.

TABLE 87

IHlinkBrowseContext::GetBrowseWindowInfo Function Parameters and Return Values.

| Argument | Type | Description |
|---|---|---|
| phlbwi | HLBWINFO* | Location to return the HLBWINFO structure. |
| Returns | S_OK | Success. |
| | E_INVALIDARG | The phlbwi argument is invalid. |

7.12.6 The IHlinkBrowseContext::EnumNaviaationStack Function. This function returns an enumerator function pointer which can be used to enumerate the current contents of the navigation stack. The enumerator returns HLITEM structures (a well known OLE data structure), which contain references to the previously navigated hyperlinks recorded in the navigation stack (in the form of HLID values described above), and "friendly names" which can be displayed in a user interface. The hyperlink frame 340–341 typically calls this function when presenting drop-down lists and dialog boxes for a history list or like browsing feature. The following table shows the parameters and return values of the IHlinkBrowseContext::EnumNavigationStack function in the illustrated architecture 300.

TABLE 88

IHlinkBrowseContext::EnumNavigationStack Function Parameters and Return Values.

| Argument | Type | Description |
|---|---|---|
| ppenumhlitem | IEnumHLITEM** | Location to return the IEnumHLITEM enumeration interface over the set of hyperlinks in this navigation stack. |
| Returns | S_OK | Success. |
| | E_INVALIDARG | The ppenumhlitem argument is invalid. |

7.12.7 The IHlinkBrowseContext::QueryHlink Function. This function tests the validity of an HLID value (described above). This function is typically called by user interface elements of the hyperlink frame 340–341 to determine whether or not to enable features such as "Go Forward" and "Go Back" commands by passing the HLiD values, HLID_NEXT and HLID_PREVIOUS, as the uHLID of the function, as in the following pseudo code example:

```
// tests if Go Forward should be enabled
phlbc->QueryHlink(HLQF_ISVALID, HLID_NEXT);
// tests if Go Back should be enabled
phlbc->QueryHlink(HLQF_ISVALID, HLID_PREVIOUS);
```

The following table shows the parameters and return values of the IHlinkBrowseContext::QueryHlink function in the illustrated architecture 300.

TABLE 89

IHlinkBrowseContext::QuerYHlink Function Parameters and Return Values.

| Argument | Type | Description |
|---|---|---|
| grfHLQF | DWORD | A single value taken from the HLQF enumeration. |
| uHLID | ULONG | Identifies the hyperlink to query about. May be a value taken from the HLID constants to indicate a logically identified hyperlink, such as HLID_PREVIOUS or HLID_NEXT. |
| Returns | S_OK | If grfHLQF is HLQF_ISVALID, uHLID identifies a valid hyperlink within the browse context. If grfHLQF is HLQF_ISCURRENT, uNLID identifies the current hyperlink of the browse context. |
| | S_FALSE | If grfHLQF is HLQF_ISVALID, uHLID does not identify a valid hyperlink within the browse context. If grfHLQF is HLQF_ISCURRENT, uHLID does not identify the current hyperlink of the browse context. |

TABLE 89-continued

IHlinkBrowseContext::QuerYHlink Function Parameters and Return Values.

| Argument | Type | Description |
|---|---|---|
| | E_INVALIDARG | The grfHLQF flags are invalid. grfHLQF must specify either HLQF_ISVALID or HLQF_ISCURRENT. |

7.12.8 The IHlinkBrowseContext::GetHlink Function. This function retrieves a hyperlink from the browse context 350 specified by an HLID constant (described above). The following table shows the parameters and return values of the IHlinkBrowseContext::GetHlink function in the illustrated architecture 300.

TABLE 90

IHlinkBrowseContext::GetHlink Function Parameters and Return Values.

| Argument | Type | Description |
|---|---|---|
| uHLID | ULONG | Identifies the hyperlink to retrieve. May be a value taken from the HLID constants to indicate a logically identified hyperlink, such as HLID_PREVIOUS or HLID_NEXT. |
| pphl | IHlink** | Location to return the IHlink interface of the hyperlink. |
| Returns | S_OK | Success. |
| | E_FAIL | The specified hyperlink does not exist. |
| | E_INVALIDARG | One or more arguments are invalid. |

7.12.10 The IHlinkBrowseContext::SetCurrentHlink Function. This function sets the current hyperlink in the navigation stack of the browse context 350. The following table shows the parameters and return values of the IHlinkBrowseContext::SetCurrentHlink function in the illustrated architecture 300.

TABLE 91

IHlinkBrowseContext::SetCurrentHlink Function Parameters and Return Values.

| Argument | Type | Description |
|---|---|---|
| uHLID | ULONG | Identifies the hyperlink to set. May be a value taken from the HLID constants to indicate a logically identified hyperlink, such as HLID_PREVIOUS or HLID_NEXT. |
| Returns | S_OK | Success. |
| | E_FAIL | The specified hyperlink does not exist. |
| | E_INVALIDARG | One or more arguments are invalid. |

7.12.10 The IHlinkBrowseContext::OnNavigateHlink Function. The hyperlink target 310 calls this function (as part of the IHlinkTarget::Navigate function described above) to notify the browse context 350 that a hyperlink has been successfully navigated (i.e., at the step 465 of the full hyperlink navigation process 450 of FIG. 11). The following table shows the parameters and return values of the IHlinkBrowseContext::OnNavigateHlink function in the illustrated architecture 300.

TABLE 92

IHlinkBrowseContext::OnNavigateHlink Function Parameters and Return Values.

| Argument | Type | Description |
| --- | --- | --- |
| grfHLNF | DWORD | Values taken from the HLNF enumeration. |
| pmkTarget | IMoniker* | The moniker of the hyperlink target. |
| szLocation | LPCWSTR | A string identifying the location within the hyperlink target that was navigated to. May not be NULL. |
| szFriendlyName | LPCWSTR | The friendly name of the location within the hyperlink target that has been navigated to. May not be NULL. |
| Returns | S_OK | Success. |
|  | E_INVALIDARG | One or more arguments are invalid. |

7.12.11 The IHlinkBrowseContext::Clone Function. This function creates a duplicate of the browse context 350. The following table shows the parameters and return values of the IHlinkBrowseContext::Clone function in the illustrated architecture 300.

TABLE 93

IHlinkBrowseContext::Clone Function Parameters and Return Values.

| Argument | Type | Description |
| --- | --- | --- |
| punkOuter | IUnknown* | Controlling IUnknown for the new browse context. Typically NULL, in which case the new browse context is not aggregated. |
| riid | REFIID | Identifies the interface to return on the new browse context. Typically IID_IHlink although it must be IID_IUnknown when punkOuter is non-NULL so that the aggregator can retrieve the new browse contexts inner IUnknown for future delegation of QueryInterface. |
| ppv | void** | Location to return the riid interface. |
| Returns | S_OK | Success. |
|  | E_INVALIDARG | One or more arguments are invalid. |

7.18.12 The IHlinkBrowseContext::Close Function. This function closes the hyperlink browse context, and releases all hyperlink targets that have been registered with the browse context via IHlinkBrowseContext::Register. The following table shows the parameters and return values of the IHlinkBrowseContext::Close function in the illustrated architecture 300.

TABLE 94

IHlinkBrowseContext::Close Function Parameters and Return Values.

| Argument | Type | Description |
| --- | --- | --- |
| dwReserved | DWORD | Reserved for future use. Must be zero. |
| Returns | S_OK | Success. |
|  | E_INVALIDARG | The dwReserved argument is invalid. |

Having described and illustrated the principles of our invention with reference to an illustrated embodiment, it will be recognized that the illustrated embodiment can be modified in arrangement and detail without departing from such principles. It should be understood that the programs, processes, or methods described herein are not related or limited to any particular type of computer apparatus, unless indicated otherwise. Various types of general purpose or specialized computer apparatus may be used with or perform operations in accordance with the teachings described herein. Elements of the illustrated embodiment shown in software may be implemented in hardware and vice versa.

In view of the many possible embodiments to which the principles of our invention may be applied, it should be recognized that the detailed embodiments are illustrative only and should not be taken as limiting the scope of our invention. Rather, we claim as our invention all such embodiments as may come within the scope and spirit of the following claims and equivalents thereto.

We claim:

1. A method of computer software execution to support browsing documents of a plurality of different application programs in a computer system having a video display, comprising:
    displaying a view in a first window associated with a first application program on the video display, the view including a hyperlink which designates a target associated with a second different application program, the first window having a window position on the video display;
    on user activation of the hyperlink, performing the steps of:
        causing the second application program to be loaded on the computer system;
        passing the window position from the first application program to the second application program;
        positioning a second window associated with the second application program at the window position on the video display; and
        displaying a view of the target in the second window on the video display.

2. The method of claim 1 wherein the step of passing the window position comprises:
    registering the window position by the first application program in a browse context object which supports an interface having functions for registering and for retrieving the window position from the browse context object; and
    retrieving the window position by the second application program from the browse context object.

3. The method of claim 1 comprising:
    displaying a tool bar in the first window on the video display, the tool bar including user interface controls for controlling navigation and having a tool bar position in the first window;
    passing the tool bar position from the first application program to the second application program; and
    displaying the tool bar at the tool bar position in the second window on the video display.

4. The method of claim 3 wherein the step of passing the tool bar position comprises:
    registering the tool bar position by the first application program in a browse context object which supports an interface having functions for registering and for retrieving the tool bar position from the browse context object; and
    retrieving the tool bar position by the second application program from the browse context object.

5. At least one computer-readable program carrying medium having a computer-executable system software program carried thereon, the system software having an object-oriented architecture for navigating a hyperlink, the system software comprising:
- a hyperlink object containing a hyperlink target indicator and a hyperlink target location indicator, and having a navigating function for navigating to a location in a target of the hyperlink identified by the indicators;
- a container of the hyperlink object, the container providing a first display having a representation of the hyperlink;
- a first frame object for providing a first display frame in a first window, the first display frame having a first area in which the container presents the first display;
- the hyperlink target providing a second display;
- a second frame object for providing a second display frame in a second window, the second display frame having a second area in which the hyperlink target presents the second display;
- a browse context object having functions for registering a position of the first window and for retrieving the position; and
- the second frame object operating to retrieve the position of the first window from the browse context object when the target is navigated, and to position the second window in place of the first window to thereby create an appearance of window reuse by the hyperlink target.

6. The at least one computer-readable program carrying medium of claim 5 comprising:
- the first and second frame objects providing a hyperlink navigation toolbar in their respective display frames;
- the browse context object registering a position of the hyperlink navigation toolbar within the first display frame;
- the second frame object operating to retrieve the position of the hyperlink navigation toolbar from the browse context object, and to position the hyperlink navigation toolbar within the second display frame to thereby create an appearance of window reuse by the hyperlink target.

7. The at least one computer-readable program carrying medium of claim 5 comprising:
- a table for listing running objects;
- the hyperlink object operating to check whether the target is one of the running objects listed in the table upon navigating the hyperlink, and to navigate to said one of the running objects if listed in the table.

8. The at least one computer-readable program carrying medium of claim 7 comprising:
- a browse context object for updating the table with the target according to a least recently used scheme upon the hyperlink object navigating the hyperlink.

9. The at least one computer-readable program carrying medium of claim 5 comprising:
- an application programming interface function for causing the hyperlink object to navigate the hyperlink.

10. A computer system with support for browsing documents of a plurality of different application programs, the computer system comprising:
- a video display for presenting views of documents;
- a program memory for storing loaded application programs and multi-application document browsing navigation software;
- a processor programmed by the software stored in the program memory to:
  - cause the video display to display a view in a first window associated with a first application program on the video display, the view including a hyperlink which designates a target associated with a second different application program, the first window having a window position on the video display;
  - on user activation of the hyperlink, performing the steps of:
    - causing the second application program to be loaded in the program memory;
    - passing the window position from the first application program to the second application program;
    - positioning a second window associated with the second application program at the window position on the video display; and
    - displaying a view of the target in the second window on the video display.

11. The computer system of claim 10 wherein the processor is further programmed to, when passing the window position:
- register the window position by the first application program in a browse context object which supports an interface having functions for registering and for retrieving the window position from the browse context object; and
- retrieve the window position by the second application program from the browse context object.

12. The computer system of claim 10 wherein the processor is further programmed to:
- display a tool bar in the first window on the video display, the tool bar including user interface controls for controlling navigation and having a tool bar position in the first window;
- pass the tool bar position from the first application program to the second application program; and
- display the tool bar at the tool bar position in the second window on the video display.

13. The computer system of claim 12 wherein the processor is further programmed to, when passing the tool bar position:
- register the tool bar position by the first application program in a browse context object which supports an interface having functions for registering and for retrieving the tool bar position from the browse context object; and
- retrieve the tool bar position by the second application program from the browse context object.

* * * * *